United States Patent
Hirakata

(10) Patent No.: US 11,348,537 B2
(45) Date of Patent: *May 31, 2022

(54) INFORMATION PROCESSING DEVICE

(71) Applicant: SEMICONDUCTOR ENERGY LABORATORY CO., LTD., Atsugi (JP)

(72) Inventor: Yoshiharu Hirakata, Tochigi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,327

(22) Filed: Nov. 30, 2020

(65) Prior Publication Data

US 2021/0104198 A1    Apr. 8, 2021

Related U.S. Application Data

(63) Continuation of application No. 16/426,132, filed on May 30, 2019, now Pat. No. 10,854,145, which is a (Continued)

(30) Foreign Application Priority Data

Aug. 19, 2015 (JP) .................. 2015-161562
Jun. 21, 2016 (JP) .................. 2016-122746

(51) Int. Cl.
*G09G 3/34* (2006.01)
*G09G 3/32* (2016.01)
(Continued)

(52) U.S. Cl.
CPC ......... *G09G 3/3406* (2013.01); *G06F 1/1643* (2013.01); *G06F 3/03547* (2013.01); (Continued)

(58) Field of Classification Search
None
See application file for complete search history.

(56) References Cited

U.S. PATENT DOCUMENTS 6,714,268 B2    3/2004 Wang et al.
7,038,641 B2    5/2006 Hirota et al.
(Continued)

FOREIGN PATENT DOCUMENTS

CN    001721942 A    1/2006
CN    001841147 A    10/2006
(Continued)

OTHER PUBLICATIONS

Indian Office Action (Application No. 201614027097) dated Feb. 3, 2021.
(Continued)

*Primary Examiner* — Aneeta Yodichkas
(74) *Attorney, Agent, or Firm* — Fish & Richardson P.C.

(57) ABSTRACT

A novel information processing device that is highly convenient or reliable is provided. The inventor has thought of a structure including an input portion configured to supply the positional information of a pointer, an arithmetic device configured to determine a first region based on the positional information of a pointer and generate the image information so that the luminance of an image displayed in the first region is increased, and a display portion for displaying the image information.

17 Claims, 20 Drawing Sheets

Related U.S. Application Data continuation of application No. 15/231,965, filed on Aug. 9, 2016, now Pat. No. 10,311,802.

(51) Int. Cl.

| | | |
|---|---|---|
| *G09G 3/20* | (2006.01) | |
| *G09G 3/3233* | (2016.01) | |
| *G09G 3/36* | (2006.01) | |
| *G06F 1/16* | (2006.01) | |
| *G06F 3/0354* | (2013.01) | |

(52) U.S. Cl.
CPC ............ *G09G 3/2092* (2013.01); *G09G 3/32* (2013.01); *G09G 3/3233* (2013.01); *G09G 3/3648* (2013.01); *G06F 2203/04101* (2013.01); *G09G 2300/046* (2013.01); *G09G 2320/0626* (2013.01); *G09G 2320/0686* (2013.01); *G09G 2354/00* (2013.01)

(56) References Cited

U.S. PATENT DOCUMENTS

| | | | |
|---|---|---|---|
| 7,084,936 B2 | 8/2006 | Kato | |
| 7,102,704 B2 | 9/2006 | Mitsui et al. | |
| 7,176,991 B2 | 2/2007 | Mitsui et al. | |
| 7,239,361 B2 | 7/2007 | Kato | |
| 7,248,235 B2 | 7/2007 | Fujii et al. | |
| 7,385,654 B2 | 6/2008 | Mitsui et al. | |
| 7,586,497 B2 | 9/2009 | Boroson et al. | |
| 8,064,015 B2 | 11/2011 | Huang et al. | |
| 8,094,129 B2 | 1/2012 | Izadi et al. | |
| 8,830,424 B2 | 9/2014 | Hirakata et al. | |
| 9,432,808 B1 * | 8/2016 | Reyes | H04W 4/021 |
| 10,311,802 B2 * | 6/2019 | Hirakata | G09G 3/3233 |
| 10,854,145 B2 * | 12/2020 | Hirakata | G06F 3/03547 |
| 2003/0052869 A1 | 3/2003 | Fujii et al. | |
| 2003/0201960 A1 | 10/2003 | Fujieda | |
| 2006/0007374 A1 | 1/2006 | Sone | |
| 2006/0072047 A1 | 4/2006 | Sekiguchi | |
| 2006/0132424 A1 | 6/2006 | Foo et al. | |
| 2006/0221276 A1 | 10/2006 | Masumoto et al. | |
| 2008/0048995 A1 | 2/2008 | Abileah et al. | |
| 2008/0180618 A1 | 7/2008 | Fujieda | |
| 2009/0058829 A1 * | 3/2009 | Kim | G06F 3/016 345/173 |
| 2010/0171905 A1 | 7/2010 | Huang et al. | |
| 2010/0328363 A1 | 12/2010 | Nakanishi | |
| 2012/0127140 A1 | 5/2012 | Ryan et al. | |
| 2012/0299816 A1 | 11/2012 | Lee | |
| 2014/0340420 A1 | 11/2014 | Han et al. | |
| 2015/0116344 A1 | 4/2015 | Won | |
| 2016/0012783 A1 | 1/2016 | Kimura et al. | |
| 2016/0042702 A1 | 2/2016 | Hirakata et al. | |
| 2016/0210910 A1 | 7/2016 | Yamazaki et al. | |
| 2016/0283028 A1 | 9/2016 | Yamazaki et al. | |
| 2016/0299387 A1 | 10/2016 | Yamazaki et al. | |
| 2016/0313769 A1 | 10/2016 | Yoshitani et al. | |

FOREIGN PATENT DOCUMENTS

| | | |
|---|---|---|
| CN | 001967328 A | 5/2007 |
| EP | 1617281 A | 1/2006 |
| JP | 2001-066593 A | 3/2001 |
| JP | 2002-196702 A | 7/2002 |
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 4161574 | 10/2008 |
| JP | 2011-013294 A | 1/2011 |
| JP | 2011-191750 A | 9/2011 |
| JP | 2013-221965 A | 10/2013 |
| TW | 588185 | 5/2004 |
| TW | I393950 | 4/2013 |
| WO | WO-2004/053819 | 6/2004 |

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.

Lee.J et al., "High ambient-contrast-ratio display using tandem reflective liquid crystal display and organic light-emitting device", Optics Express, Nov. 14, 2005, vol. 13, No. 23, pp. 9431-9438.

Taiwanese Office Action (Application No. 105125005) dated May 28, 2020.

Chinese Office Action (Application No. 201610694002.4) dated Sep. 22, 2020.

* cited by examiner

FIG. 6A
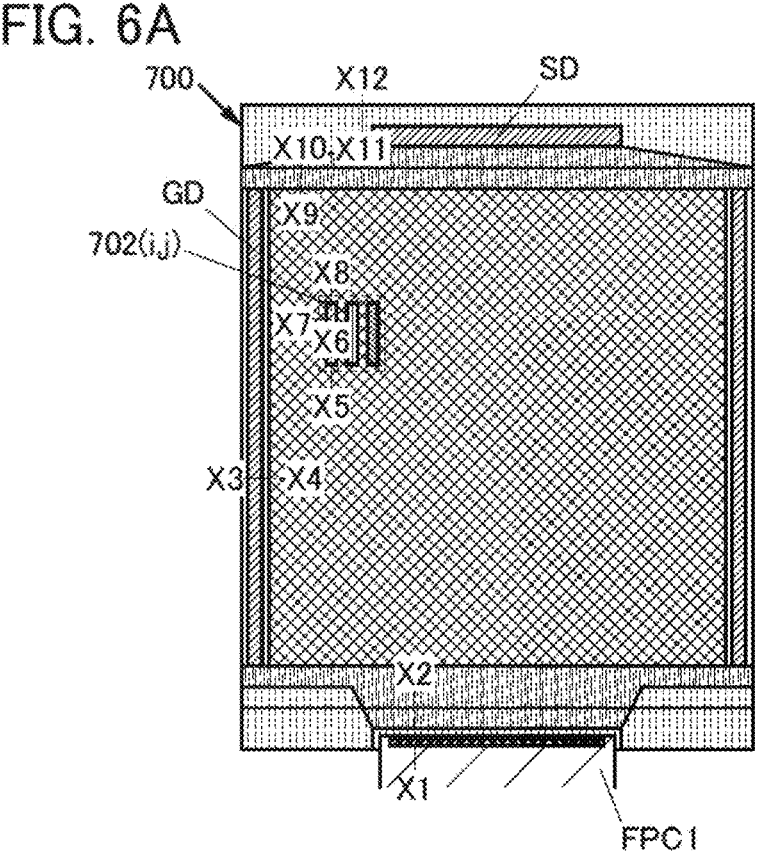
FIG. 6B1
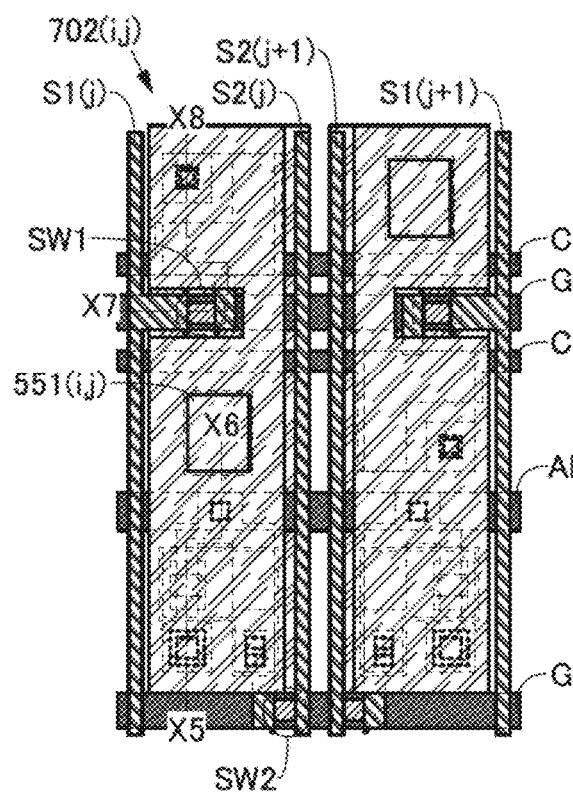
FIG. 6B2
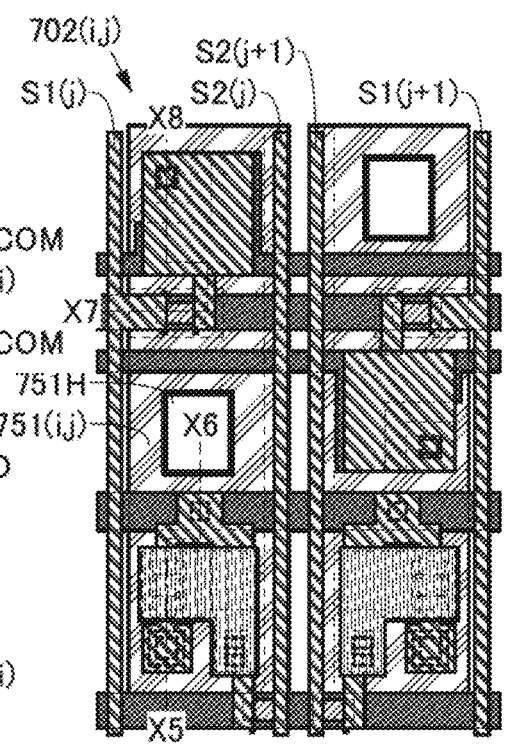

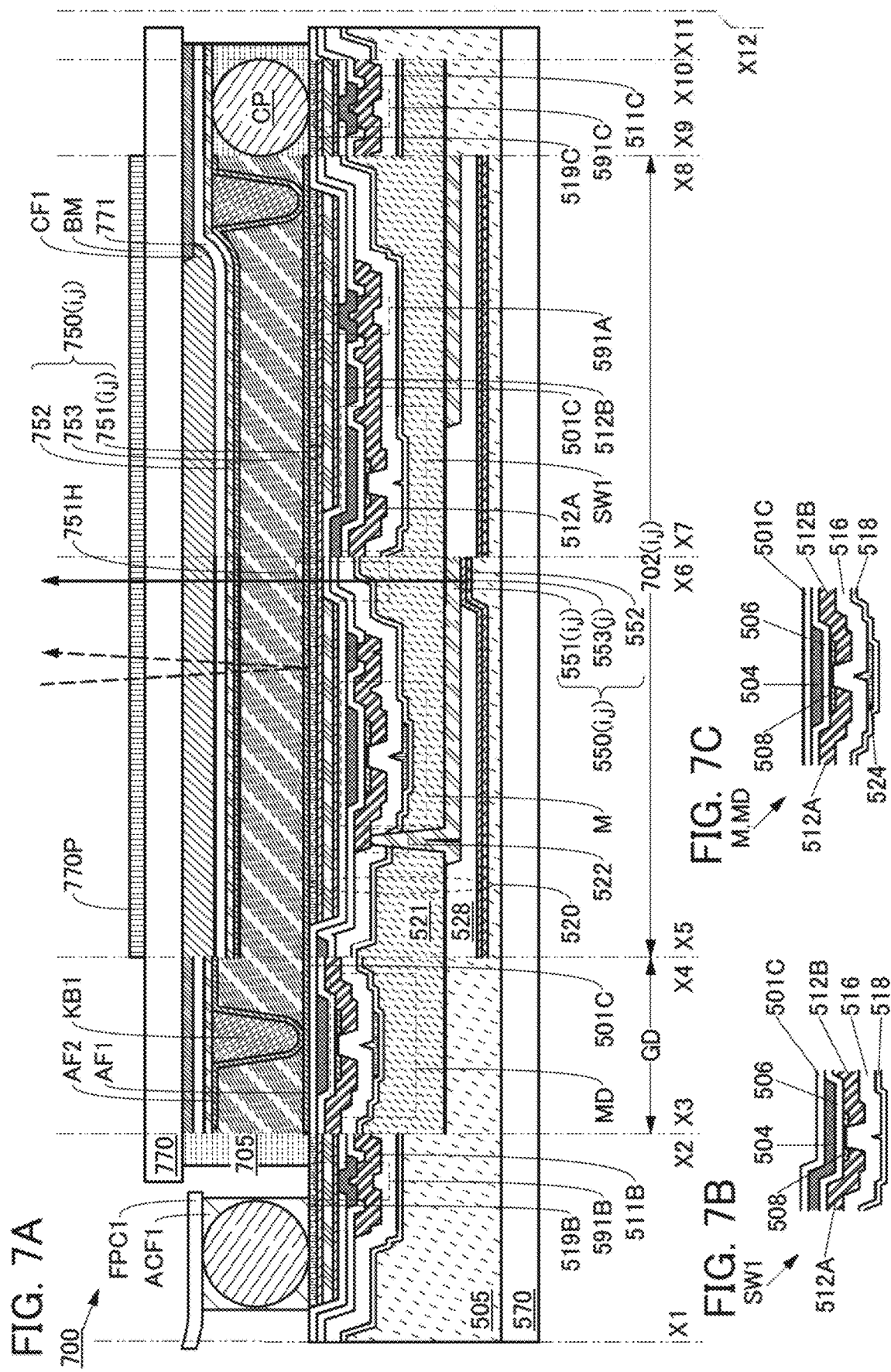

FIG. 9A
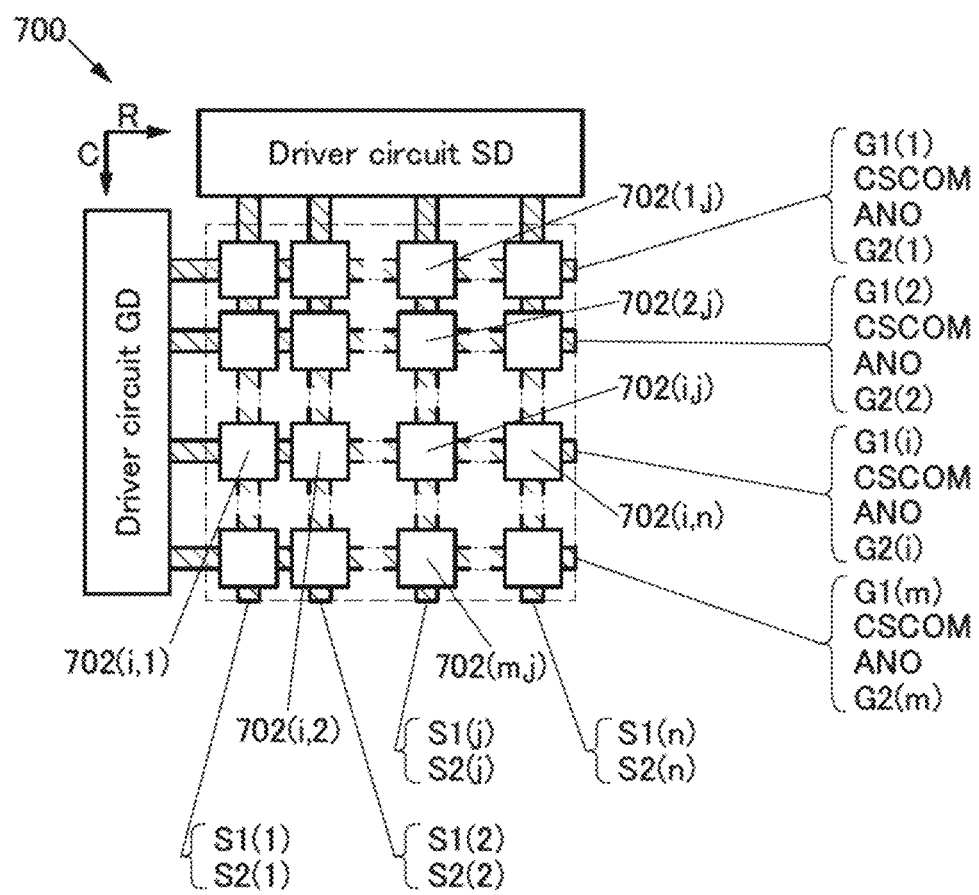
FIG. 9B1
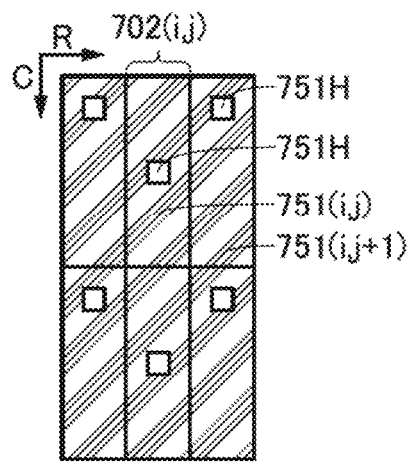
FIG. 9B2
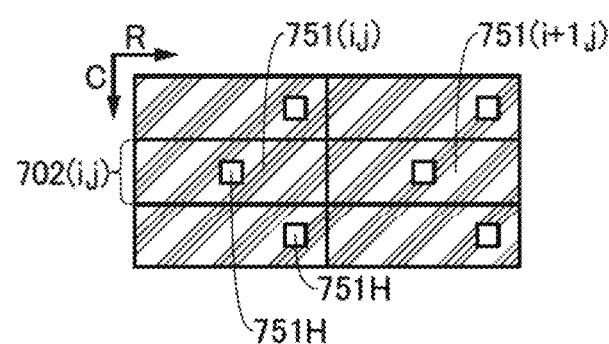

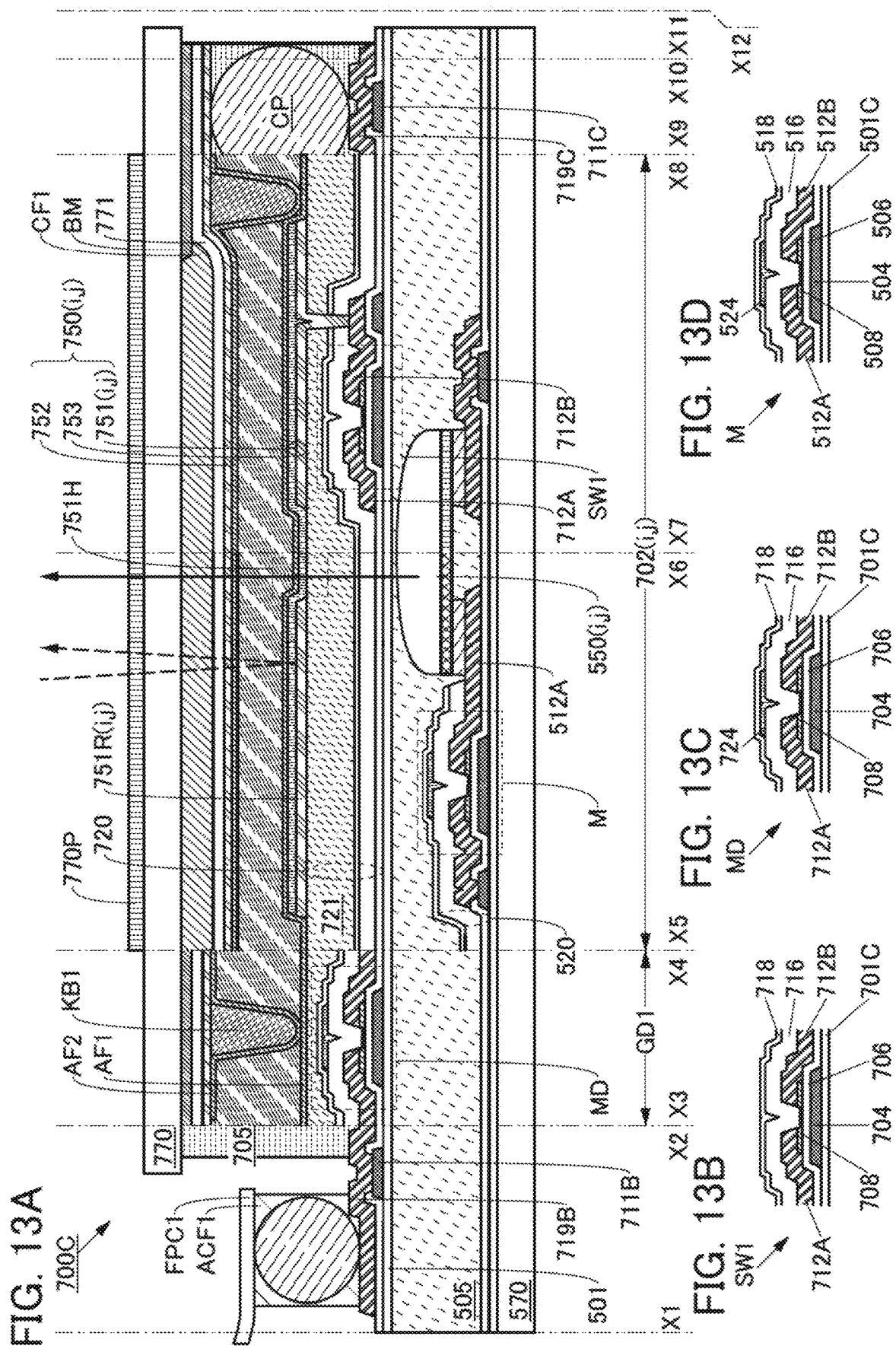

TEM image – plan view

TEM image – cross-sectional view

INFORMATION PROCESSING DEVICE

CROSS-REFERENCE TO RELATED APPLICATIONS

This application is a continuation of U.S. application Ser. No. 16/426,132, filed May 30, 2019, now allowed, which is a continuation of U.S. application Ser. No. 15/231,965, filed Aug. 9, 2016, now U.S. Pat. No. 10,311,802, which claims the benefit of foreign priority applications filed in Japan as Serial No. 2015-161562 on Aug. 19, 2015, and Serial No. 2016-122746 on Jun. 21, 2016, all of which are incorporated by reference.

BACKGROUND OF THE INVENTION

1. Field of the Invention

One embodiment of the present invention relates to an information processing device or a semiconductor device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

A liquid crystal display device in which a light-condensing means and a pixel electrode are provided on one surface of a substrate and a region transmitting visible light in the pixel electrode is provided to overlap with an optical axis of the light-condensing means is known. In addition, a liquid crystal display device that uses an anisotropic light-condensing means having a light-condensing direction X and a non-light-condensing direction Y, and where the non-light-condensing direction Y corresponds to a longitudinal direction of a region transmitting visible light in the pixel electrode is known (Patent Document 1).

REFERENCE

Patent Document

[Patent Document 1] Japanese Published Patent Application No. 2011-191750

SUMMARY OF THE INVENTION

An object of one embodiment of the present invention is to provide a novel information processing device that is highly convenient or reliable. Another object is to provide a novel information processing device or a novel semiconductor device.

Note that the description of these objects does not preclude the existence of other objects.

In one embodiment of the present invention, there is no need to achieve all the objects. Other objects will be apparent from and can be derived from the description of the specification, the drawings, the claims, and the like.

(1) One embodiment of the present invention is an information processing device that includes an arithmetic device and an input/output device.

The arithmetic device is configured to receive positional information and supply image information.

The input/output device is configured to supply the positional information and receive the image information.

The input/output device includes a display portion that displays the image information and an input portion that supplies the positional information.

The input portion is configured to sense the position of a pointer that approaches a region overlapping with the display portion. The input portion is configured to determine the positional information on the basis of the sensed position of the pointer.

The arithmetic device is configured to determine a first region of the display portion on the basis of the positional information. The arithmetic device is configured to generate the image information so that the luminance of the first region is higher than that of another region of the display portion. The other region can surround the first region.

(2) Another embodiment of the present invention is the above information processing device including a display panel in the display portion.

The display panel includes a pixel. The pixel includes a first display element and a second display element.

The first display element has a reflective display function. The second display element has a light-emitting display function.

The second display element receives the image information which is generated so that the luminance of the first region of the display portion is higher than that of the other region of the display portion.

The above information processing device of one embodiment of the present invention includes the input portion that is configured to supply the positional information of the pointer, the arithmetic device that determines the first region on the basis of the positional information of the pointer and generates the image information so that an image displayed on the first region has a high luminance, and the display portion that displays the image information. Accordingly, a bright image can be displayed on a region the pointer approaches. As a result, a novel information processing device that is highly convenient or reliable can be provided.

(3) Another embodiment of the present invention is the above information processing device including a first pixel circuit electrically connected to the first display element, and a second pixel circuit electrically connected to the second display element.

(4) Another embodiment of the present invention is the above information processing device in which the display panel includes a first scan line and a second scan line.

The first scan line is electrically connected to a group of pixels arranged in a row direction, and the second scan line is electrically connected to the group of pixels arranged in the row direction.

The first scan line is electrically connected to the first pixel circuit, and the second scan line is electrically connected to the second pixel circuit.

(5) Another embodiment of the present invention is the above information processing device in which the first display element includes a reflective film reflecting incident light and is configured to adjust the intensity of the reflected light, and the second display element includes a light-emitting diode.

(6) Another embodiment of the present invention is the above information processing device in which the reflective film has an opening and the second display element is configured to emit light to the opening and a region overlapping with the opening.

The display panel of one embodiment of the present invention includes the first display element (e.g., a reflective liquid crystal element) that includes the reflective film having the opening, and the second display element (e.g., a light-emitting diode) that emits light to the opening.

With this structure, the display panel can be used, for example, as a reflective display panel in an environment with strong external light and as a self-luminous display panel in a dim environment. Thus, a novel display panel that has low power consumption and is highly convenient or reliable can be provided.

(7) Another embodiment of the present invention is the above information processing device in which the input portion includes at least one of a keyboard, a hardware button, a pointing device, a touch sensor, an illuminance sensor, an imaging device, an audio input device, a viewpoint input device, and a pose detection device.

Thus, power consumption can be reduced and excellent visibility can be obtained even in a bright place. As a result, a novel information processing device that is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Further, in a p-channel transistor, a terminal to which a lower potential is applied is called a drain, and a terminal to which a higher potential is applied is called a source. In this specification, although connection relation of the transistor is described assuming that the source and the drain are fixed in some cases for convenience, actually, the names of the source and the drain interchange with each other depending on the relation of the potentials.

Note that in this specification, a source of a transistor means a source region that is part of a semiconductor film functioning as an active layer or a source electrode connected to the semiconductor film. Similarly, a drain of the transistor means a drain region that is part of the semiconductor film or a drain electrode connected to the semiconductor film A gate means a gate electrode.

In this specification, a state in which transistors are connected to each other in series means, for example, a state in which only one of a source and a drain of a first transistor is connected to only one of a source and a drain of a second transistor. In addition, a state in which transistors are connected in parallel to each other means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, a connection state means not only a state of direct connection but also a state of indirect connection through a circuit element such as a wiring, a resistor, a diode, or a transistor that allows current, voltage, or a potential to be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

In addition, in this specification, one of a first electrode and a second electrode of a transistor refers to a source electrode and the other refers to a drain electrode.

One embodiment of the present invention can provide a novel information processing device that is highly convenient or reliable. Another embodiment can provide a novel information processing device or a novel semiconductor device.

Note that the description of these effects does not preclude the existence of other effects. One embodiment of the present invention does not necessarily achieve all the effects listed above. Note that other effects will be apparent from and can be derived from the description of the specification, the drawings, the claims, and the like.

BRIEF DESCRIPTION OF THE DRAWINGS

In the accompanying drawings:

FIGS. 6A, 6B1, and 6B2 illustrate the structure of a display panel of one embodiment;

FIGS. 7A to 7C illustrate the structure of a display panel of one embodiment;

FIGS. 9A, 9B1, and 9B2 illustrate the structure of a display panel of one embodiment;

FIGS. 13A to 13D are cross-sectional views illustrating a pixel circuit of one embodiment;

DETAILED DESCRIPTION OF THE INVENTION

Figure 1A:
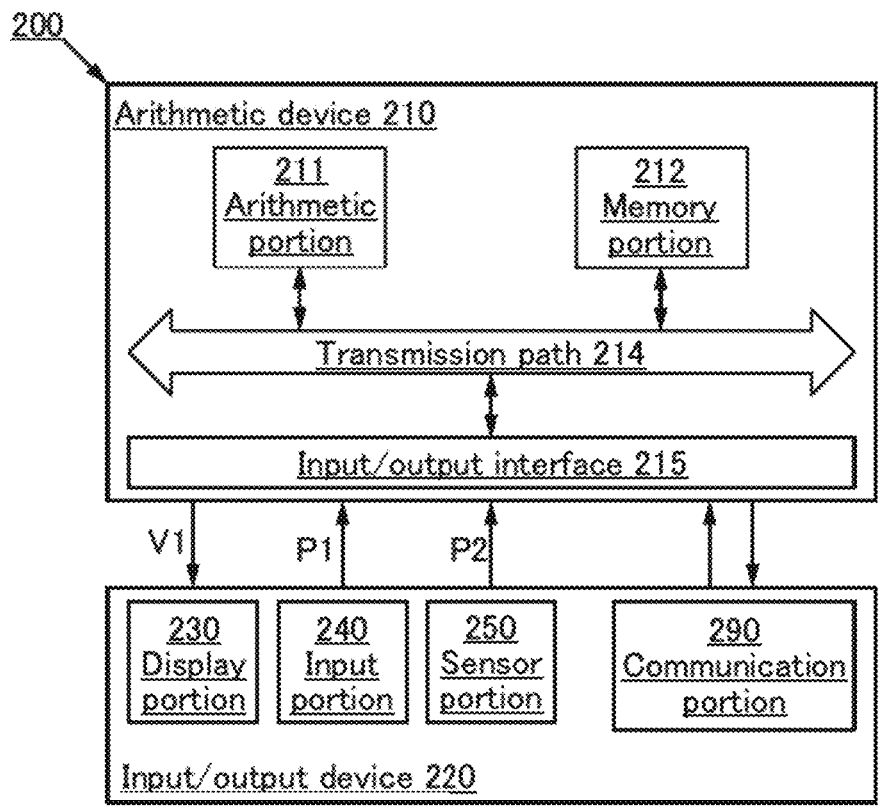
FIGS. 1A and 1B are diagrams illustrating the configuration of an information processing device of one embodiment.

An information processing device of one embodiment of the present invention includes an input portion that is configured to supply positional information of a pointer, an arithmetic device that determines a first region on the basis of the positional information of the pointer and generates image information so that an image displayed on the first region has a high luminance, and a display portion that displays the image information.

Accordingly, a bright image can be displayed on a region the pointer approaches. As a result, a novel information processing device that is highly convenient or reliable can be provided.

Embodiments will be described in detail with reference to the drawings. Note that the present invention is not limited to the description below, and it is easily understood by those skilled in the art that the mode and details can be variously changed without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and the description of such portions is not repeated.

Embodiment 1

In this embodiment, the configuration of an information processing device of one embodiment of the present invention will be described with reference to FIGS. 1A and 1B.

Figure 1B:
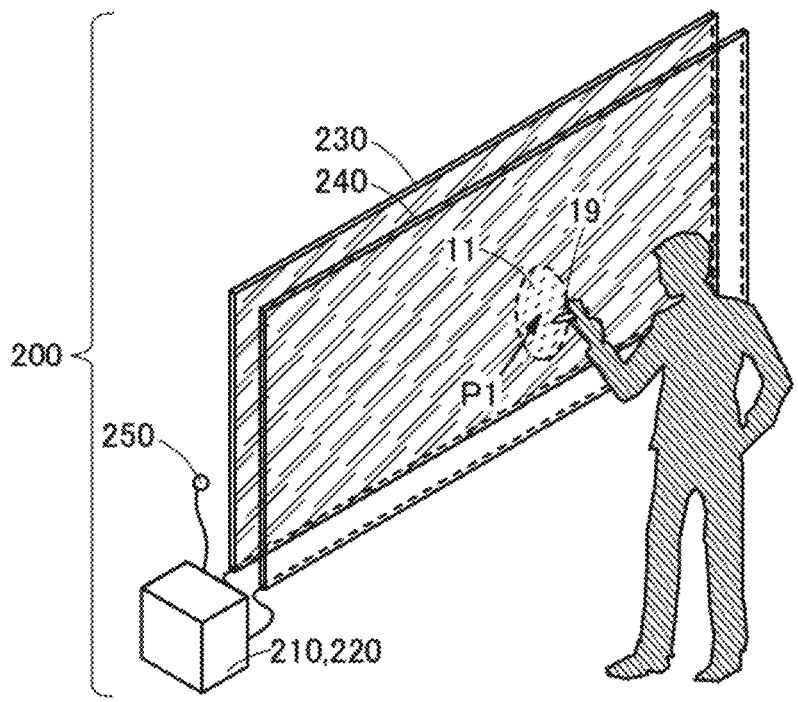

FIGS. 1A and 1B illustrate the configuration of an information processing device 200 of one embodiment of the present invention. FIG. 1A is a block diagram illustrating the configuration of the information processing device 200 of one embodiment of the present invention, and FIG. 1B is a schematic view illustrating the information processing device 200 being in operation.

Note that in this specification, an integral variable of 1 or more is used for reference numerals in some cases. For example, (p) where p is an integral variable of 1 or more is used for part of a reference numeral that specifies any one of components (p components in maximum). For another example, (m, n) where m and n are each an integral variable of 1 or more may be used for part of a reference numeral that specifies any one of components (m×n components in maximum).

<Configuration Example of Information Processing Device>

The information processing device 200 described in this embodiment includes an arithmetic device 210 and an input/output device 220 (see FIG. 1A). The arithmetic device 210 is configured to receive positional information P1 and supply image information V1. The input/output device 220 is configured to supply the positional information P1 and receive the image information V1.

The input/output device 220 includes a display portion 230 that displays the image information V1 and an input portion 240 that supplies the positional information P1.

Furthermore, the input portion 240 is configured to detect the position of a pointer 19 which approaches a region overlapping with the display portion 230 and to determine the positional information P1 on the basis of the detected position of the pointer 19 (see FIG. 1B).

Furthermore, the arithmetic device 210 is configured to determine a first region 11 of the display portion on the basis of the positional information P1. The arithmetic device 210 is configured to generate the image information V1 so that the luminance of the first region 11 of the display portion is higher than that of the other region of the display portion. The other region can surround the first region.

In addition, the arithmetic device 210 determines the first region 11 on the basis of the positional information P1. For example, the region can be determined to have an elliptical shape, a circular shape, a polygonal shape, a rectangular shape, or the like.

The information processing device 200 described in this embodiment includes the input portion 240 which is configured to supply the positional information P1 of the pointer 19, the arithmetic device 210 which determines the first region 11 on the basis of the positional information P1 of the pointer 19 and generates the image information V1 so that an image displayed on the first region 11 has a high luminance, and the display portion 230 which displays the image information V1. Accordingly, a bright image can be displayed on a region that the pointer approaches. As a result, a novel information processing device that is highly convenient or reliable can be provided.

For example, in the case where the information processing device 200 is used for education-related devices, digital signage, smart television systems, or the like, an area indicated by the pointer is hard to be seen in some cases because it is in the shadow of an operator close to the display portion 230. When an image is displayed so that the luminance of an image displayed in the area indicated by the pointer is higher than that of an image displayed on the other region, the operator can have a clear view of the display without being affected by his/her shadow. Furthermore, the operator can perform a smooth operation.

The information processing device 200 includes a sensor portion 250.

Individual components of the information processing device 200 will be described below. Note that these components cannot be clearly distinguished and one component also serves as another component or includes part of another component in some cases.

For example, the display portion 230 with which the input portion 240 overlaps serves as both the input portion 240 and the display portion 230.

Configuration Example

The information processing device 200 includes the arithmetic device 210, the input/output device 220, the display portion 230, the sensor portion 250, or the input portion 240.

<<Arithmetic Device 210>>

The arithmetic device 210 includes an arithmetic portion 211 and a memory portion 212. The arithmetic device 210 further includes a transmission path 214 and an input/output interface 215.

<<Arithmetic Portion 211>>

The arithmetic portion 211 is configured to, for example, execute a program.

<<Memory Portion 212>>

The memory portion 212 is configured to, for example, store the program executed by the arithmetic portion 211, initial information, setting information, an image, or the like.

Specifically, a hard disk, a flash memory, a memory including a transistor including an oxide semiconductor, or the like can be used.

<<Program>>

For example, a program including the following three steps can be used.

In the first step, the positional information P1 is obtained.

In the second step, the first region 11 is determined on the basis of the positional information P1.

In the third step, the image information V1 is generated so that the luminance of an image displayed in the first region 11 is higher than that of an image displayed in the other region.

For example, the arithmetic device 210 determines the first region 11 on the basis of the positional information P1. Specifically, the region can be determined to have an elliptical shape, a circular shape, a polygonal shape, a rectangular shape, or the like. For example, the first region 11 containing the positional information P1 is determined within a radius of 60 cm or less, preferably 30 cm or less and 5 cm or more.

Note that as a method for generating the image information so that the luminance of an image displayed in the first region is higher than that of an image displayed in the other region, the luminance of the image displayed in the first region is increased to 110% or more, preferably 120% or more and 200% or less of the luminance of the image displayed in the other region. Alternatively, the average luminance of the image displayed in the first region is increased to 110% or more, preferably 120% or more and 200% or less of the average luminance of the image displayed in the other region.

The information processing device 200 described in this embodiment, which executes the program, can generate the image information V1 on the basis of the positional information P1 so that the luminance of an image displayed in the first region 11 is higher than that of an image displayed in the other region. As a result, a novel information processing device that is highly convenient or reliable can be provided.

<<Input/output interface 215 and transmission path 214>>

The input/output interface 215 includes a terminal or a wiring and is configured to supply and receive information. For example, the input/output interface 215 can be electrically connected to the transmission path 214 or the input/output device 220.

The transmission path 214 includes a wiring and is configured to supply and receive information. For example, the transmission path 214 can be electrically connected to the input/output interface 215. In addition, the transmission path 214 can be electrically connected to the arithmetic portion 211, the memory portion 212, or the input/output interface 215.

<<Input/output device 220>>

The input/output device 220 includes the display portion 230, the input portion 240, the sensor portion 250, or a communication portion 290.

For example, the input/output device 220 includes the display portion 230 and the input portion 240 having a region overlapping with the display portion 230. A touch panel or the like can be used for the input/output device 220. Specifically, the touch panel described in Embodiment 3 can be used for the input/output device 220.

<<Display Portion 230>>

The display portion 230 includes a display panel. For example, a display panel including a pixel that includes a reflective display element and a light-emitting element can be used for the display portion 230. Specifically, the display panel described in Embodiment 4 or Embodiment 6 can be used for the display portion 230.

For example, the reflectance of the reflective display element is increased with use of image information, whereby the luminance of the displayed image can be increased. Alternatively, the luminance of the light-emitting element is increased with use of the image information, whereby the luminance of the displayed image can be increased.

<<Input Portion 240>>

The input portion 240 includes an input panel.

For example, the input panel includes a proximity sensor which is configured to sense an approaching pointer. Note that a finger, a stylus pen, or the like can be used as the pointer.

As the stylus pen, a light-emitting element such as a light-emitting diode, a piece of metal, a coil, or the like can be used.

For example, a capacitive proximity sensor, an electromagnetic inductive proximity sensor, an infrared light detection type proximity sensor, a proximity sensor including a photoelectric conversion element, or the like can be used as the proximity sensor.

The capacitive proximity sensor includes a conductive film and is configured to detect the proximity of an object with inductivity larger than that of the air to the conductive film. For example, a plurality of conductive films is provided in different regions of the input panel, and a region a finger or the like serving as a pointer approaches is identified in accordance with a change in the parasitic capacitance of the conductive film to determine positional information.

In addition, the electromagnetic inductive proximity sensor is configured to detect the proximity of a piece of metal, a coil, or the like to the detection circuit. For example, a plurality of oscillator circuits is provided in different regions of the input panel, and a region a piece of metal, a coil, or the like in a stylus pen or the like serving as a pointer approaches can be identified in accordance with a change in the circuit constant of the oscillation circuit to determine positional information.

For example, the photo-detection proximity sensor is configured to detect the proximity of a light-emitting element. For example, a plurality of photoelectric conversion elements is provided in different regions of the input panel, and a region a light-emitting element in a stylus pen or the like serving as a pointer approaches can be identified in accordance with a change in the electromotive force of the photoelectric conversion element to determine positional information.

<<Sensor Portion 250>>

For example, an illuminance sensor that senses the brightness of an environment, a human motion sensor, or the like can be used for the sensor portion 250.

<<Communication Portion 290>>

The communication portion 290 is configured to supply and acquire information to/from a network.

Note that this embodiment can be combined with any of the other embodiments in this specification as appropriate.

Embodiment 2

In this embodiment, the configuration of an information processing device of one embodiment of the present invention will be described with reference to FIGS. 2A to 4B.

Figure 2A:
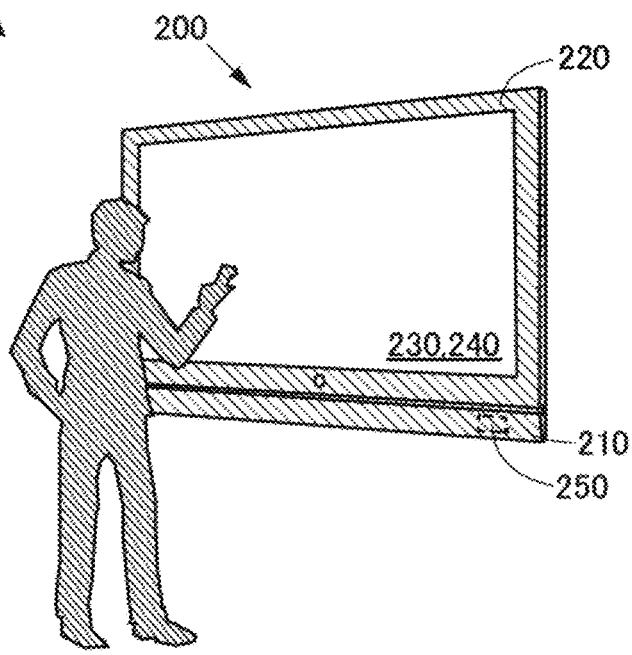
FIGS. 2A to 2C are projection views illustrating the configuration of an information processing device of one embodiment.
Figure 2B:
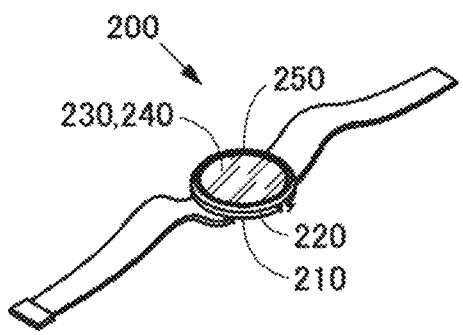
Figure 2C:
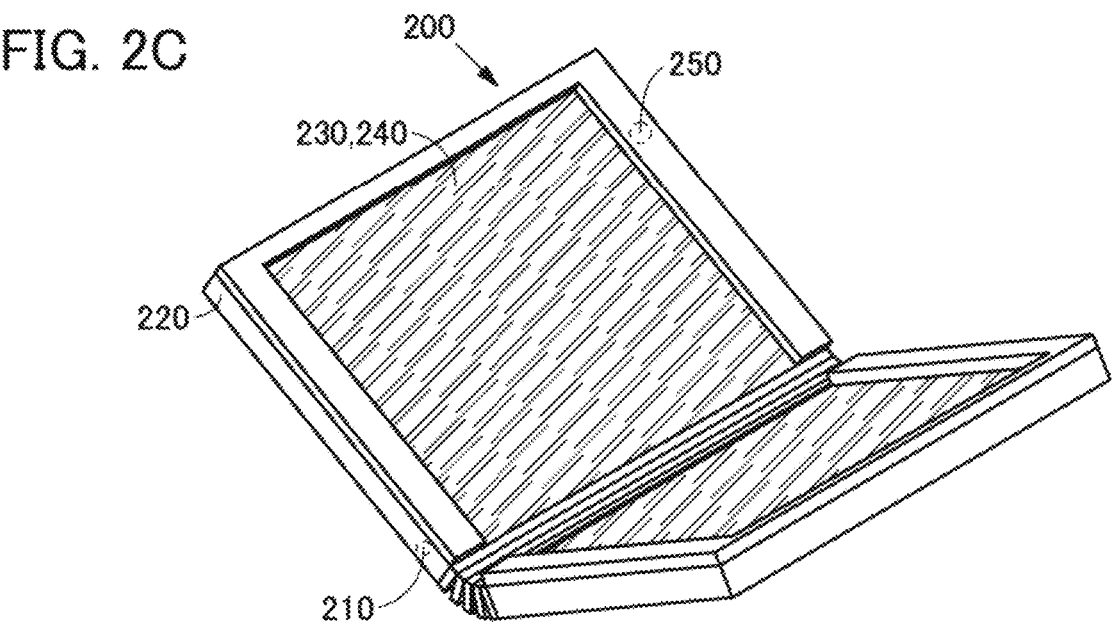

FIG. 2A illustrates the configuration of the information processing device 200. FIGS. 2B and 2C are projection views illustrating an example of an external view of the information processing device 200.

Figure 3A:
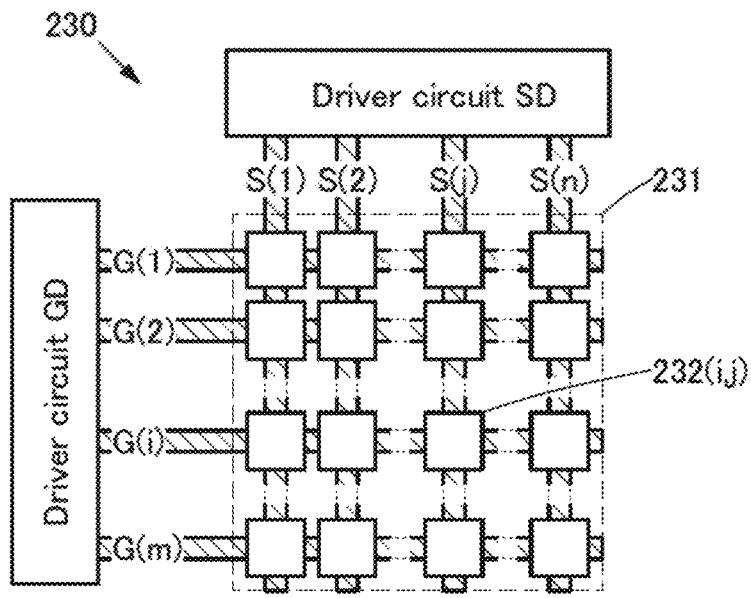
FIGS. 3A to 3C are block diagrams and a circuit diagram illustrating the configuration of a display portion of one embodiment.
Figure 3B:
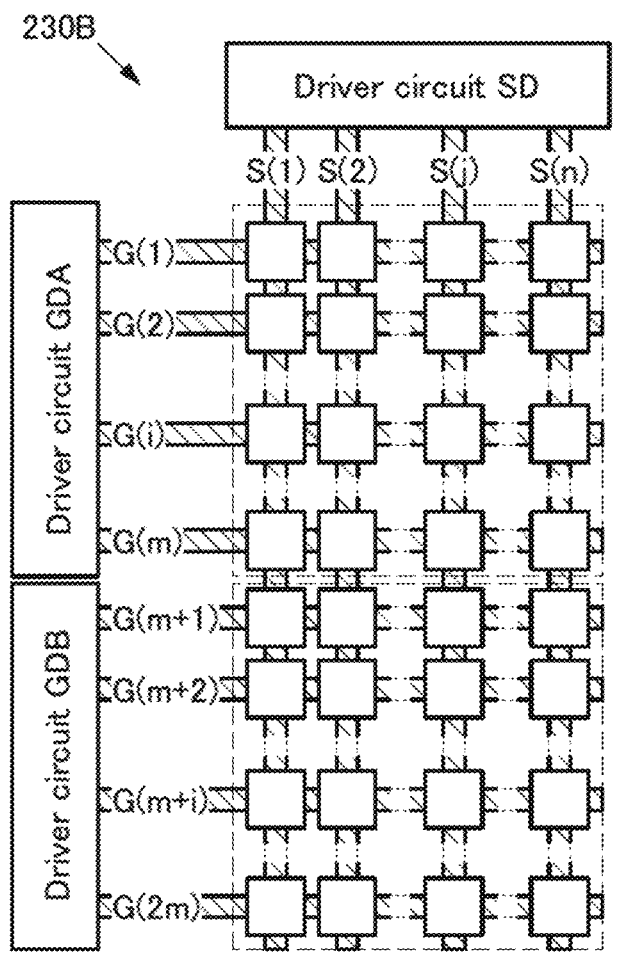
Figure 3C:
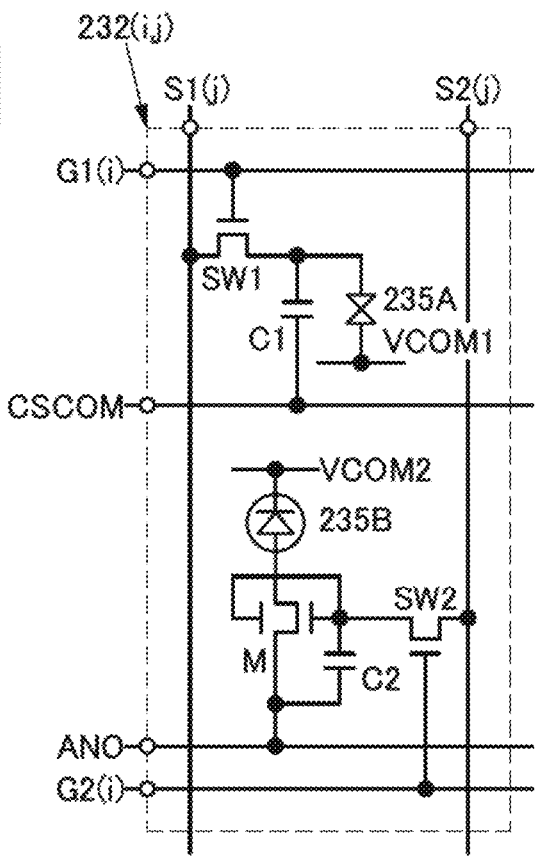

FIG. 3A is a block diagram illustrating the configuration of the display portion 230. FIG. 3B is a block diagram illustrating the configuration of a display portion 230B. FIG. 3C is a circuit diagram illustrating the configuration of a pixel 232(i, j).

<Configuration Example of Information Processing Device>

The information processing device 200 described in this embodiment includes the input/output device 220 and the arithmetic device 210 (see FIG. 2A).

The input/output device 220 is configured to supply the positional information P1 and receive the image information V1 and control information. For example, a proximity sensor, a crown positioned to be pushed into a housing, a pressure sensor touching the crown or the like, or the like can be used for the input/output device 220.

The arithmetic device 210 is configured to receive the positional information P1 and information P2 based on the surrounding state, and supply the image information V1 and control information.

The arithmetic device 210 is configured to generate the image information V1 and the control information on the basis of the information P2 based on the surrounding state.

The input/output device 220 includes the display portion 230 which displays the image information V1, the input portion 240 which supplies the positional information P1, and the sensor portion 250 which supplies the information P2 based on the surrounding state.

The display portion 230 includes a display panel. The sensor portion 250 is configured to generate the information P2 based on the surrounding state on the basis of a pressure sensor and a signal of the pressure sensor.

Furthermore, the arithmetic device 210 includes the arithmetic portion 211 and the memory portion 212.

The memory portion 212 stores a program to be executed by the arithmetic portion 211.

The program includes a step of selecting a first mode in the case where the supplied information P2 based on the surrounding state exceeds a predetermined threshold value. The program also includes a step of selecting a second mode in the case where the information P2 based on the surrounding state that exceeds a predetermined threshold value is not supplied for more than a predetermined period of time.

The arithmetic portion 211 is configured to supply, in the case where the second mode is selected, a control signal that differs from a control signal supplied in the case where the first mode is selected.

In addition, the control signals include a signal for renewing the display on the display panel.

The arithmetic device 210 is configured to supply, in the case where the second mode is selected, a control signal so that the display on the display panel is renewed with a frequency lower than that in the case where the first mode is selected.

The above information processing device of one embodiment of the present invention includes the input/output device that supplies the information P2 based on the surrounding state, and the arithmetic device that supplies different control information on the basis of the information P2 based on the surrounding state.

Accordingly, the information processing device can be operated in a different mode by being pressed, for example.

As a result, a novel information processing device that is highly convenient or reliable can be provided.

<Configuration>

One embodiment of the present invention includes the arithmetic device 210 or the input/output device 220.

<<Arithmetic Device 210>>

The arithmetic device 210 includes the arithmetic portion 211 and the memory portion 212.

The arithmetic device 210 further includes the transmission path 214 and the input/output interface 215 (see FIG. 2A).

<<Arithmetic Portion 211>>

The arithmetic portion 211 is configured to, for example, execute a program. For example, a CPU described in Embodiment 7 can be used. In that case, power consumption can be sufficiently reduced.

<<Memory Portion 212>>

The memory portion 212 is configured to, for example, store the program executed by the arithmetic portion 211, initial information, setting information, an image, or the like.

Specifically, a hard disk, a flash memory, a memory including a transistor including an oxide semiconductor, or the like can be used.

<<Input/Output Interface 215 and Transmission Path 214>>

The input/output interface 215 includes a terminal or a wiring and is configured to supply and receive information. For example, the input/output interface 215 can be electrically connected to the transmission path 214 or the input/output device 220.

The transmission path 214 includes a wiring and is configured to supply and receive information. For example, the transmission path 214 can be electrically connected to the input/output interface 215. In addition, the transmission path 214 can be electrically connected to the arithmetic portion 211, the memory portion 212, or the input/output interface 215.

<<Input/Output Device 220>>

The input/output device 220 includes the display portion 230, the input portion 240, the sensor portion 250, or the communication portion 290.

<<Display Portion 230>>

The display portion 230 includes a display region 231, a driver circuit GD, and a driver circuit SD (see FIG. 3A). For example, the display panel described in Embodiment 4 or Embodiment 6 can be used. In that case, power consumption can be reduced.

The display region 231 includes at least one pixel 232(i, j), a scan line G1(i) and a scan line G2(i) which are electrically connected to the pixel 232(i, j) arranged in a row direction, and a signal line S1(j) and a signal line S2(i) which are electrically connected to the pixel 232(i, j) arranged in a column direction crossing the row direction. Note that i is an integer greater than or equal to 1 and less than or equal to m,j is an integer greater than or equal to 1 and less than or equal to n, and each of m and n is an integer greater than or equal to 1.

Note that the pixel 232(i, j) is electrically connected to the scan line G1(i), the scan line G2(i), the signal line S1(j), the signal line S2(j), a wiring ANO, a wiring CSCOM, a wiring VCOM1, and a wiring VCOM2 (see FIG. 3C).

The display portion can include a plurality of driver circuits. For example, the display portion 230B can include a driver circuit GDA and a driver circuit GDB (see FIG. 3B).

<<Driver Circuit GD>>

The driver circuit GD is configured to supply a selection signal on the basis of the control information.

For example, the driver circuit GD is configured to supply a selection signal to one scan line with a frequency of 30 Hz or higher, preferably 60 Hz or higher, on the basis of the control information. Accordingly, moving images can be smoothly displayed.

For example, the driver circuit GD is configured to supply a selection signal to one scan line with a frequency of lower than 30 Hz, preferably lower than 1 Hz, and more preferably less than once per minute, on the basis of the control information. Accordingly, a still image can be displayed while flickering is suppressed.

Furthermore, for example, in the case where a plurality of driver circuits is provided, the driver circuits GDA and GDB can supply the selection signals with different frequencies. Specifically, the selection signal can be supplied with a higher frequency to a region on which moving images are smoothly displayed than to a region on which a still image is displayed in a state where flickering is suppressed.

<<Driver Circuit SD>>

The driver circuit SD is configured to supply an image signal on the basis of the image information V1.

<<Pixel 232(i, j)>>

The pixel 232(i, j) includes a first display element 235A and a second display element 235B overlapping with the first display element 235A. The pixel 232(i, j) further includes a pixel circuit for driving the first display element 235A and the second display element 235B (see FIG. 3C).

<<First Display Element 235A>>

For example, a display element configured to control light reflection or transmission can be used as the first display element 235A. Specifically, a combined structure of a liquid crystal display element and a polarizing plate or a MEMS shutter display element can be used as the first display element 235A. For example, by using a reflective display element for controlling light reflection, the power consumption of a display panel can be reduced.

Specifically, a reflective liquid crystal display element can be used as the first display element 235A.

The first display element 235A includes a first electrode, a second electrode, and a liquid crystal layer. The liquid crystal layer contains a liquid crystal material whose orientation can be controlled by a voltage applied between the first electrode and the second electrode. For example, the orientation of the liquid crystal material can be controlled by an electric field in the thickness direction (also referred to as the vertical direction), the horizontal direction, or the diagonal direction of the liquid crystal layer.

<<Second Display Element 235B>>

For example, a display element configured to emit light can be used as the second display element 235B. Specifically, a light-emitting diode, an organic EL element, or the like can be used as the second display element 235B.

Specifically, a light-emitting diode or an organic EL element configured to emit white light can be used as the second display element 235B. Alternatively, a light-emitting diode that emits blue light, green light, or red light can be used as the second display element 235B. Further alternatively, an organic EL element that emits blue light, green light, or red light can be used as the second display element 235B.

<<Pixel Circuit>>

A circuit configured to drive the first display element 235A or the second display element 235B can be used as the pixel circuit.

A switch, a transistor, a diode, a resistor, an inductor, a capacitor, or the like can be used in the pixel circuit.

For example, one or a plurality of transistors can be used as a switch. Alternatively, a plurality of transistors connected in parallel, in series, or in combination of parallel connection and series connection can be used as a switch.

<<Transistor>>

For example, a semiconductor film formed at the same step can be used for transistors in the driver circuit and the pixel circuit.

For example, bottom-gate transistors, top-gate transistors, or the like can be used.

For example, a manufacturing line for a bottom-gate transistor including amorphous silicon as a semiconductor can be easily remodeled into a manufacturing line for a bottom-gate transistor including an oxide semiconductor as a semiconductor. Furthermore, for example, a manufacturing line for a top-gate transistor including polysilicon as a semiconductor can be easily remodeled into a manufacturing line for a top-gate transistor including an oxide semiconductor as a semiconductor.

For example, a transistor including a semiconductor containing an element of Group 14 can be used. Specifically, a semiconductor containing silicon can be used for a semiconductor film. For example, single crystal silicon, polysilicon, microcrystalline silicon, or amorphous silicon can be used for the semiconductor of the transistor.

Note that the temperature needed for forming a transistor using polysilicon as a semiconductor is lower than that for forming a transistor using single crystal silicon as a semiconductor.

In addition, the transistor using polysilicon as a semiconductor has a higher field-effect mobility than the transistor using amorphous silicon as a semiconductor, and therefore can have a higher aperture ratio of pixel. Moreover, pixels arranged at an extremely high density, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

For example, a transistor including an oxide semiconductor can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used. Specifically, a transistor that uses an oxide semiconductor for a semiconductor film can be used.

Accordingly, the pixel circuit can hold an image signal for a longer time than a pixel circuit including a transistor that uses amorphous silicon for a semiconductor film. Specifically, the selection signal can be supplied with a frequency of lower than 30 Hz, preferably lower than 1 Hz, and more preferably less than once per minute while flickering is suppressed. Consequently, eyestrain on a user of the information processing device can be reduced, and power consumption for driving can be reduced.

Alternatively, for example, a transistor including a compound semiconductor can be used. Specifically, a semiconductor containing gallium arsenide can be used for a semiconductor film.

For example, a transistor including an organic semiconductor can be used. Specifically, an organic semiconductor containing any of polyacenes and graphene can be used for the semiconductor film.

<<Input Portion 240>>

A variety of human interfaces or the like can be used as the input portion 240 (see FIG. 2A).

For example, a keyboard, a mouse, a touch sensor, a microphone, a camera, or the like can be used as the input portion 240. Note that a touch sensor having a region overlapping with the display portion 230 can also be used. An input/output device that includes the display portion 230 and the touch sensor having a region overlapping with the display portion 230 can be referred to as a touch panel.

For example, a user can make various gestures (e.g., tap, drag, swipe, and pinch in) using his/her finger as a pointer on the touch panel.

For example, the arithmetic device 210 analyzes information on the position, track, or the like of the finger on the touch panel and determines that a specific gesture is supplied when the analysis results meet predetermined conditions. Therefore, the user can supply a certain operation instruction associated with a certain gesture by using the gesture.

For instance, the user can supply a "scrolling instruction" for changing a position where image information is displayed by using a gesture of touching and moving his/her finger on the touch panel.

<<Sensor Portion 250>>

The sensor portion 250 is configured to supply the information P2 by sensing the surrounding state. Specifically, proximity information, pressure information, or the like based on a signal supplied from an illuminance sensor, a human motion sensor, or the like can be supplied.

For example, a camera, an acceleration sensor, a direction sensor, a pressure sensor, a temperature sensor, a humidity sensor, a proximity sensor, an illuminance sensor, or a global positioning system (GPS) signal receiving circuit can be used as the sensor portion 250.

For example, when the arithmetic device 210 determines that the ambient light level measured by an illuminance sensor of the sensor portion 250 is sufficiently higher than the predetermined illuminance, image information is displayed using the first display element 235A. In the case where it is determined to be dim, image information is displayed using the first display element 235A and the second display element 235B. In the case where it is determined to be dark, image information is displayed using the second display element 235B.

Specifically, an image is displayed with a reflective liquid crystal element and/or an organic EL element depending on the ambient brightness.

Thus, image information can be displayed in such a manner that, for example, a reflective display element is used in an environment with strong external light and a self-luminous display element is used in a dim environment. As a result, a novel information processing device that has low power consumption and is highly convenient or reliable can be provided.

For example, a sensor that is configured to measure the chromaticity of ambient light can be used in the sensor portion 250. Specifically, a CCD camera or the like can be used. Thus, white balance can be adjusted in accordance with the chromaticity of ambient light measured by the sensor portion 250.

Specifically, in the first step, disrupted white balance of ambient light is measured.

In the second step, the intensity of light of a color which is insufficient in an image to be displayed by the first display element using reflection of ambient light is estimated.

In the third step, ambient light is reflected by the first display element, and light is emitted from the second display element so that light of the insufficient color is supplemented, whereby the image is displayed.

In this manner, display can be performed with adjusted white balance by utilizing light reflected by the first display element and light emitted from the second display element. Thus, a novel information processing device that can display an image with low power consumption or with adjusted white balance and that is highly convenient or reliable can be provided.

<<Communication Portion 290>>

The communication portion 290 is configured to supply and acquire information to/from a network.

<<Program>>

A program of one embodiment of the present invention will be described with reference to FIGS. 4A and 4B.

Figure 4A:
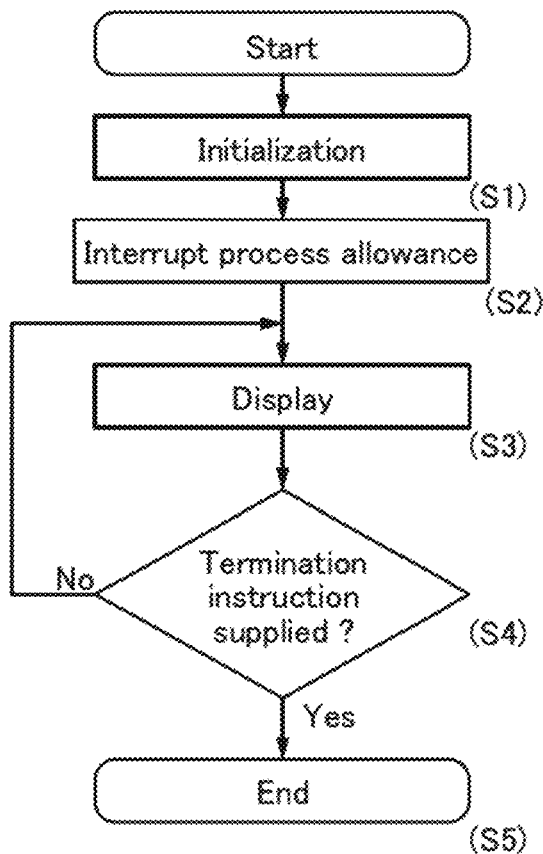
FIGS. 4A and 4B are flow charts showing a program of one embodiment.
Figure 4B:
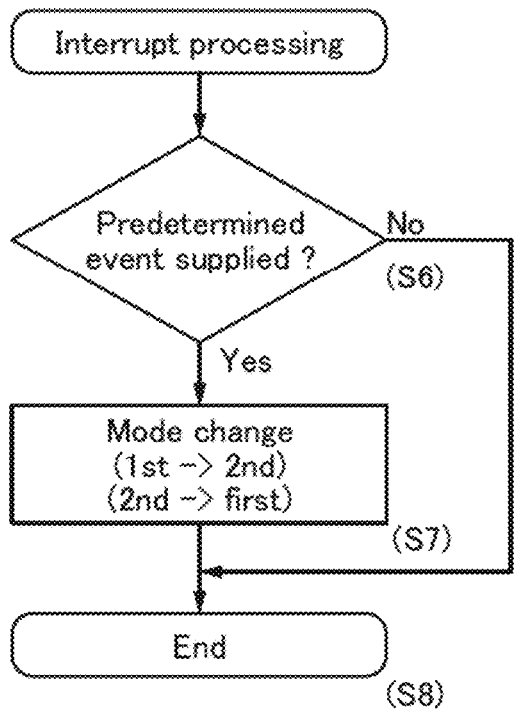

FIG. 4A is a flow chart showing the main processing of the program of one embodiment of the present invention, and FIG. 4B is a flow chart showing interrupt processing.

The program of one embodiment of the present invention has the following steps (see FIG. 4A).

<<First Step>>

In the first step, setting is initialized (see (S1) in FIG. 4A).

For example, predetermined image information displayed at start-up and information for specifying a method of displaying the image information are acquired from the memory portion 212. Specifically, a still image can be used as the predetermined image information. In addition, the image information can be displayed by a method of renewing the image information with a frequency lower than that in the case where a moving image is used.

<<Second Step>>

In the second step, interrupt processing is allowed (see (S2) in FIG. 4A). Note that an arithmetic device allowed to execute the interrupt processing can perform the interrupt processing in parallel with the main processing. The arithmetic device which has returned from the interrupt processing to the main processing can reflect the results of the interrupt processing in the main processing.

Note that the arithmetic device may execute the interrupt processing when a counter has an initial value, and the counter may be set at a value other than the initial value when the arithmetic device returns from the interrupt processing. Thus, the interrupt processing is always ready to be executed after the program is started up.

<<Third Step>>

In the third step, image information is displayed in a predetermined mode selected in the first step or the interrupt processing (see (S3) in FIG. 4A). Note that the mode specifies the method of displaying the image information.

For example, a first mode or a second mode can be selected.

<<First Mode>>

Specifically, in the first mode, a selection signal is supplied to a scan line with a frequency of 30 Hz or more, preferably 60 Hz or more, and display can be performed on the basis of the selection signal.

By supplying the selection signal with a frequency of 30 Hz or more, preferably 60 Hz or more, moving images can be displayed smoothly.

For example, when an image is renewed with a frequency of 30 Hz or higher, preferably 60 Hz or higher, images continually and smoothly changed with the user's operation can be displayed on the information processing device 200 operated by the user.

<<Second Mode>>

Specifically, in the second mode, a selection signal is supplied to a scan line with a frequency of lower than 30 Hz, preferably lower than 1 Hz, and more preferably less than once per minute and display can be performed on the basis of the selection signal.

When a selection signal is supplied with a frequency of lower than 30 Hz, preferably lower than 1 Hz, and more preferably less than once per minute, display with less flicker can be performed. Furthermore, power consumption can be reduced.

For example, in the case where the information processing device 200 is used as a clock, the display can be renewed once per second or once per minute.

<<Fourth Step>>

In the fourth step, the program moves to a fifth step when a termination instruction is supplied, and the program moves to the third step when the termination instruction is not supplied (see (S4) in FIG. 4A).

For example, the termination instruction supplied in the interrupt processing can be used.

<<Fifth Step>>

In the fifth step, the program terminates (see (S5) in FIG. 4A).

<<Interrupt Processing>>

The interrupt processing includes the following sixth to eighth steps (see FIG. 4B).

<<Sixth Step>>

In the sixth step, the processing proceeds to the seventh step when a predetermined event has been supplied in a predetermined period, whereas the processing proceeds to the eighth step when the predetermined event has not been supplied (see (S6) in FIG. 4B). For example, whether the predetermined event is supplied in a predetermined period or not can be a branch condition. Specifically, the predetermined period can be longer than 0 seconds and shorter than or equal to 5 seconds, shorter than or equal to 1 second, shorter than or equal to 0.5 seconds, and preferably shorter than or equal to 0.1 seconds.

<<Seventh Step>>

In the seventh step, the mode is changed (see (S7) in FIG. 4B). Specifically, the mode is changed to the second mode when the first mode has been selected, or the mode is changed to the first mode when the second mode has been selected.

<<Eighth Step>>

In the eighth step, the interrupt processing terminates (see (S8) in FIG. 4B).

<<Predetermined Event>>

For example, the following events can be used: events supplied using a pointing device such as a mouse (e.g., "click" and "drag") and events supplied to a touch panel with a finger or the like used as a pointer (e.g., "tap", "drag", and "swipe").

For example, the position of a slide bar pointed by a pointer, the swipe speed, the drag speed, and the like can be used as arguments assigned to an instruction associated with the predetermined event.

For example, information sensed by the sensor portion 250 is compared to the set threshold, and the compared results can be used for the event.

Specifically, a crown which can be pushed into a housing, a pressure sensor touching the crown, or the like can be used (see FIG. 2B).

Specifically, a photoelectric conversion element provided in a housing can be used (see FIG. 2C).

<<Instruction Associated with Predetermined Event>>

For example, the termination instruction can be associated with a predetermined event.

For example, "page-turning instruction" for switching displayed image information from one to another can be associated with a predetermined event. Note that a parameter for determining the page-turning speed or the like when the "page-turning instruction" is executed can be supplied using the predetermined event.

For example, "scroll instruction" for moving the display position of part of image information and displaying another part continuing from that part can be associated with a predetermined event. Note that a parameter for determining the moving speed of the display position or the like when the "scroll instruction" is executed can be supplied using the predetermined event.

For example, an instruction for generating image information can be associated with a predetermined event. Note that a parameter for determining the brightness of a generated image may be used for the ambient luminance sensed by the sensor portion 250.

For example, an instruction for acquiring information distributed via a push service using the communication portion 290 can be associated with a predetermined event. Note that positional information sensed by the sensor portion 250 may be used for the determination of the presence or absence of a qualification for acquiring information. Specifically, the determination of the presence of a qualification for acquiring information may be taken when the user is in a predetermined class room, school, conference room, office, or building (see FIG. 2C).

Note that this embodiment can be combined with any of the other embodiments in this specification as appropriate.

Embodiment 3

In this embodiment, the configuration of an input/output device of one embodiment of the present invention will be described with reference to FIG. 5.

Figure 5:
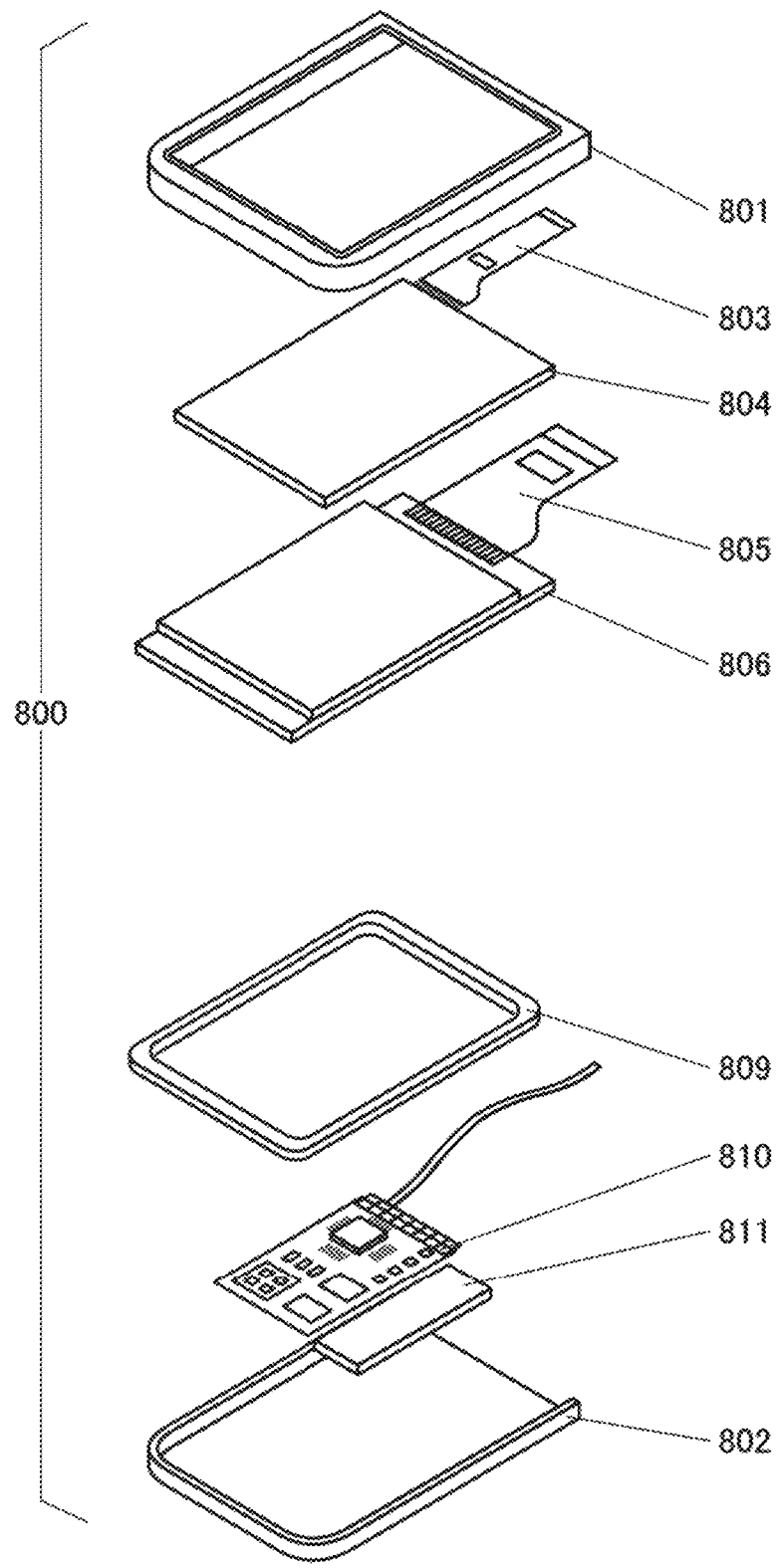
FIG. 5 illustrates the configuration of an input/output device of one embodiment.

FIG. 5 is an exploded view illustrating the configuration of an input/output device 800.

The input/output device 800 includes a display panel 806 and a touch sensor 804 having a region overlapping with the display panel 806. Note that the input/output device 800 can be referred to as a touch panel.

The input/output device 800 includes a driver circuit 810 for driving the touch sensor 804 and the display panel 806, a battery 811 for supplying power to the driver circuit 810, and a housing where the touch sensor 804, the display panel 806, the driver circuit 810, and the battery 811 are stored.

<<Touch Sensor 804>>

The touch sensor 804 includes a region overlapping with the display panel 806. Note that an FPC 803 is electrically connected to the touch sensor 804.

For the touch sensor 804, a resistive touch sensor, a capacitive touch sensor, or a touch sensor using a photoelectric conversion element can be used, for example.

Note that the touch sensor 804 may be used as part of the display panel 806.

<<Display panel 806>>

For example, the display panel described in Embodiment 4 or 6 can be used as the display panel 806. Note that an FPC 805 or the like is electrically connected to the display panel 806.

<<Driver Circuit 810>>

As the driver circuit 810, a power supply circuit or a signal processing circuit can be used, for example. Note that power supplied from the battery or an external commercial power supply can be utilized.

The signal processing circuit is configured to output a video signal, a clock signal, and the like.

The power supply circuit is configured to supply predetermined power.

<<Housing>>

For example, an upper cover 801, a lower cover 802 which fits the upper cover 801, and a frame 809 which is stored in a region surrounded by the upper cover 801 and the lower cover 802 can be used for the housing.

The frame 809 is configured to protect the display panel 806 and block electromagnetic waves generated by the operation of the driver circuit 810, or serves as a radiator plate.

Metal, a resin, an elastomer, or the like can be used for the upper cover 801, the lower cover 802, or the frame 809.

<<Battery 811>>

The battery 811 is configured to supply power.

Note that a member such as a polarizing plate, a retardation plate, or a prism sheet can be used for the input/output device 800.

Note that this embodiment can be combined with any of the other embodiments in this specification as appropriate.

Embodiment 4

In this embodiment, the structure of a display panel of one embodiment of the present invention will be described with reference to FIG. 6A to FIG. 9B2.

FIGS. 6A, 6B1, and 6B2 illustrate the structure of a display panel 700 of one embodiment of the present invention. FIG. 6A is a bottom view of the display panel 700 of one embodiment of the present invention. FIG. 6B1 is a bottom view illustrating part of FIG. 6A. FIG. 6B2 is a bottom view omitting some components illustrated in FIG. 6B1.

FIGS. 7A to 7C illustrate the structure of the display panel 700 of one embodiment of the present invention. FIG. 7A is a cross-sectional view taken along lines X1-X2, X3-X4, X5-X6, X7-X8, X9-X10, and X11-X12 in FIG. 6A. FIG. 7B is a cross-sectional view illustrating the structure of part of the display panel and FIG. 7C is a cross-sectional view illustrating the structure of another part of the display panel.

Figure 8:
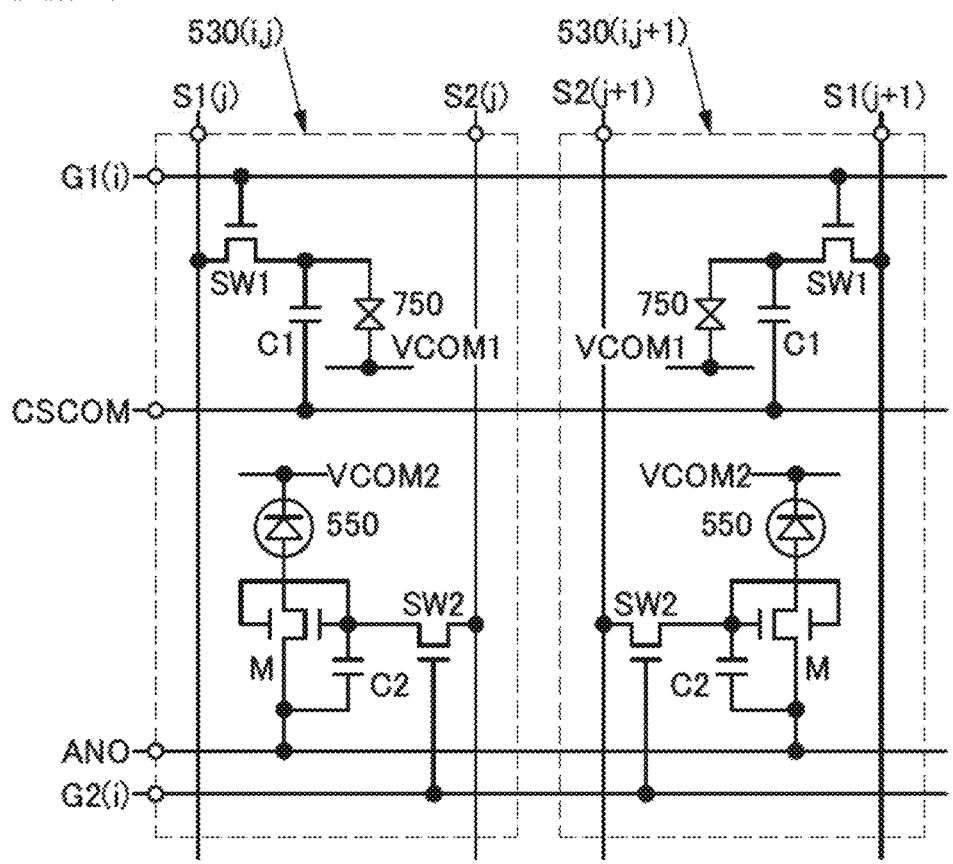
FIG. 8 is a circuit diagram illustrating a pixel circuit of one embodiment.

FIG. 8 illustrates the structure of the display panel 700 of one embodiment of the present invention. FIG. 8 is a circuit diagram of a pixel circuit 530($i$, $j$) and a pixel circuit 530($i$, $j$+1) which can be used as pixel circuits in the display panel 700 of one embodiment of the present invention.

FIGS. 9A, 9B1, and 9B2 illustrate the structure of the display panel 700 of one embodiment of the present invention. FIG. 9A is a block diagram illustrating arrangement of pixels, wirings, or the like which can be used for the display panel 700 of one embodiment of the present invention.

FIGS. 9B1 and 9B2 are schematic views illustrating the arrangement of openings 751H which can be used for the display panel 700 of one embodiment of the present invention.

Structure Example 1 of Display Panel

The display panel 700 described in this embodiment includes a signal line S1($j$) and a pixel 702($i$, $j$) (see FIGS. 6B1 and 6B2).

The pixel 702($i$, $j$) is electrically connected to the signal line S1($j$).

The pixel 702($i$, $j$) includes a first display element 750($i$, $j$), a first conductive film, a second conductive film, an insulating film 501C, the pixel circuit 530($i$, $j$), and a second display element 550($i$, $j$) (see FIG. 7A and FIG. 8).

The first conductive film is electrically connected to the first display element 750($i$, $j$) (see FIG. 7A). For example, the first conductive film can be used for the first electrode 751($i$, $j$) of the first display element 750($i$, $j$).

The second conductive film has a region overlapping with the first conductive film. For example, the second conductive film can be used as a conductive film 512B serving as a source electrode or a drain electrode of a transistor which can be used as a switch SW1.

The insulating film 501C has a region interposed between the second conductive film and the first conductive film.

The pixel circuit 530($i$, $j$) is electrically connected to the second conductive film. For example, the transistor in which the second conductive film is used as the conductive film 512B serving as a source electrode or a drain electrode can be used as the switch SW1 of the pixel circuit 530($i$, $j$) (see FIG. 7A and FIG. 8).

The second display element 550($i$, $j$) is electrically connected to the pixel circuit 530($i$, $j$).

The insulating film 501C includes an opening 591A (see FIG. 7A).

The second conductive film is electrically connected to the first conductive film in the opening 591A. For example, the conductive film 512B is electrically connected to the first electrode 751($i$, $j$) which also serves as the first conductive film.

The pixel circuit 530($i$, $j$) is electrically connected to the signal line S1($j$) (see FIG. 8). Note that the conductive film 512A is electrically connected to the signal line S1($j$) (see FIG. 7A and FIG. 8).

The first electrode 751($i$, $j$) has an edge portion embedded in the insulating film 501C.

Furthermore, the pixel circuit 530($i$, $j$) of the display panel described in this embodiment includes the switch SW1. The switch SW1 includes a transistor that includes an oxide semiconductor.

The second display element 550($i$, $j$) of the display panel described in this embodiment has a viewing angle overlapping with part of a viewing angle of the first display element 750($i$, $j$). In other words, the second display element 550($i$, $j$) is configured to perform display in the same direction as any of display directions of the first display element 750($i$, $j$). For example, a dashed arrow in the drawing denotes the direction in which the first display element 750($i$, $j$) performs display by adjusting the intensity of external light reflection. In addition, a solid arrow in the drawing denotes the direction in which the second display element 550($i$, $j$) performs display (see FIG. 7A).

In addition, the second display element 550($i$, $j$) of the display panel described in this embodiment is configured to perform display in a region surrounded by a region where the first display element 750($i$, $j$) performs display (see FIG. 9B1 or 9B2). Note that the first display element 750($i$, $j$) performs display in a region overlapping with the first electrode 751($i$, $j$) and the second display element 550($i$, $j$) performs display in a region overlapping with the opening 751H.

Furthermore, the first display element 750($i$, $j$) of the display panel described in this embodiment includes a reflective film configured to reflect incident light and is configured to adjust the intensity of the reflected light. The reflective film has the opening 751H. Note that for example, the first conductive film, the first electrode 751($i$, $j$), or the like can be used as the reflective film of the first display element 750($i$, $j$).

Furthermore, the second display element 550(i, j) is configured to emit light toward the opening 751H.

In addition, the display panel described in this embodiment includes the pixel 702(i, j), one group of pixels 702(i, 1) to 702(i, n), another group of pixels 702(1, j) to 702(m, j), and a scan line G1(i) (see FIG. 9A). Note that i is an integer greater than or equal to 1 and less than or equal to m, j is an integer greater than or equal to 1 and less than or equal to n, and each of m and n is an integer greater than or equal to 1.

The display panel described in this embodiment includes a scan line G2(i), a wiring CSCOM, and a wiring ANO.

The one group of pixels 702(i, 1) to 702(i, n) includes the pixel 702(i, j), and is arranged in a row direction (indicated by an arrow R in the drawing).

The other group of pixels 702(1, j) to 702(m, j) includes the pixel 702(i, j), and is arranged in a column direction (indicated by an arrow C in the drawing) intersecting with the row direction.

The scan line G1(i) is electrically connected to the one group of pixels 702(i, 1) to 702(i, n) arranged in the row direction.

The signal line S1(j) is electrically connected to the other group of pixels 702(1, j) to 702(m, j) arranged in the column direction.

For example, the pixel 702(i, j+1) adjacent to the pixel 702(i, j) in the row direction includes an opening in a position different from that of the opening 751H in the pixel 702(i, j) (see FIG. 9B1).

For example, the pixel 702(i+1, j) adjacent to the pixel 702(i, j) in the column direction includes an opening in a position different from that of the opening 751H in the pixel 702(i, j) (see FIG. 9B2). Note that for example, the first electrode 751(i, j) can be used as the reflective film.

The display panel of one embodiment of the present invention includes a first display element, a first conductive film electrically connected to the first display element, a second conductive film having a region overlapping with the first conductive film, an insulating film having a region sandwiched between the second conductive film and the first conductive film, a pixel circuit electrically connected to the second conductive film, and a second display element electrically connected to the pixel circuit. The insulating film has an opening. The second conductive film is electrically connected to the first conductive film in the opening.

Accordingly, the first display element and the second display element which perform display using different methods can be driven, for example, with the pixel circuit which can be formed in the same process. As a result, a novel display panel that is highly convenient or reliable can be provided.

In addition, the display panel described in this embodiment includes a terminal 519B and a conductive film 511B (see FIG. 7A).

The insulating film 501C has a region interposed between the terminal 519B and the conductive film 511B. In addition, the insulating film 501C includes an opening 591B.

The terminal 519B is electrically connected to the conductive film 511B in the opening 591B. In addition, the conductive film 511B is electrically connected to the pixel circuit 530(i, j). Note that for example, when the first electrode 751(i, j) or the first conductive film is used as the reflective film, a surface serving as a contact with the terminal 519B is oriented in the same direction as a surface of the first electrode 751(i, j) that faces light incident to the first display element 750(i, j). Note that a flexible printed circuit FPC1 can be electrically connected to the terminal 519B using, for example, a conductive material ACF1.

Thus, power or signals can be supplied to the pixel circuit through the terminal. As a result, a novel display panel that is highly convenient or reliable can be provided.

In addition, the first display element 750(i, j) of the display panel described in this embodiment includes a layer 753 containing a liquid crystal material, the first electrode 751(i, j), and a second electrode 752. Note that the second electrode 752 is provided so that an electric field for controlling the alignment of the liquid crystal material is generated between the second electrode 752 and the first electrode 751(i, j).

Furthermore, the display panel described in this embodiment includes an alignment film AF1 and an alignment film AF2. The alignment film AF2 is provided so that the layer 753 containing a liquid crystal material is interposed between the alignment films AF1 and AF2.

In addition, the second display element 550(i, j) of the display panel described in this embodiment includes a third electrode 551(i, j), a fourth electrode 552, and a layer 553(j) containing a light-emitting organic compound.

The fourth electrode 552 has a region overlapping with the third electrode 551(i, j). The layer 553(j) containing a light-emitting organic compound is positioned between the third electrode 551 and the fourth electrode 552. The third electrode 551(i, j) is electrically connected to the pixel circuit 530(i, j) in a contact portion 522.

Moreover, the pixel 702(i, j) of the display panel described in this embodiment includes a coloring film CF1, a light-blocking film BM, an insulating film 771, and a functional film 770P.

The coloring film CF1 has a region overlapping with the first display element 750(i, j). The light-blocking film BM has an opening in a region overlapping with the first display element 750(i, j).

The insulating film 771 is positioned between the coloring film CF1 and the layer 753 containing a liquid crystal material or between the light-blocking film BM and the layer 753 containing a liquid crystal material. Thus, unevenness due to the thickness of the coloring film CF1 can be avoided. Alternatively, impurities can be prevented from being diffused from the light-blocking film BM, the coloring film CF1, or the like to the layer 753 containing a liquid crystal material.

The functional film 770P has a region overlapping with the first display element 750(i, j). The functional film 770P is provided so that a substrate 770 is interposed between the functional film 770P and the first display element 750(i, j).

In addition, the display panel described in this embodiment includes a substrate 570, the substrate 770, and a functional layer 520.

The substrate 770 has a region overlapping with the substrate 570. The functional layer 520 is positioned between the substrates 570 and 770.

The functional layer 520 includes the pixel circuit 530(i, j), the second display element 550(i, j), an insulating film 521, and an insulating film 528. Furthermore, the functional layer 520 includes an insulating film 518 and an insulating film 516.

The insulating film 521 is positioned between the pixel circuit 530(i, j) and the second display element 550(i, j).

The insulating film 528 is positioned between the insulating film 521 and the substrate 570 and has an opening in a region overlapping with the second display element 550(i, j). The insulating film 528 along the edge of the third electrode 551 can avoid a short circuit between the third electrode 551 and the fourth electrode 552.

The insulating film 518 has a region positioned between the insulating film 521 and the pixel circuit 530(*i, j*). The insulating film 516 has a region positioned between the insulating film 518 and the pixel circuit 530(*i, j*).

Moreover, the display panel described in this embodiment includes a bonding layer 505, a sealant 705, and a structure body KB1.

The bonding layer 505 is positioned between the functional layer 520 and the substrate 570 and is configured to bond the functional layer 520 and the substrate 570.

The sealant 705 is positioned between the functional layer 520 and the substrate 770 and is configured to bond the functional layer 520 and the substrate 770.

The structure body KB1 is configured to make a predetermined gap between the functional layer 520 and the substrate 770.

In addition, the display panel described in this embodiment includes a terminal 519C, a conductive film 511C, and a conductor CP.

The insulating film 501C has a region interposed between the terminal 519C and the conductive film 511C. In addition, the insulating film 501C has an opening 591C.

The terminal 519C is electrically connected to the conductive film 511C in the opening 591C. In addition, the conductive film 511C is electrically connected to the pixel circuit 530(*i, j*).

The conductor CP is interposed between the terminal 519C and the second electrode 752 for electrically connecting the terminal 519C and the second electrode 752. For example, a conductive particle can be used as the conductor CP.

Moreover, the display panel described in this embodiment includes a driver circuit GD and a driver circuit SD (see FIGS. 6A and 9A).

The driver circuit GD is electrically connected to the scan line G1(*i*). The driver circuit GD includes, for example, a transistor MD. Specifically, a transistor which includes a semiconductor film and can be formed in the same step as the transistor included in the pixel circuit 530(*i, j*) can be used as the transistor MD (see FIGS. 7A and 7C).

The driver circuit SD is electrically connected to the signal line S1(*j*). The driver circuit SD is electrically connected to a terminal using a conductive material, for example. The terminal can be formed in the same step as the terminal 519B or the terminal 519C.

Individual components of the display panel will be described below. Note that these components cannot be clearly distinguished and one component serves as another one or includes part of another one in some cases.

For example, the first conductive film can be used as the first electrode 751(*i, j*). The first conductive film can be used as a reflective film.

In addition, the second conductive film can be used as the conductive film 512B serving as a source electrode or a drain electrode of a transistor.

Structure Example 1

The display panel of one embodiment of the present invention includes the substrate 570, the substrate 770, the structure body KB1, the sealant 705, or the bonding layer 505.

In addition, the display panel of one embodiment of the present invention includes the functional layer 520, the insulating film 521, and the insulating film 528.

In addition, the display panel of one embodiment of the present invention includes the signal line S1(*j*), the signal line S2(*j*), the scan line G1(*i*), the scan line G2(*i*), the wiring CSCOM, and the wiring ANO.

In addition, the display panel of one embodiment of the present invention includes the first conductive film or the second conductive film.

In addition, the display panel of one embodiment of the present invention includes the terminal 519B, the terminal 519C, the conductive film 511B, or the conductive film 511C.

In addition, the display panel of one embodiment of the present invention includes the pixel circuit 530(*i, j*) and the switch SW1.

In addition, the display panel of one embodiment of the present invention includes the first display element 750(*i,j*), the first electrode 751(*i, j*), the reflective film, the opening 751H, the layer 753 containing a liquid crystal material, and the second electrode 752.

In addition, the display panel of one embodiment of the present invention includes the alignment film AF1, the alignment film AF2, the coloring film CF1, the light-blocking film BM, the insulating film 771, and the functional film 770P.

In addition, the display panel of one embodiment of the present invention includes the second display element 550(*i, j*), the third electrode 551(*i, j*), the fourth electrode 552, or the layer 553(*j*) containing a light-emitting organic compound.

Furthermore, the display panel of one embodiment of the present invention includes the insulating film 501C.

In addition, the display panel of one embodiment of the present invention includes the driver circuit GD or the driver circuit SD.

<<Substrate 570>>

The substrate 570 and the like can be formed using a material having heat resistance high enough to withstand heat treatment in the manufacturing process. Specifically, a 0.7-mm-thick non-alkali glass can be used.

For example, a large-sized glass substrate having any of the following sizes can be used as the substrate 570 and the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the substrate 570 and the like, an organic material, an inorganic material, a composite material of an organic material and an inorganic material, or the like can be used. For example, an inorganic material such as glass, ceramic, or a metal can be used for the substrate 570 and the like.

Specifically, non-alkali glass, soda-lime glass, potash glass, crystal glass, quartz, sapphire, or the like can be used for the substrate 570 and the like. Specifically, an inorganic oxide film, an inorganic nitride film, an inorganic oxynitride film, or the like can be used for the substrate 570 and the like. For example, a film of silicon oxide, silicon nitride, silicon oxynitride, aluminum oxide, or the like can be used for the substrate 570 and the like. Stainless steel, aluminum, or the like can be used for the substrate 570 and the like.

For example, a single crystal semiconductor substrate or a polycrystalline semiconductor substrate of silicon or silicon carbide, a compound semiconductor substrate of silicon germanium, or an SOI substrate can be used as the substrate 570 and the like. Thus, a semiconductor element can be formed over the substrate 570 and the like.

For example, an organic material such as a resin, a resin film, or plastic can be used for the substrate 570 and the like. Specifically, a resin film or resin plate of polyester, polyolefin, polyamide, polyimide, polycarbonate, an acrylic resin, or the like can be used for the substrate 570 and the like.

For example, a composite material, such as a resin film to which a metal plate, a thin glass plate, or an inorganic film is bonded can be used for the substrate 570 and the like. For example, a composite material formed by dispersing a fibrous or particulate metal, glass, inorganic material, or the like into a resin film can be used for the substrate 570 and the like. For example, a composite material formed by dispersing a fibrous or particulate resin, organic material, or the like into an inorganic material can be used for the substrate 570 and the like.

A single-layer material or a material in which a plurality of layers are stacked can be used for the substrate 570 and the like. For example, a material in which a base, an insulating film that prevents diffusion of impurities contained in the base, and the like are stacked can be used for the substrate 570 and the like. Specifically, a material in which glass and one or a plurality of films that prevent diffusion of impurities contained in the glass and that are selected from a silicon oxide layer, a silicon nitride layer, a silicon oxynitride layer, and the like are stacked can be used for the substrate 570 and the like. Alternatively, a material in which a resin and a film for preventing diffusion of impurities that penetrate the resin, such as a silicon oxide film, a silicon nitride film, and a silicon oxynitride film are stacked can be used for the substrate 570 and the like.

Specifically, a resin film, a resin plate, a stack, or the like of polyester, polyolefin, polyamide, polyimide, polycarbonate, an acrylic resin, or the like can be used for the substrate 570 and the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the substrate 570 and the like. Alternatively, a film, a plate, a stacked body, or the like which contains any one or more of the resins can be used for the substrate 570 and the like.

Specifically, polyethylene terephthalate (PET), polyethylene naphthalate (PEN), polyethersulfone (PES), acrylic, or the like can be used for the substrate 570 and the like.

Alternatively, paper, wood, or the like can be used for the substrate 570 and the like.

For example, a flexible substrate can be used as the substrate 570 and the like.

Note that a transistor, a capacitor, or the like can be directly formed on the substrate. Alternatively, a transistor, a capacitor, or the like can be formed over a substrate that is for use in manufacturing processes and withstands heat applied in the processes, and then can be transferred to the substrate 570 or the like. Accordingly, a transistor, a capacitor, or the like can be formed over a flexible substrate.

<<Substrate 770>>

For example, a light-transmitting material can be used for the substrate 770. Specifically, a material selected from the materials used for the substrate 570 can be used for the substrate 770. Specifically, a non-alkali glass which is polished to a thickness of approximately 0.7 mm or 0.1 mm can be used.

<<Structure Body KB1>>

For example, an organic material, an inorganic material, or a composite material of an organic material and an inorganic material can be used for the structure body KB1 or the like. Thus, components between which the structure body KB1 or the like is interposed can have a predetermined gap.

Specifically, for the structure body KB1 or the like, polyester, polyolefin, polyamide, polyimide, polycarbonate, polysiloxane, an acrylic resin, or the like, or a composite material of plural kinds of resins selected from these can be used. Alternatively, a photosensitive material may be used.

<<Sealant 705>>

For the sealant 705 or the like, an inorganic material, an organic material, a composite material of an inorganic material and an organic material, or the like can be used.

For example, an organic material such as a thermally fusible resin or a curable resin can be used for the sealant 705 or the like.

For the sealant 705 or the like, an organic material such as a reactive curable adhesive, a photo-curable adhesive, a thermosetting adhesive, and/or an anaerobic adhesive can be used.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the sealant 705 or the like.

<<Bonding Layer 505>>

For example, a material that can be used for the sealant 705 can be used for the bonding layer 505.

<<Insulating Film 521>>

For example, an insulating inorganic material, an insulating organic material, or an insulating composite material containing an inorganic material and an organic material can be used for the insulating film 521 or the like.

Specifically, an inorganic oxide film, an inorganic nitride film, an inorganic oxynitride film, or a material obtained by stacking any of these films can be used for the insulating film 521 or the like. For example, a film including any of a silicon oxide film, a silicon nitride film, a silicon oxynitride film, and an aluminum oxide film, or a film including a material obtained by stacking any of these films can be used for the insulating film 521 or the like.

Specifically, polyester, polyolefin, polyamide, polyimide, polycarbonate, polysiloxane, an acrylic resin, or a stacked or composite material including resins selected from these, or the like can be used for the insulating film 521 or the like. Alternatively, a photosensitive material may be used.

Thus, for example, steps due to components overlapping with the insulating film 521 can be eliminated.

<<Insulating Film 528>>

For example, a material that can be used for the insulating film 521 can be used for the insulating film 528 or the like. Specifically, a 1-μm-thick film containing polyimide can be used for the insulating film 528.

<<Insulating Film 501C>>

For example, the material that can be used for the insulating film 521 can be used for the insulating film 501C. Specifically, a material containing silicon and oxygen can be used for the insulating film 501C. Thus, impurity diffusion into the pixel circuit or the second display element can be suppressed.

For example, a 200-nm-thick film containing silicon, oxygen, and nitrogen can be used as the insulating film 501C.

Note that the insulating film 501C includes the openings 591A, 591B, and 591C.

<<Wiring, Terminal, Conductive Film>>

A conductive material can be used for a wiring or the like. Specifically, the conductive material can be used for the signal line S1(j), the signal line S2(j), the scan line G1(i), the scan line G2(i), the wiring CSCOM, the wiring ANO, the terminal 519B, the terminal 519C, the conductive film 511B, the conductive film 511C, or the like.

For example, an inorganic conductive material, an organic conductive material, a metal material, a conductive ceramic material, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese, or the like can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used for the wiring or the like.

Specifically, a conductive oxide such as indium oxide, indium tin oxide, indium zinc oxide, zinc oxide, or zinc oxide to which gallium is added can be used for the wiring or the like.

Specifically, a film containing graphene or graphite can be used for the wiring or the like.

For example, a film including graphene oxide is formed and is reduced, so that a film including graphene can be formed. As a reducing method, a method using heat, a method using a reducing agent, or the like can be employed.

Specifically, a conductive high molecule can be used for the wiring or the like.

<<First Conductive Film, Second Conductive Film>>

For example, the material that can be used for the wiring or the like can be used for the first conductive film or the second conductive film.

The first electrode 751(i, j), the wiring, or the like can be used for the first conductive film.

The conductive film 512B, the wiring, or the like of the transistor that can be used as the switch SW1 can be used as the second conductive film.

<<Pixel Circuit 530(i, j)>>

The pixel circuit 530(i, j) is electrically connected to the signal line S1(j), the signal line S2(j), the scan line G1(i), the scan line G2(i), the wiring CSCOM, and the wiring ANO (see FIG. 8).

The pixel circuit 530(i, j+1) is electrically connected to a signal line S1(j+1), a signal line S2(i+1), a scan line G1(i), a scan line G2(i), the wiring CSCOM, and the wiring ANO.

Note that in the case where a voltage used as a signal supplied to the signal line S2(j) is different from a voltage used as a signal supplied to the signal line S1(j+1), the signal line S1(i+1) is positioned apart from the signal line S2(j). Specifically, the signal line S2(j+1) is positioned adjacent to the signal line S2(j).

The pixel circuit 530(i, j) includes the switch SW1, a capacitor C1, a switch SW2, a transistor M, and a capacitor C2.

For example, a transistor including a gate electrode electrically connected to the scan line G1(i) and a first electrode electrically connected to the signal line S1(j) can be used as the switch SW1.

The capacitor C1 includes a first electrode electrically connected to a second electrode of the transistor used as the switch SW1 and a second electrode electrically connected to the wiring CSCOM.

For example, a transistor that includes a gate electrode electrically connected to the scan line G2(i) and includes a first electrode electrically connected to the signal line S2(j) can be used as the switch SW2.

The transistor M includes a gate electrode electrically connected to the second electrode of the transistor used as the switch SW2, and a first electrode electrically connected to the wiring ANO.

Note that a transistor that includes a semiconductor film provided between a gate electrode and a conductive film can be used as the transistor M. For example, a conductive film electrically connected to a wiring that can supply the same potential as the first electrode of the transistor M can be used.

The capacitor C2 includes a first electrode electrically connected to a second electrode of a transistor used as the switch SW2 and a second electrode electrically connected to the first electrode of the transistor M.

Note that the first electrode of the first display element 750 is electrically connected to the second electrode of the transistor used as the switch SW1, and the second electrode of the first display element 750 is electrically connected to the wiring VCOM1. Accordingly, the first display element 750 can be driven.

In addition, the first electrode of the second display element 550 is electrically connected to the second electrode of the transistor M and the second electrode of the second display element 550 is electrically connected to the wiring VCOM2. Accordingly, the second display element 550 can be driven.

<<Switch SW1, Switch SW2, Transistor M, Transistor MD>>

For example, a bottom-gate transistor, a top-gate transistor, or the like can be used as the switch SW1, the switch SW2, the transistor M, the transistor MD, or the like.

For example, a transistor using a semiconductor film containing an element of Group 14 for a semiconductor film can be used. Specifically, a semiconductor containing silicon can be used for the semiconductor film. For example, single crystal silicon, polysilicon, microcrystalline silicon, amorphous silicon, or the like can be used for the semiconductor film of the transistor.

For example, a transistor using an oxide semiconductor for a semiconductor film can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used as the switch SW1, the switch SW2, the transistor M, the transistor MD, or the like. Specifically, a transistor using an oxide semiconductor for a semiconductor film 508 can be used as the switch SW1, the switch SW2, the transistor M, the transistor MD, or the like.

Thus, a pixel circuit can hold an image signal for a longer time than a pixel circuit including a transistor that uses amorphous silicon for a semiconductor film. Specifically, the selection signal can be supplied with a frequency of lower than 30 Hz, preferably lower than 1 Hz, and more preferably less than once per minute while flickering is suppressed. Consequently, eyestrain on a user of the information processing device can be reduced, and power consumption for driving can be reduced.

The transistor that can be used as the switch SW1 includes the semiconductor film 508 and the conductive film 504 having a region overlapping with the semiconductor film 508 (see FIG. 7B). Furthermore, the transistor that can be used as the switch SW1 includes the conductive film 512A and the conductive film 512B.

Note that the conductive film 504 and the insulating film 506 serve as a gate electrode and a gate insulating film, respectively. Furthermore, the conductive film 512A has one of a function as a source electrode and a function as a drain electrode, and the conductive film 512B has the other.

In addition, a transistor that includes the semiconductor film 508 provided between the conductive film 504 and the conductive film 524 can be used as the transistor M (see FIG. 7C).

A conductive film in which a 10-nm-thick film containing tantalum and nitrogen and a 300-nm-thick film containing copper are stacked in this order can be used as the conductive film 504.

A material in which a 400-nm-thick film containing silicon and nitrogen and a 200-nm-thick film containing silicon, oxygen, and nitrogen are stacked can be used for the insulating film 506.

A 25-nm-thick film containing indium, gallium, and zinc can be used as the semiconductor film 508.

A conductive film in which a 50-nm-thick film containing tungsten, a 400-nm-thick film containing aluminum, and a 100-nm-thick film containing titanium are stacked in this order can be used as the conductive film 512A or 512B.

<<First Display Element 750(i, j)>>

For example, a display element having a function of controlling transmission or reflection of light can be used as the first display element 750(i, j) or the like. For example, a combined structure of a liquid crystal element and a polarizing plate or a MEMS shutter display element can be used. The use of a reflective display element can reduce the power consumption of a display panel. Specifically, a reflective liquid crystal display element can be used as the first display element 750(i, j).

Specifically, a liquid crystal element driven in any of the following driving modes can be used: an in-plane-switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

For example, thermotropic liquid crystal, low-molecular liquid crystal, high-molecular liquid crystal, polymer dispersed liquid crystal, ferroelectric liquid crystal, anti-ferroelectric liquid crystal, or the like can be used. A liquid crystal material that exhibits a cholesteric phase, a smectic phase, a cubic phase, a chiral nematic phase, an isotropic phase, or the like can be used. Alternatively, a liquid crystal material that exhibits a blue phase can be used.

<<First Electrode 751(i, j)>>

For example, the material of the wiring or the like can be used for the first electrode 751(i, j). Specifically, a reflective film can be used for the first electrode 751(i, j).

<<Reflective Film>>

For example, a material reflecting visible light can be used for the reflective film Specifically, a material containing silver can be used for the reflective film. For example, a material containing silver, palladium, and the like or a material containing silver, copper, and the like can be used for the reflective film.

The reflective film reflects, for example, light passing through the layer 753 containing a liquid crystal material. This allows the first display element 750 to serve as a reflective liquid crystal element. Alternatively, a material with an uneven surface can be used for the reflective film. In that case, incident light can be reflected in various directions so that a white image can be displayed.

Note that one embodiment of the present invention is not limited to the structure in which the first electrode 751(i, j) is used as the reflective film. For example, a structure in which the reflective film is positioned between the layer 753 containing a liquid crystal material and the first electrode 751(i,j) can be used. Alternatively, a structure in which the first electrode 751(i,j) having light-transmitting properties is positioned between the reflective film and the layer 753 containing a liquid crystal material can be used.

<<Opening 751H>>

If the ratio of the total area of the opening 751H to the total area except for the opening is too high, display performed using the first display element 750(i, j) is dark. If the ratio of the total area of the opening 751H to the total area except for the opening is too low, display performed using the second display element 550(i, j) is dark.

Also, if the area of the opening 751H in the reflective film is too small, light emitted from the second display element 550(i, j) is not efficiently extracted.

The opening 751H may have a polygonal shape, a quadrangular shape, an elliptical shape, a circular shape, a cross-like shape, or the like. The opening 751H may also have a stripe shape, a slit-like shape, or a checkered pattern. The opening 751H may be positioned close to an adjacent pixel. Preferably, the opening 751H is positioned close to another pixel configured to emit light of the same color. In that case, a phenomenon in which light emitted from the second display element 550 enters a coloring film of the adjacent pixel (also called cross talk), can be suppressed.

<<Second Electrode 752>>

For example, a material having a visible-light transmitting property and conductivity can be used for the second electrode 752.

For example, a conductive oxide, a metal film thin enough to transmit light, or a metal nanowire can be used as the second electrode 752.

Specifically, a conductive oxide containing indium can be used for the second electrode 752. Alternatively, a metal thin film with a thickness more than or equal to 1 nm and less than or equal to 10 nm can be used for the second electrode 752. Further alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<<Alignment Films AF1 and AF2>>

For example, the alignment films AF1 and AF2 can be formed with a material containing polyimide or the like.

Specifically, it is possible to use a material formed to be aligned in a predetermined direction by a rubbing process or an optical alignment process.

For example, a film containing soluble polyimide can be used as the alignment film AF1 or AF2.

<<Coloring Film CF1>>

A material transmitting light of a predetermined color can be used for the coloring film CF1. Thus, the coloring film CF1 can be used as, for example, a color filter.

For example, a material transmitting light of blue, green, red, yellow, or white can be used for the coloring film CF1.

<<Light-Blocking Film BM>>

A material that prevents light transmission can be used for the light-blocking film BM.

Thus, the light-blocking film BM can be used as, for example, a black matrix.

<<Insulating Film 771>>

For example, polyimide, epoxy resin, acrylic resin, or the like can be used for the insulating film 771.

<<Functional Film 770P>>

For example, a polarizing plate, a retardation plate, a diffusing film, an anti-reflective film, a condensing film, or the like can be used as the functional film 770P. Alternatively, a polarizing plate containing a dichromatic pigment can be used as the functional film 770P.

Alternatively, an antistatic film preventing the attachment of dust, a water repellent film suppressing the attachment of stain, a hard coat film suppressing generation of a scratch in use, or the like can be used as the functional film 770P.

<<Second Display Element 550(i, j)>>

For example, a light-emitting element can be used as the second display element 550(i, j). Specifically, an organic electroluminescence element, an inorganic electroluminescence element, a light-emitting diode, or the like can be used for the second display element 550(i, j).

For example, a stack body for emitting blue light, green light, or red light can be used as the layer 553(j) containing a light-emitting organic compound.

For example, a stack body extending linearly in the column direction along the signal line S1(j) can be used as the layer 553(j) containing a light-emitting organic compound. In addition, a stack body that extends linearly in the column direction along the signal line S1(j+1) and emits light of a color different from that of the layer 553(j) containing a light-emitting organic compound can be used as the layer 553(j+1) containing a light-emitting organic compound.

Alternatively, for example, a stack body for emitting white light can be used as the layer 553(j) containing a light-emitting organic compound and the layer 553(j+1) containing a light-emitting organic compound. Specifically, a stack of a layer containing a light-emitting organic compound containing a fluorescent material that emits blue light, and a layer containing a material that is other than the fluorescent material and that emits green light and red light, or a layer containing a material that is other than the fluorescent material and that emits yellow light can be used as the layer 553(j) containing a light-emitting organic compound and the layer 553(j+1) containing a light-emitting organic compound.

For example, a material that can be used for the wiring or the like can be used for the third electrode 551(i, j) or the fourth electrode 552.

For example, a material that transmits visible light and is selected from the materials used for the wiring or the like can be used for the third electrode 551(i, j).

Specifically, conductive oxide, indium-containing conductive oxide, indium oxide, indium tin oxide, indium zinc oxide, zinc oxide, zinc oxide to which gallium is added, or the like can be used for the third electrode 551(i, j). Alternatively, a metal film that is thin enough to transmit light can be used as the third electrode 551(i, j).

For example, a material that reflects visible light and is selected from the materials used for the wiring or the like can be used for the fourth electrode 552.

<<Driver Circuit GD>>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed at the same step as the transistor M can be used.

The transistor MD can have a structure different from that of the transistor used as the switch SW1. Specifically, a transistor including the conductive film 524 can be used as the transistor MD (see FIG. 7C).

The semiconductor film 508 is positioned between the conductive film 504 and the conductive film 524, the insulating film 516 is positioned between the conductive film 524 and the semiconductor film 508, and the insulating film 506 is positioned between the semiconductor film 508 and the conductive film 504. For example, the conductive film 524 is electrically connected to a wiring supplying the same potential as that supplied to the conductive film 504.

Note that the transistor MD can have the same structure as the transistor M.

<<Driver Circuit SD>>

For example, an integrated circuit can be used in the driver circuit SD. Specifically, an integrated circuit formed on a silicon substrate can be used as the driver circuit SD.

For example, a chip on glass (COG) method can be used to mount the driver circuit SD on a pad electrically connected to the pixel circuit 530(i, j). Specifically, an anisotropic conductive film can be used to mount the integrated circuit on the pad.

Note that the pad can be formed in the same step as the terminal 519B or 519C.

Structure Example 2 of Display Panel

Figure 10A:
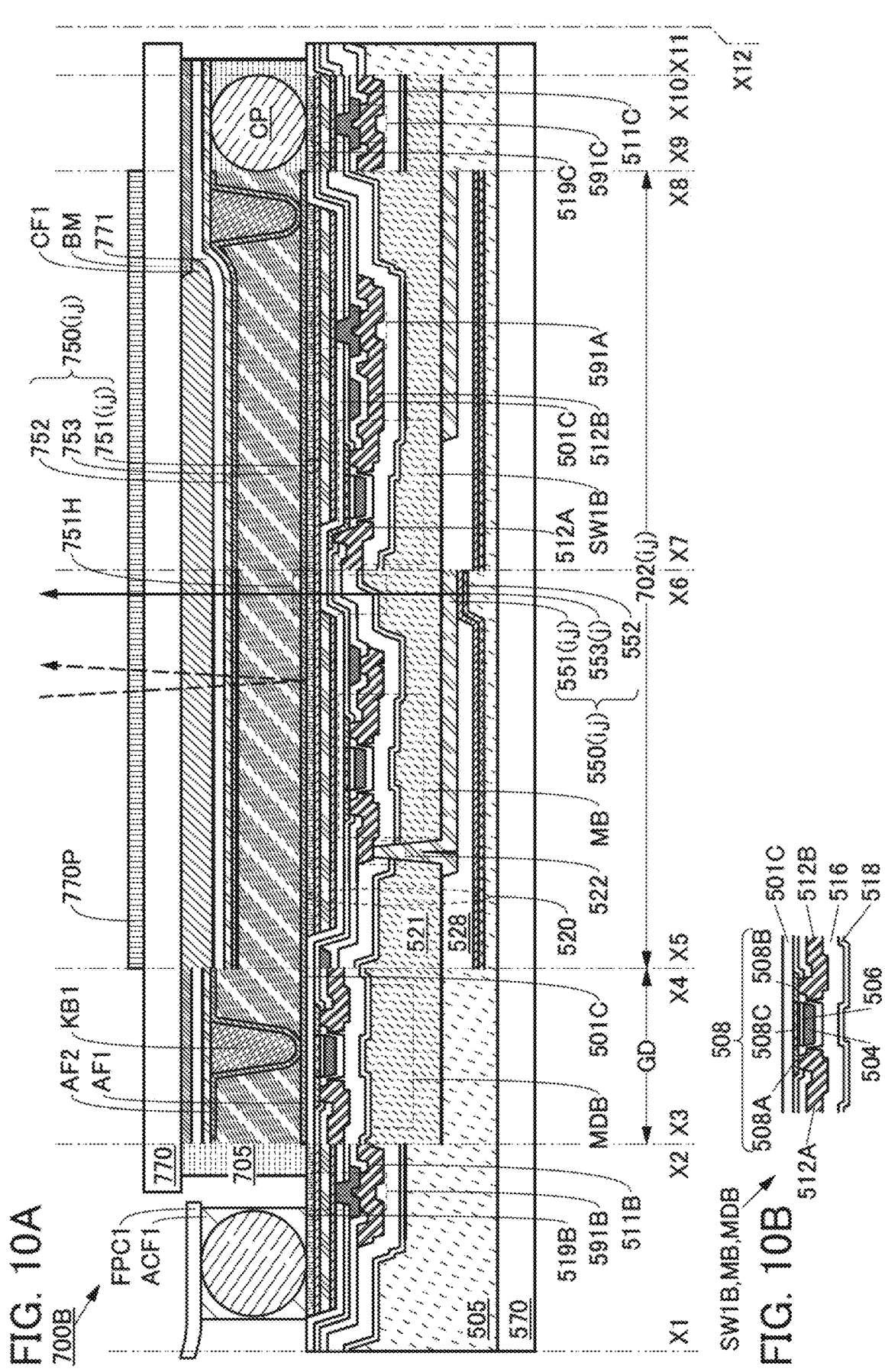
FIGS. 10A and 10B illustrate the structure of a display panel of one embodiment.
Figure 10B:
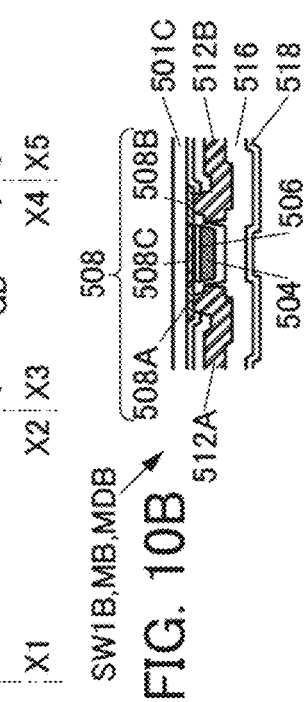

FIGS. 10A and 10B illustrate the structure of a display panel 700B of one embodiment of the present invention. FIG. 10A is a cross-sectional view taken along lines X1-X2, X3-X4, X5-X6, X7-X8, X9-X10, and X11-X12 in FIG. 6A. FIG. 10B is a cross-sectional view illustrating part of the display panel.

Note that the display panel 700B is different from the display panel 700 in FIGS. 7A to 7C in including a top-gate transistor instead of the bottom-gate transistor. Described below are different structures, and the above description is referred to for similar structures.

<<Switch SW1B, Transistor MB, and Transistor MDB>>

A transistor that can be used as a switch SW1B, and transistors MB and MDB include the conductive film 504 having a region overlapping with the insulating film 501C and the semiconductor film 508 having a region positioned between the insulating film 501C and the conductive film 504. Note that the conductive film 504 serves as a gate electrode (see FIG. 10B).

The semiconductor film 508 includes a first region 508A, a second region 508B, and a third region 508C. The first region 508A and the second region 508B do not overlap with the conductive film 504. The third region 508C lies between the first region 508A and the second region 508B and overlaps with the conductive film 504.

The transistor MDB includes the insulating film 506 between the third region 508C and the conductive film 504. Note that the insulating film 506 serves as a gate insulating film.

The first region 508A and the second region 508B have a lower resistivity than the third region 508C, and serve as a source region or a drain region.

Note that the first region 508A and the second region 508B can be formed in the semiconductor film 508 by, for example, a method for controlling the resistivity of the oxide semiconductor, which is described in detail in the end of this embodiment. Specifically, plasma treatment using a gas containing a rare gas can be employed.

Furthermore, for example, the conductive film 504 can be used as a mask, in which case the shape of part of the third region 508C can be the same as the shape of an end portion of the conductive film 504 in a self-aligned manner.

The transistor MDB includes the conductive films 512A and 512B which are in contact with the first region 508A and the second region 508B, respectively. The conductive films 512A and 512B serve as a source electrode or a drain electrode.

The transistor that can be formed in the same process as the transistor MDB can be used as the transistor MB.

<Method for Controlling Resistivity of Oxide Semiconductor>

The method for controlling the resistivity of an oxide semiconductor film will be described.

An oxide semiconductor film with a certain resistivity can be used for the semiconductor film 508 or the conductive film 524.

For example, the resistivity of an oxide semiconductor film can be controlled by a method for controlling the concentration of impurities such as hydrogen and water contained in the oxide semiconductor film and/or the oxygen vacancies in the film.

Specifically, plasma treatment can be used as a method for increasing or decreasing the concentration of impurities such as hydrogen and water and/or the oxygen vacancies in the film.

Specifically, plasma treatment using a gas containing one or more kinds selected from a rare gas (He, Ne, Ar, Kr, Xe), hydrogen, boron, phosphorus, and nitrogen can be employed. For example, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, or plasma treatment in a nitrogen atmosphere can be employed. Thus, the oxide semiconductor film can have a high carrier density and a low resistivity.

Alternatively, hydrogen, boron, phosphorus, or nitrogen is added to the oxide semiconductor film by an ion implantation method, an ion doping method, a plasma immersion ion implantation method, or the like, so that the oxide semiconductor film can have a low resistivity.

Alternatively, an insulating film containing hydrogen is formed in contact with the oxide semiconductor film, and the hydrogen is diffused from the insulating film to the oxide semiconductor film, so that the oxide semiconductor film can have a high carrier density and a low resistivity.

For example, an insulating film with a hydrogen concentration of greater than or equal to $1\times10^{22}$ atoms/cm$^3$ is formed in contact with the oxide semiconductor film, in which case hydrogen can be effectively supplied to the oxide semiconductor film Specifically, a silicon nitride film can be used as the insulating film formed in contact with the oxide semiconductor film.

Hydrogen contained in the oxide semiconductor film reacts with oxygen bonded to a metal atom to be water, and an oxygen vacancy is formed in a lattice from which oxygen is released (or a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Thus, the oxide semiconductor film can have a high carrier density and a low resistivity.

Specifically, an oxide semiconductor with a hydrogen concentration measured by secondary ion mass spectrometry (SIMS) of greater than or equal to $8\times10^{19}$ atoms/cm$^3$, preferably greater than or equal to $1\times10^{20}$ atoms/cm$^3$, more preferably greater than or equal to $5\times10^{20}$ atoms/cm$^3$ can be suitably used for the conductive film 524.

On the other hand, an oxide semiconductor with a high resistivity can be used for a semiconductor film where a channel of a transistor is formed, specifically, for the semiconductor film 508.

For example, an insulating film containing oxygen, i.e., an insulating film capable of releasing oxygen, is formed in contact with an oxide semiconductor film, and the oxygen is supplied from the insulating film to the oxide semiconductor film, so that oxygen vacancies in the film or at the interface can be filled. Thus, the oxide semiconductor film can have a high resistivity.

For example, a silicon oxide film or a silicon oxynitride film can be used as the insulating film capable of releasing oxygen.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8\times10^{11}$/cm$^3$, preferably lower than $1\times10^{11}$/cm$^3$, further preferably lower than $1\times10^{10}$/cm$^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, a transistor including the highly purified intrinsic or substantially highly purified intrinsic oxide semiconductor film has an extremely low off-state current; even when an element has a channel width of $1\times10^6$ μm and a channel length L of 10 μm, the off-state current can be lower than or equal to the measurement limit of a semiconductor parameter analyzer, that is, lower than or equal to $1\times10^{-13}$ A, at a voltage (drain voltage) between a source electrode and a drain electrode of from 1 V to 10 V.

The transistor including a channel region formed in the oxide semiconductor film that is a highly purified intrinsic or substantially highly purified intrinsic oxide semiconductor film can have a small change in electrical characteristics and high reliability.

Specifically, an oxide semiconductor has a hydrogen concentration which is measured by secondary ion mass spectrometry (SIMS) of lower than or equal to $2\times10^{20}$ atoms/cm$^3$, preferably lower than or equal to $5\times10^{19}$ atoms/cm$^3$, more preferably lower than or equal to $1\times10^{19}$ atoms/cm$^3$, more preferably lower than $5\times10^{18}$ atoms/cm$^3$, more preferably lower than or equal to $1\times10^{18}$ atoms/cm$^3$, more preferably lower than or equal to $5\times10^{17}$ atoms/cm$^3$, more preferably lower than or equal to $1\times10^{16}$ atoms/cm$^3$ can be favorably used for a semiconductor where a channel of a transistor is formed.

Note that an oxide semiconductor film that has a higher hydrogen concentration and/or a larger number of oxygen vacancies and that has a lower resistivity than the semiconductor film 508 is used as the conductive film 524.

Furthermore, a film whose hydrogen concentration is twice or more, preferably ten times or more that in the semiconductor film 508 can be used as in the conductive film 524.

Moreover, a film whose resistivity is higher than or equal to $1\times10^{-8}$ times and lower than $1\times10^{-1}$ times the resistivity of the semiconductor film 508 can be used as the conductive film 524.

Specifically, a film with a resistivity higher than or equal to $1\times10^{-3}$ Ωcm and lower than $1\times10^{4}$ Ωcm, preferably higher than or equal to $1\times10^{-3}$ Ωcm and lower than $1\times10^{-1}$ Ωcm can be used as the conductive film 524.

Note that this embodiment can be combined with any of the other embodiments in this specification as appropriate.

Embodiment 5

<Composition of CAC-OS>

Described below is the composition of a cloud aligned complementary oxide semiconductor (CAC-OS) applicable to a transistor in the display panel or the like disclosed in one embodiment of the present invention.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in an active layer of a transistor is called an oxide semiconductor in some cases. In other words, an OS FET is a transistor including a metal oxide or an oxide semiconductor.

In this specification, a metal oxide in which regions functioning as a conductor and regions functioning as a dielectric are mixed and which functions as a semiconductor as a whole is defined as a CAC-OS or a CAC-metal oxide.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 0.5 nm and less than or equal to 3 nm, or a similar size. Note that in the following description of an oxide semiconductor, a state in which one or more elements are unevenly distributed and regions including the element(s) are mixed is referred to as a mosaic pattern or a patch-like pattern. The region has a size of greater than or equal to 0.5 nm and less than or equal to 10 nm, preferably greater than or equal to 0.5 nm and less than or equal to 3 nm, or a similar size.

The physical properties of a region including an unevenly distributed element are determined by the properties of the element. For example, a region including an unevenly distributed element which relatively tends to serve as an insulator among elements included in a metal oxide serves as a dielectric region. In contrast, a region including an unevenly distributed element which relatively tends to serve as a conductor among elements included in a metal oxide serves as a conductive region. A material in which conductive regions and dielectric regions are mixed to form a mosaic pattern serves as a semiconductor.

That is, a metal oxide in one embodiment of the present invention is a kind of matrix composite or metal matrix composite, in which materials having different physical properties are mixed.

Note that an oxide semiconductor preferably contains at least indium. In particular, indium and zinc are preferably contained. In addition, an element M (M is one or more of gallium, aluminum, silicon, boron, yttrium, copper, vanadium, beryllium, titanium, iron, nickel, germanium, zirconium, molybdenum, lanthanum, cerium, neodymium, hafnium, tantalum, tungsten, magnesium, and the like) may be contained.

For example, of the CAC-OS, an In—Ga—Zn oxide with the CAC composition (such an In—Ga—Zn oxide may be particularly referred to as CAC-IGZO) has a composition in which materials are separated into indium oxide (InO$_{X1}$, where X1 is a real number greater than 0) or indium zinc oxide (In$_{X2}$Zn$_{Y2}$O$_{Z2}$, where X2, Y2, and Z2 are real numbers greater than 0), and gallium oxide (GaO$_{X3}$, where X3 is a real number greater than 0), gallium zinc oxide (Ga$_{X4}$Zn$_{Y4}$O$_{Z4}$, where X4, Y4, and Z4 are real numbers greater than 0), or the like, and a mosaic pattern is formed. Then, InO$_{X1}$ and In$_{X2}$Zn$_{Y2}$O$_{Z2}$ forming the mosaic pattern are evenly distributed in the film. This composition is also referred to as a cloud-like composition.

That is, the CAC-OS is a composite oxide semiconductor with a composition in which a region including GaO$_{X3}$ as a main component and a region including In$_{X2}$Zn$_{Y2}$O$_{Z2}$ or InO$_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by InGaO$_3$(ZnO)$_{m1}$ (m1 is a natural number) and a crystalline compound represented by In$_{(1+x0)}$Ga$_{(1-x0)}$O$_3$(ZnO)$_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including GaO$_{X3}$ as a main component and the region including In$_{X2}$Zn$_{Y2}$O$_{Z2}$ or InO$_{X1}$ as a main component is not clearly observed in some cases.

In the case where one or more of aluminum, silicon, boron, yttrium, copper, vanadium, beryllium, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected element(s) as a main component(s) are observed in part of the CAC-OS and nanoparticle regions including In as a main component are observed in part thereof, and these nanoparticle regions are randomly dispersed to form a mosaic pattern in the CAC-OS.

<Analysis of CAC-OS>

Next, measurement results of an oxide semiconductor over a substrate by a variety of methods are described.

<<Structure of Samples and Formation Method Thereof>>

Nine samples of one embodiment of the present invention are described below. The samples are formed at different substrate temperatures and with different ratios of an oxygen gas flow rate in formation of the oxide semiconductor. Note that each sample includes a substrate and an oxide semiconductor over the substrate.

A method for forming the samples is described.

A glass substrate is used as the substrate. Over the glass substrate, a 100-nm-thick In—Ga—Zn oxide is formed as an oxide semiconductor with a sputtering apparatus. The formation conditions are as follows: the pressure in a chamber is 0.6 Pa, and an oxide target (with an atomic ratio of In:Ga:Zn=4:2:4.1) is used as a target. The oxide target provided in the sputtering apparatus is supplied with an AC power of 2500 W.

As for the conditions in the formation of the oxide of the nine samples, the substrate temperature is set to a temperature that is not increased by intentional heating (hereinafter such a temperature is also referred to as room temperature or R.T.), to 130° C., and to 170° C. The ratio of a flow rate of an oxygen gas to a flow rate of a mixed gas of Ar and oxygen (also referred to as an oxygen gas flow rate ratio) is set to 10%, 30%, and 100%.

<<Analysis by X-Ray Diffraction>>

Figure 18:
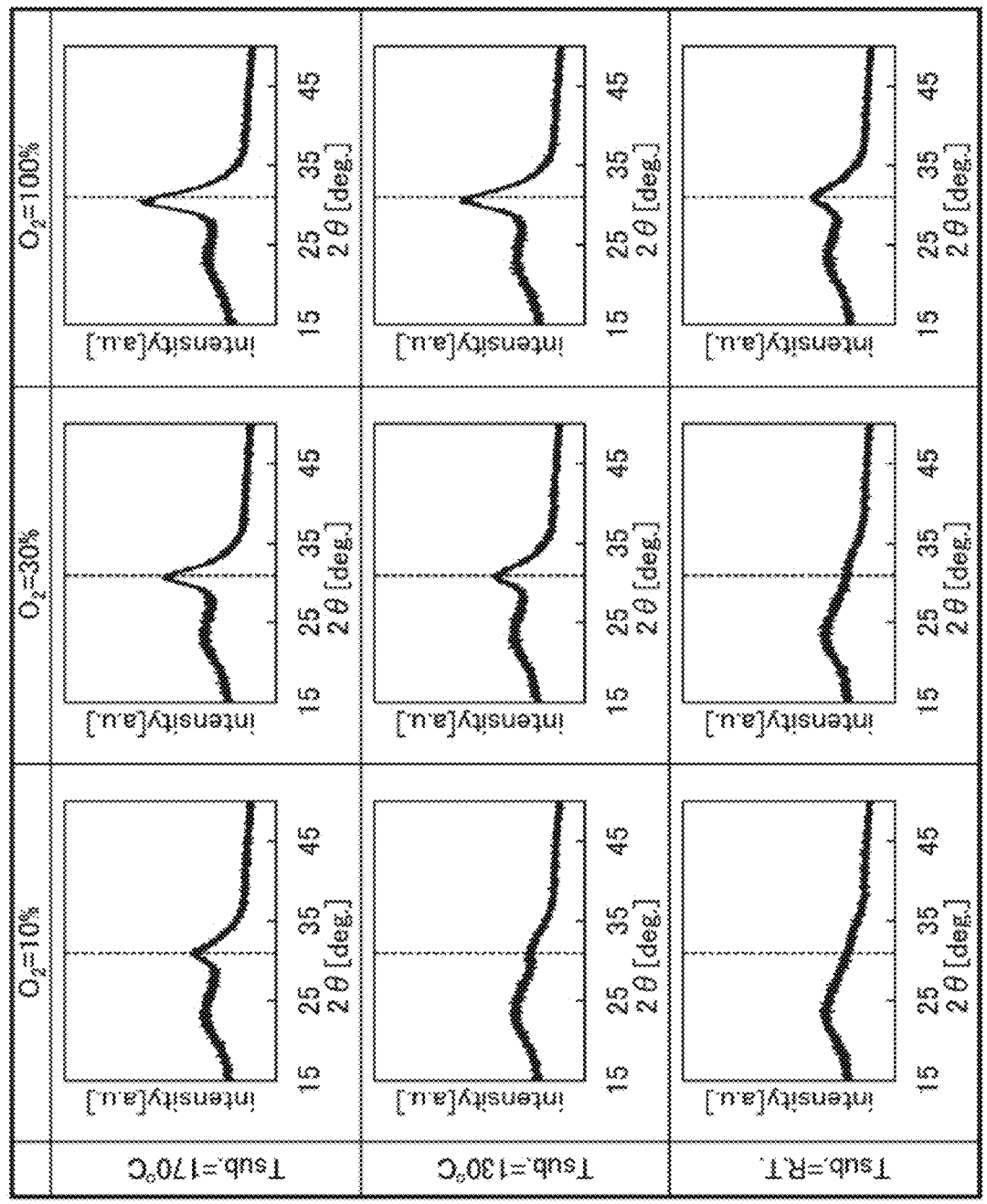
FIG. 18 shows measured XRD spectra of samples of one embodiment.

In this section, results of X-ray diffraction (XRD) measurement performed on the nine samples are described. As an XRD apparatus, D8 ADVANCE manufactured by Bruker AXS is used. The conditions are as follows: scanning is performed by an out-of-plane method at θ/2θ, the scanning range is 15 deg. to 50 deg., the step width is 0.02 deg., and the scanning speed is 3.0 deg./min FIG. 18 shows XRD spectra measured by an out-of-plane method. In FIG. 18, the top row shows the measurement results of the samples formed at a substrate temperature of 170° C.; the middle row shows the measurement results of the samples formed at a substrate temperature of 130° C.; the bottom row shows the measurement results of the samples formed at a substrate temperature of R.T. The left column shows the measurement results of the samples formed with an oxygen gas flow rate ratio of 10%; the middle column shows the measurement results of the samples formed with an oxygen gas flow rate ratio of 30%; the right column shows the measurement results of the samples formed with an oxygen gas flow rate ratio of 100%.

In the XRD spectra shown in FIG. 18, the higher the substrate temperature at the time of formation is or the higher the oxygen gas flow rate ratio at the time of formation is, the higher the intensity of the peak at around 2θ=31° is. Note that it is found that the peak at around 2θ=31° is derived from a crystalline IGZO compound whose c-axes are aligned in a direction substantially perpendicular to a formation surface or a top surface of the crystalline IGZO compound (such a compound is also referred to as c-axis aligned crystalline (CAAC) IGZO).

As shown in the XRD spectra in FIG. 18, as the substrate temperature at the time of formation is lower or the oxygen gas flow rate ratio at the time of formation is lower, a peak becomes less clear. Accordingly, it is found that there are no alignment in the a-b plane direction and c-axis alignment in the measured areas of the samples that are formed at a lower substrate temperature or with a lower oxygen gas flow rate ratio.

<<Analysis with Electron Microscope>>

This section describes the observation and analysis results of the samples formed at a substrate temperature of R.T. and with an oxygen gas flow rate ratio of 10% with a high-angle annular dark-field scanning transmission electron microscope (HAADF-STEM). An image obtained with an HAADF-STEM is also referred to as a TEM image.

Described are the results of image analysis of plan-view images and cross-sectional images obtained with an HAADF-STEM (also referred to as plan-view TEM images and cross-sectional TEM images, respectively). The TEM images are observed with a spherical aberration corrector function. The HAADF-STEM images are obtained using an atomic resolution analytical electron microscope JEM-ARM200F manufactured by JEOL Ltd. under the following conditions: the acceleration voltage is 200 kV, and irradiation with an electron beam with a diameter of approximately 0.1 nm is performed.

Figure 19A:
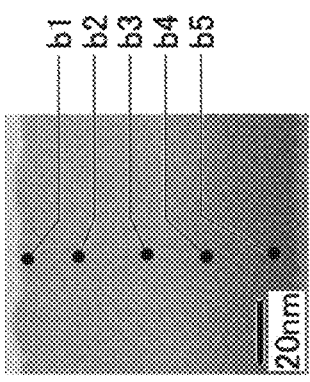
FIGS. 19A and 19B are TEM images of samples of one embodiment and FIGS. 19C to 19L are electron diffraction patterns thereof.
Figure 19B:
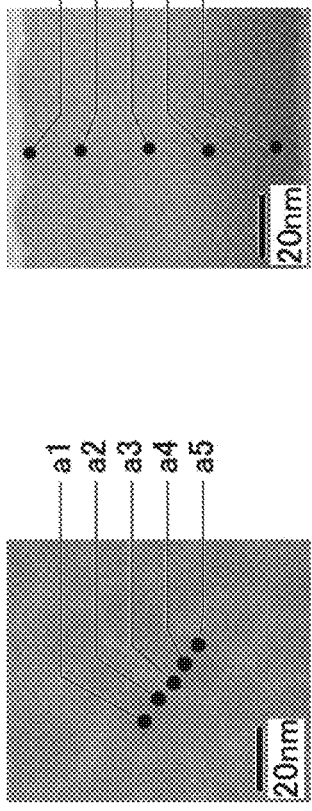
Figure 19C:
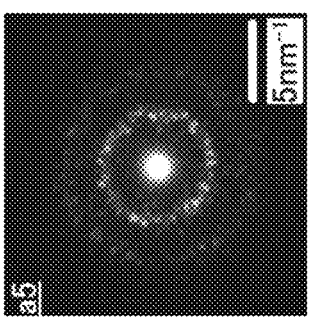
Figure 19D:
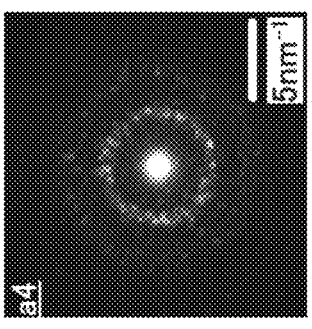
Figure 19E:
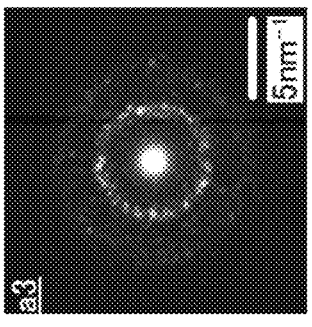
Figure 19F:
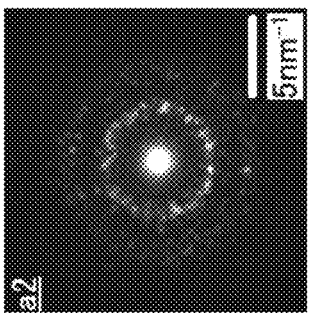
Figure 19G:
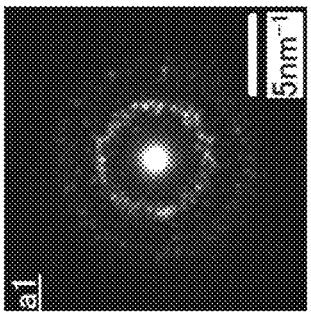
Figure 19H:
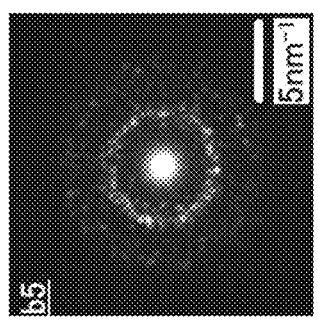
Figure 19I:
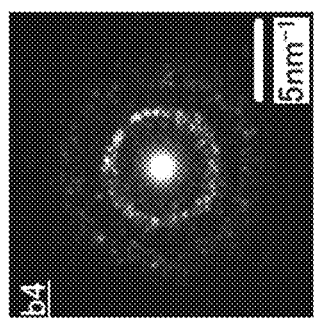
Figure 19J:
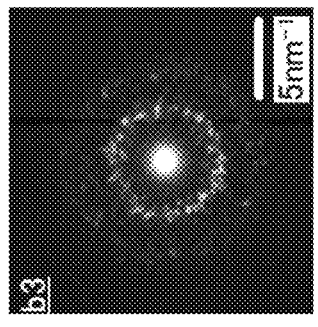
Figure 19K:
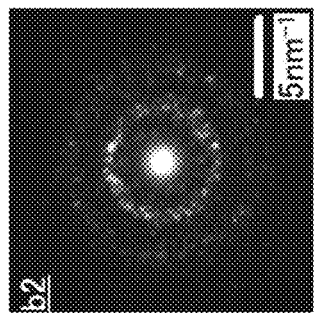
Figure 19L:
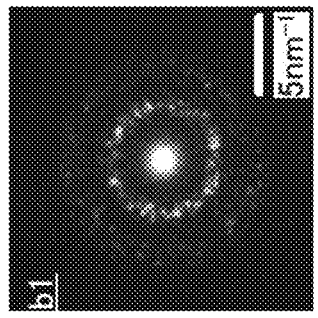

FIG. 19A is a plan-view TEM image of the sample formed at a substrate temperature of R.T. and with an oxygen gas flow rate ratio of 10%. FIG. 19B is a cross-sectional TEM image of the sample formed at a substrate temperature of R.T. and with an oxygen gas flow rate ratio of 10%.

<<Analysis of Electron Diffraction Patterns>>

This section describes electron diffraction patterns obtained by irradiation of the sample formed at a substrate temperature of R.T. and an oxygen gas flow rate ratio of 10% with an electron beam with a probe diameter of 1 nm (also referred to as a nanobeam).

Electron diffraction patterns of points indicated by black dots a1, a2, a3, a4, and a5 in the plan-view TEM image in FIG. 19A of the sample formed at a substrate temperature of R.T. and an oxygen gas flow rate ratio of 10% are observed. Note that the electron diffraction patterns are observed while electron beam irradiation is performed at a constant rate for 35 seconds. FIGS. 19C, 19D, 19E, 19F, and 19G show the results of the points indicated by the black dots a1, a2, a3, a4, and a5, respectively.

In FIGS. 19C, 19D, 19E, 19F, and 19G, regions with high luminance in a circular (ring) pattern can be shown. Furthermore, a plurality of spots can be shown in a ring-like shape.

Electron diffraction patterns of points indicated by black dots b1, b2, b3, b4, and b5 in the cross-sectional TEM image in FIG. 19B of the sample formed at a substrate temperature of R.T. and an oxygen gas flow rate ratio of 10% are observed. FIGS. 19H, 19I, 19J, 19K, and 19L show the results of the points indicated by the black dots b1, b2, b3, b4, and b5, respectively.

In FIGS. 19H, 19I, 19J, 19K, and 19L, regions with high luminance in a ring pattern can be shown. Furthermore, a plurality of spots can be shown in a ring-like shape.

For example, when an electron beam with a probe diameter of 300 nm is incident on a CAAC-OS including an InGaZnO$_4$ crystal in a direction parallel to the sample surface, a diffraction pattern including a spot derived from the (009) plane of the InGaZnO$_4$ crystal is obtained. That is, the CAAC-OS has c-axis alignment and the c-axes are aligned in the direction substantially perpendicular to the formation surface or the top surface of the CAAC-OS. Meanwhile, a ring-like diffraction pattern is shown when an electron beam with a probe diameter of 300 nm is incident on the same sample in a direction perpendicular to the sample surface. That is, it is found that the CAAC-OS has neither a-axis alignment nor b-axis alignment.

Furthermore, a diffraction pattern like a halo pattern is observed when an oxide semiconductor including a nanocrystal (a nanocrystalline oxide semiconductor (nc-OS)) is subjected to electron diffraction using an electron beam with a large probe diameter (e.g., 50 nm or larger). Meanwhile, bright spots are shown in a nanobeam electron diffraction pattern of the nc-OS obtained using an electron beam with a small probe diameter (e.g., smaller than 50 nm). Furthermore, in a nanobeam electron diffraction pattern of the nc-OS, regions with high luminance in a circular (ring) pattern are shown in some cases. Also in a nanobeam electron diffraction pattern of the nc-OS, a plurality of bright spots are shown in a ring-like shape in some cases.

The electron diffraction pattern of the sample formed at a substrate temperature of R.T. and with an oxygen gas flow rate ratio of 10% has regions with high luminance in a ring pattern and a plurality of bright spots appear in the ring-like pattern. Accordingly, the sample formed at a substrate temperature of R.T. and with an oxygen gas flow rate ratio of 10% exhibits an electron diffraction pattern similar to that of the nc-OS and does not show alignment in the plane direction and the cross-sectional direction.

According to what is described above, an oxide semiconductor formed at a low substrate temperature or with a low oxygen gas flow rate ratio is likely to have characteristics distinctly different from those of an oxide semiconductor film having an amorphous structure and an oxide semiconductor film having a single crystal structure.

<<Elementary Analysis>>

This section describes the analysis results of elements included in the sample formed at a substrate temperature of R.T. and with an oxygen gas flow rate ratio of 10%. For the analysis, by energy dispersive X-ray spectroscopy (EDX), EDX mapping images are obtained. An energy dispersive X-ray spectrometer Analysis Station JED-2300T manufactured by JEOL Ltd. is used as an elementary analysis apparatus in the EDX measurement. A Si drift detector is used to detect an X-ray emitted from the sample.

In the EDX measurement, an EDX spectrum of a point is obtained in such a manner that electron beam irradiation is performed on the point in a detection target region of a sample, and the energy of characteristic X-ray of the sample generated by the irradiation and its frequency are measured. In this embodiment, peaks of an EDX spectrum of the point are attributed to electron transition to the L shell in an In atom, electron transition to the K shell in a Ga atom, and electron transition to the K shell in a Zn atom and the K shell in an O atom, and the proportions of the atoms in the point are calculated. An EDX mapping image indicating distributions of proportions of atoms can be obtained through the process in an analysis target region of a sample.

Figure 20A:
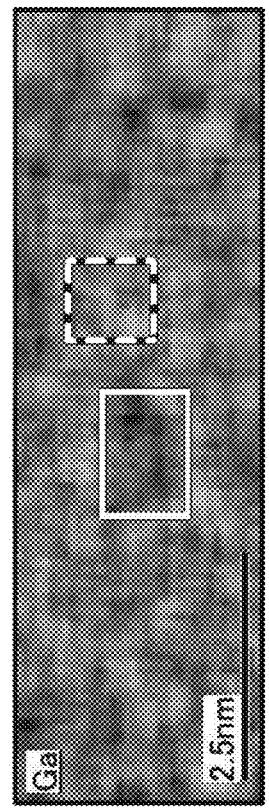
FIGS. 20A to 20C show EDX mapping images of a sample of one embodiment.
Figure 20B:
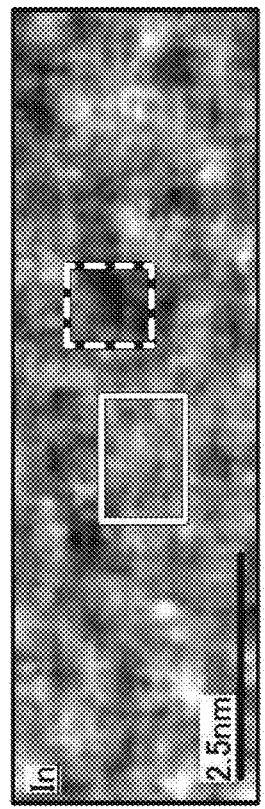
Figure 20C:
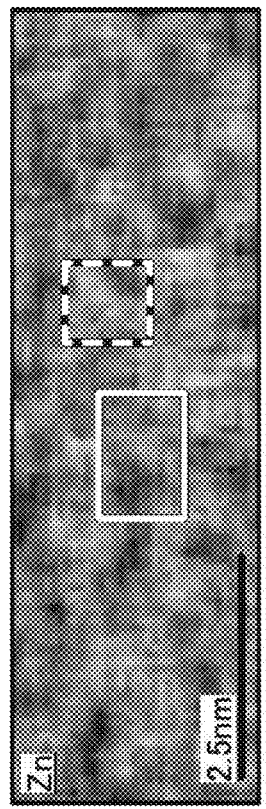

FIGS. 20A to 20C show EDX mapping images in a cross section of the sample formed at a substrate temperature of R.T. and with an oxygen gas flow rate ratio of 10%. FIG. 20A shows an EDX mapping image of Ga atoms. The proportion of the Ga atoms in all the atoms is 1.18 atomic % to 18.64 atomic %. FIG. 20B shows an EDX mapping image of In atoms. The proportion of the In atoms in all the atoms is 9.28 atomic % to 33.74 atomic %. FIG. 20C shows an EDX mapping image of Zn atoms. The proportion of the Zn atoms in all the atoms is 6.69 atomic % to 24.99 atomic %. FIGS. 20A to 20C show the same region in the cross section of the sample formed at a substrate temperature of R.T. and with an oxygen gas flow rate ratio of 10%. In the EDX mapping images, the proportion of an element is indicated by grayscale: the more measured atoms exist in a region, the brighter the region is; the less measured atoms exist in a region, the darker the region is. The magnification of the EDX mapping images in FIGS. 20A to 20C is 7200000 times.

The EDX mapping images in FIGS. 20A to 20C show relative distribution of brightness indicating that each element has a distribution in the sample formed at a substrate temperature of R.T. and with an oxygen gas flow rate ratio of 10%. Areas surrounded by solid lines and areas surrounded by dashed lines in FIGS. 20A to 20C are examined.

In FIG. 20A, a relatively dark region occupies a large area in the area surrounded by the solid line, while a relatively bright region occupies a large area in the area surrounded by the dashed line. In FIG. 20B, a relatively bright region occupies a large area in the area surrounded by the solid line, while a relatively dark region occupies a large area in the area surrounded by the dashed line.

That is, the areas surrounded by the solid lines are regions including a relatively large number of In atoms and the areas surrounded by the dashed lines are regions including a relatively small number of In atoms. In FIG. 20C, the right portion of the area surrounded by the solid line is relatively bright and the left portion thereof is relatively dark. Thus, the area surrounded by the solid line is a region including $In_{X2}Zn_{Y2}O_{Z2}$, $InO_{X1}$, and the like as main components.

The area surrounded by the solid line is a region including a relatively small number of Ga atoms and the area surrounded by the dashed line is a region including a relatively large number of Ga atoms. In FIG. 20C, the upper left portion of the area surrounded by the dashed line is relatively bright and the lower right portion thereof is relatively dark. Thus, the area surrounded by the dashed line is a region including $GaO_{X3}$, $Ga_{X4}Zn_{Y4}O_{Z4}$, and the like as main components.

Furthermore, as shown in FIGS. 20A to 20C, the In atoms are relatively more uniformly distributed than the Ga atoms, and regions including $InO_{X1}$ as a main component is seemingly joined to each other through a region including $In_{X2}Zn_{Y2}O_{Z2}$ as a main component. Thus, the regions including $In_{X2}Zn_{Y2}O_{Z2}$ and $InO_{X1}$ as main components extend like a cloud.

An In—Ga—Zn oxide having a composition in which the regions including $GaO_{X3}$ or the like as a main component and the regions including $In_{X2}Zn_{Y2}O_{Z2}$ or $InO_{X1}$ as a main component are unevenly distributed and mixed can be referred to as a CAC-OS.

The crystal structure of the CAC-OS includes an nc structure. In an electron diffraction pattern of the CAC-OS with the nc structure, several or more bright spots appear in addition to bright sports derived from IGZO including a single crystal, a polycrystal, or a CAAC. Alternatively, the crystal structure is defined as having high luminance regions appearing in a ring pattern in addition to the several or more bright spots.

As shown in FIGS. 20A to 20C, each of the regions including $GaO_{X3}$ or the like as a main component and the regions including $In_{X2}Zn_{Y2}O_{Z2}$ or $InO_{X1}$ as a main component has a size of greater than or equal to 0.5 nm and less than or equal to 10 nm, or greater than or equal to 1 nm and less than or equal to 3 nm. Note that it is preferable that a diameter of a region including each metal element as a main component be greater than or equal to 1 nm and less than or equal to 2 nm in the EDX mapping images.

As described above, the CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor exhibits. Accordingly, when regions including $In_{X2}Zn_{Y2}O_{Z2}$ or $InO_{X1}$ as a main component are distributed in an oxide semiconductor like a cloud, high field-effect mobility ($\mu$) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility ($\mu$) can be achieved.

A semiconductor element including a CAC-OS has high reliability. Thus, the CAC-OS is suitably used in a variety of semiconductor devices typified by a display.

At least part of this embodiment can be implemented in combination with any of the other embodiments and the other examples described in this specification as appropriate.

Embodiment 6

In this embodiment, the structure of a display panel of one embodiment of the present invention will be described with reference to FIG. 11A to FIG. 13D.

Figure 11A:
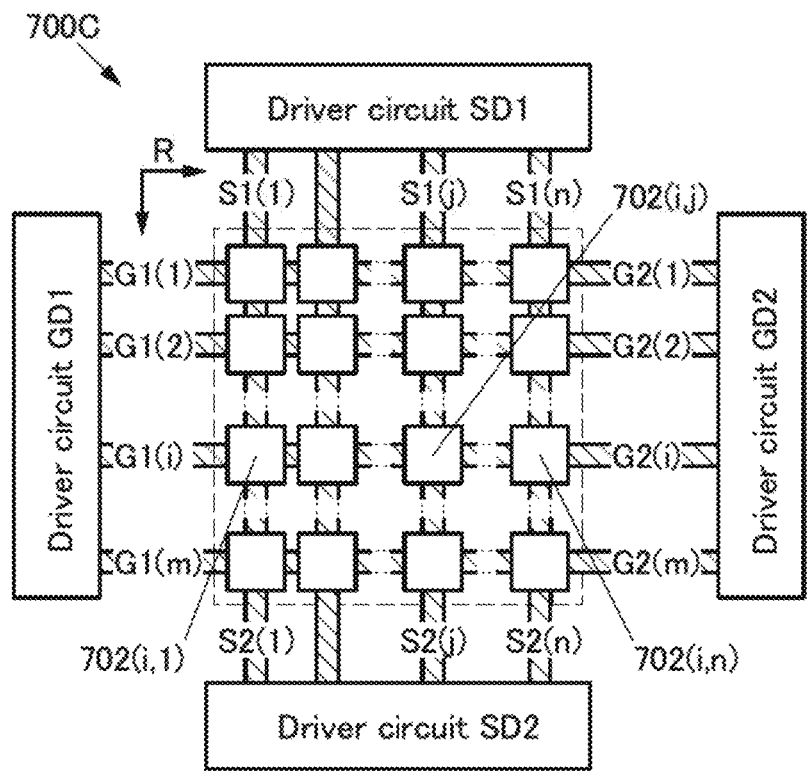
FIGS. 11A to 11C are a block diagram and circuit diagrams illustrating the structure of a display panel of one embodiment.
Figure 11B:
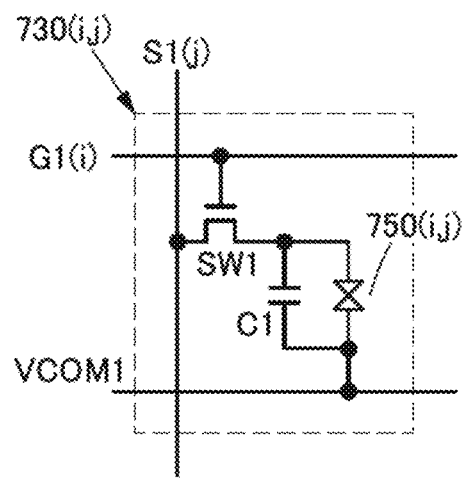
Figure 11C:
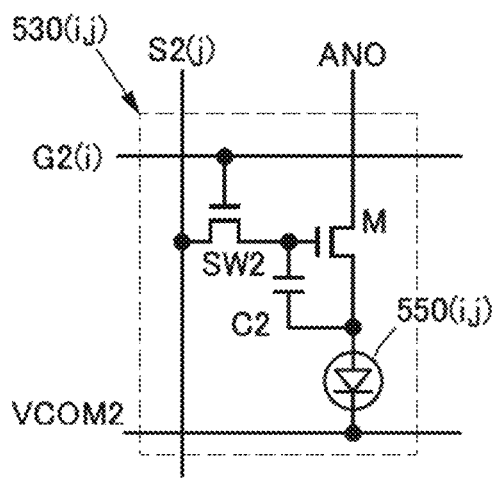

FIGS. 11A to 11C illustrate the structure of the display panel of one embodiment of the present invention. FIG. 11A is a block diagram illustrating the structure of the display panel of one embodiment of the present invention, and FIGS. 11B and 11C are circuit diagrams each illustrating the configuration of a pixel circuit in the display panel of one embodiment of the present invention.

Figure 12:
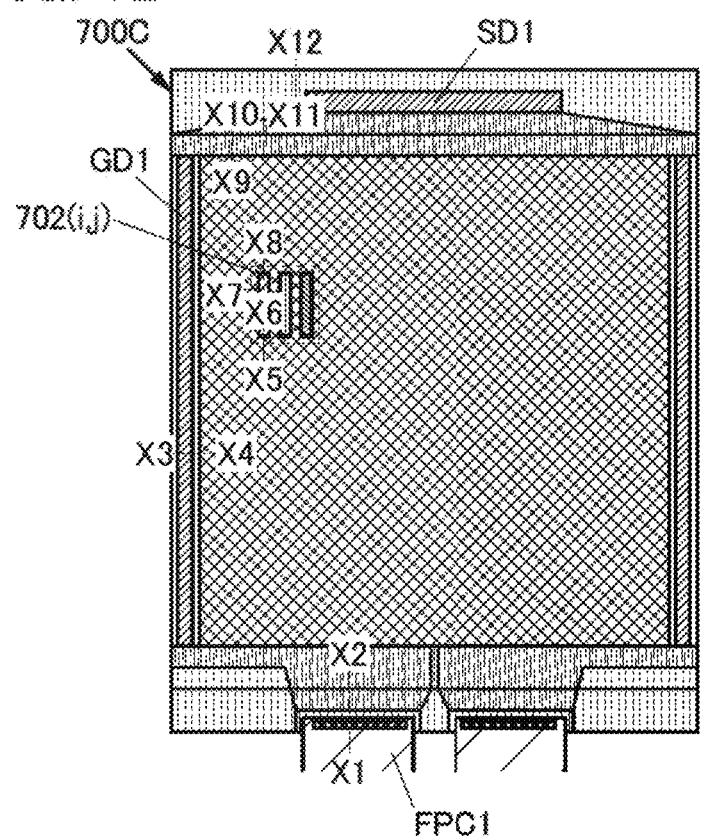
FIG. 12 illustrates the structure of a display panel of one embodiment.

FIG. 12 illustrates the structure of the display panel of one embodiment of the present invention. FIG. 12 is a top view of the display panel of one embodiment of the present invention.

FIGS. 13A to 13D each illustrate the structure of the display panel of one embodiment of the present invention. FIG. 13A is a cross-sectional view taken along lines X1-X2, X3-X4, X5-X6, X7-X8, X9-X10, and X11-X12 in FIG. 12. FIGS. 13B to 13D are cross-sectional views each illustrating part of the display panel.

Structure Example 1 of Display Panel

A display panel 700C described in this embodiment includes a group of pixels 702(i, 1) to 702(i, n) arranged in a row direction (denoted by arrow R in the drawing) (see FIG. 11A). Note that i is an integer greater than or equal to 1 and less than or equal to m, j is an integer greater than or equal to 1 and less than or equal to n, and each of m and n is an integer greater than or equal to 1. The group of pixels 702(i, 1) to 702(i, n) include the pixel 702(i, j).

The pixel 702(i, j) includes the first display element 750(i,j) and the second display element 550(i, j) which is configured to perform display in the same direction as the first display element 750(i, j) (see FIG. 13A).

The first display element 750(i, j) includes a reflective film 751R(i, j) reflecting incident light, and is configured to adjust reflection intensity. In addition, the second display element 550(i, j) includes a light-emitting element.

The pixel 702(i, j) includes a first pixel circuit 730(i, j) electrically connected to the first display element 750(i, j) and a second pixel circuit 530(i, j) electrically connected to the second display element 550(i, j) (see FIGS. 11B and 11C).

Furthermore, the display panel 700C includes a first scan line G1(i) and a second scan line G2(i) (see FIG. 11A).

The first scan line G1(i) is electrically connected to the group of pixels 702(i, 1) to 702(i, n) arranged in the row direction. The second scan line G2(i) is electrically connected to the group of pixels 702(i, 1) to 702(i, n) arranged in the row direction.

The first scan line G1(i) is electrically connected to the first pixel circuit 730(i, j) and the second scan line G2(i) is electrically connected to the second pixel circuit 530(i, j) (see FIGS. 11B and 11C).

The first display element 750(i, j) includes the reflective film 751R(i, j) reflecting incident light in the display direction, and is configured to adjust reflection intensity (see FIG. 13A).

The second display element 550(i, j) includes a light-emitting diode.

The reflective film 751R(i, j) includes the opening 751H. The second display element 550(i, j) is configured to emit light to the opening 751H and a region overlapping with the opening 751H.

The display panel described in this embodiment includes the first display element (e.g., a reflective liquid crystal element) that includes the reflective film having the opening, and the second display element (e.g., a light-emitting diode) that emits light to the opening.

With this structure, the display panel can be used, for example, as a reflective display panel in an environment with strong external light and as a self-luminous display panel in a dim environment. As a result, a novel display panel that has low power consumption and is highly convenient or reliable can be provided.

In addition, the display panel 700C described in this embodiment includes a terminal 719B and a conductive film 711B (see FIG. 13A).

The terminal 719B is electrically connected to the conductive film 711B. In addition, the conductive film 711B is electrically connected to the first pixel circuit 730(i, j). Note that the flexible printed circuit FPC1 can be electrically connected to the terminal 719B using, for example, the conductive material ACF1.

In addition, the first display element 750(i, j) of the display panel 700C described in this embodiment includes the layer 753 containing a liquid crystal material, the first electrode 751(i, j), and the second electrode 752. Note that the second electrode 752 is provided so that an electric field for controlling the alignment of the liquid crystal material is generated between the second electrode 752 and the first electrode 751(i, j) (see FIG. 13A).

Furthermore, the display panel 700C described in this embodiment includes the alignment film AF1 and the alignment film AF2. The alignment film AF2 is provided so that the layer 753 containing a liquid crystal material is interposed between the alignment films AF1 and AF2.

Moreover, the pixel 702($i, j$) of the display panel 700C described in this embodiment includes the coloring film CF1, the light-blocking film BM, the insulating film 771, and the functional film 770P.

The coloring film CF1 has a region overlapping with the first display element 750($i,j$). The light-blocking film BM has an opening in a region overlapping with the first display element 750($i, j$).

The insulating film 771 is positioned between the coloring film CF1 and the layer 753 containing a liquid crystal material or between the light-blocking film BM and the layer 753 containing a liquid crystal material. Thus, unevenness due to the thickness of the coloring film CF1 can be avoided. Alternatively, impurities can be prevented from being diffused from the light-blocking film BM, the coloring film CF1, or the like to the layer 753 containing a liquid crystal material.

The functional film 770P has a region overlapping with the first display element 750($i, j$). The functional film 770P is provided so that the substrate 770 is interposed between the functional film 770P and the first display element 750($i, j$).

In addition, the display panel 700C described in this embodiment includes the substrate 570, the substrate 770, the functional layer 520, a functional layer 720, and an insulating film 501.

The substrate 770 has a region overlapping with the substrate 570. The insulating film 501 is positioned between the substrates 570 and 770, the functional layer 520 is positioned between the substrate 570 and the insulating film 501, and the functional layer 720 is positioned between the insulating film 501 and the substrate 770.

The functional layer 520 includes the second pixel circuit 530($i, j$). Furthermore, the functional layer 520 includes the insulating film 518 and the insulating film 516 (see FIGS. 13A and 13D).

The second pixel circuit 530($i, j$) includes the conductive film 512A, and the conductive film 512A is electrically connected to the second display element 550($i, j$) by using, for example, a conductive material. Specifically, the conductive film 512A is electrically connected to a terminal on a bottom of the second display element 550($i, j$). For example, solder or the like can be used as the conductive material.

The insulating film 518 has a region positioned between the bonding layer 505 and the second pixel circuit 530($i, j$). The insulating film 516 has a region positioned between the insulating film 518 and the second pixel circuit 530($i, j$).

The functional layer 720 includes the first pixel circuit 730($i, j$) and an insulating film 721. Furthermore, the functional layer 720 includes an insulating film 718 and an insulating film 716 (see FIGS. 13A to 13C).

The insulating film 721 has a region positioned between the first display element 750($i, j$) and the first pixel circuit 730($i, j$).

The insulating film 718 has a region positioned between the insulating film 721 and the first pixel circuit 730($i, j$). The insulating film 716 has a region positioned between the insulating film 718 and the second pixel circuit 530($i, j$).

Moreover, the display panel 700C described in this embodiment includes the bonding layer 505, the sealant 705, and the structure body KB1.

The bonding layer 505 is positioned between the functional layer 520 and the insulating film 501 and is configured to bond the functional layer 520 and the insulating film 501.

The sealant 705 is positioned between the insulating film 501 and the substrate 770 and is configured to bond the insulating film 501 and the substrate 770.

The structure body KB1 is configured to make a predetermined gap between the functional layer 720 and the substrate 770.

In addition, the display panel 700C described in this embodiment includes a terminal 719C, a conductive film 711C, and the conductor CP.

The terminal 719C is electrically connected to the conductive film 711C. In addition, the conductive film 711C is electrically connected to the first pixel circuit 730($i, j$).

The conductor CP is interposed between the terminal 719C and the second electrode 752 for electrically connecting the terminal 719C and the second electrode 752. For example, a conductive particle can be used as the conductor CP.

Furthermore, the display panel 700C described in this embodiment includes a driver circuit GD1, a driver circuit SD1, a driver circuit GD2, and a driver circuit SD2 (see FIG. 11A).

The driver circuit GD1 is electrically connected to the scan line G1($i$). The driver circuit GD1 includes, for example, the transistor MD. Specifically, a transistor which includes a semiconductor film and can be formed in the same step as the transistor included in the first pixel circuit 730($i, j$) can be used as the transistor MD (see FIGS. 13A to 13C).

The driver circuit SD1 is electrically connected to the signal line S1($j$). The driver circuit SD1 is electrically connected to a terminal using a conductive material, for example. The terminal can be formed in the same step as the terminal 719B or the terminal 719C.

The driver circuit GD2 is electrically connected to the scan line G2($i$). For example, a transistor which includes a semiconductor film and can be formed in the same step as the transistor included in the second pixel circuit 530($i, j$) can be used in the driver circuit GD2 (see FIG. 11A).

The driver circuit SD2 is electrically connected to the signal line S2($j$).

Individual components of the display panel will be described below. Note that these components cannot be clearly distinguished and one component also serves as another component or includes part of another component in some cases.

For example, the reflective film 751R(i, j) can be used as the whole or part of the first electrode 751($i, j$).

In addition, the second conductive film can be used as the conductive film 512B serving as a source electrode or a drain electrode of a transistor.

Structure Example 1

The display panel of one embodiment of the present invention includes the substrate 570, the substrate 770, the structure body KB1, the sealant 705, or the bonding layer 505.

In addition, the display panel of one embodiment of the present invention includes the functional layer 520, the functional layer 720, and the insulating film 721.

In addition, the display panel of one embodiment of the present invention includes the signal line S1($j$), the signal line S2($j$), the scan line G1($i$), the scan line G2($i$), the wiring VCOM1, the wiring VCOM2, and the wiring ANO.

In addition, the display panel of one embodiment of the present invention includes the terminal 719B, the terminal 719C, the conductive film 711B, or the conductive film 711C.

In addition, the display panel of one embodiment of the present invention includes the first pixel circuit 730(i, j), the second pixel circuit 530(i, j), and the switch SW1.

In addition, the display panel of one embodiment of the present invention includes the first display element 750(i, j), the first electrode 751(i, j), the reflective film 751R(i, j), the opening 751H, the layer 753 containing a liquid crystal material, and the second electrode 752.

In addition, the display panel of one embodiment of the present invention includes the alignment film AF1, the alignment film AF2, the coloring film CF1, the light-blocking film BM, the insulating film 771, and the functional film 770P.

Furthermore, the display panel of one embodiment of the present invention includes the second display element 550(i, j). Specifically, a light-emitting diode is used as the second display element 550(i, j).

In addition, the display panel of one embodiment of the present invention includes the insulating film 501.

In addition, the display panel of one embodiment of the present invention includes the driver circuit GD1, the driver circuit GD2, the driver circuit SD1, or the driver circuit SD2.

Note that the display panel 700C is different from the display panel 700 described with reference to FIGS. 7A to 7C in including the insulating film 721, including the terminal 719B, the terminal 719C, the conductive film 711B, or the conductive film 711C, including the first pixel circuit 730(i, j) or the second pixel circuit 530(i, j), including a light-emitting diode as the second display element 550(i, j), including the insulating film 501, and including the driver circuit GD1, the driver circuit GD2, the driver circuit SD1, or the driver circuit SD2. Described below are different structures, and the above description is referred to for similar structures.

<<Insulating Film 721>>

For example, a material that can be used for the insulating film 521 described in Embodiment 4 can be used for the insulating film 721.

<<Terminal 719B, Terminal 719C, Conductive Film 711B, and Conductive Film 711C>>

For example, a material that can be used for the wiring and the like described in Embodiment 4 can be used for the terminal 719B, the terminal 719C, the conductive film 711B, or the conductive film 711C.

<<First Pixel Circuit 730(i, j)>>

For example, a transistor including a gate electrode electrically connected to the scan line G1(i) and a first electrode electrically connected to the signal line S1(j) can be used as the switch SW1. Moreover, the capacitor C1 including a first electrode electrically connected to a second electrode of a transistor and a second electrode electrically connected to the wiring VCOM1 can be used in the first pixel circuit 730(i, j).

Note that the first electrode 751(i, j) of the first display element 750(i, j) is electrically connected to the second electrode of the transistor, and the second electrode 752 of the first display element 750(i, j) is electrically connected to the wiring VCOM1 (see FIG. 11B).

<<Second Pixel Circuit 530(i, j)>>

For example, a transistor including a gate electrode electrically connected to the scan line G2(i) and a first electrode electrically connected to the signal line S2(j) can be used as the switch SW2. Moreover, the transistor M including a gate electrically connected to the second electrode of the transistor and a first electrode electrically connected to the wiring ANO, and the capacitor C2 including a first electrode electrically connected to the second electrode of the transistor and a second electrode electrically connected to the second electrode of the transistor M can be used in the second pixel circuit 530(i, j).

Note that one electrode of the second display element 550(i, j) is electrically connected to the second electrode of the transistor M, and the other electrode of the second display element 550(i, j) is electrically connected to the wiring VCOM2 (see FIG. 11C).

<<Second Display Element 550(i, j)>>

For example, a light-emitting diode that emits white light can be used as the second display element 550(i, j). Alternatively, a light-emitting diode that emits red light, green light, blue light, or the like can be used as the second display element 550(i, j).

The use of the light-emitting diode as the second display element 550(i, j) contributes to high-luminance display.

<<Insulating Film 501>>

For example, a material that can be used for the insulating film 501C described in Embodiment 4 can be used for the insulating film 501.

<<Driver Circuits GD1 and GD2>>

For example, a structure that can be used for the driver circuit GD described in Embodiment 4 can be used for the driver circuit GD1 or GD2.

<<Driver Circuits SD1 and SD2>>

For example, a structure that can be used for the driver circuit SD described in Embodiment 4 can be used for the driver circuit SD1 or SD2.

Note that this embodiment can be combined with any of the other embodiments in this specification as appropriate.

Embodiment 7

In this embodiment, a semiconductor device (memory device) that can retain stored data even when not powered and that has an unlimited number of write cycles, and a CPU including the semiconductor device will be described. The CPU described in this embodiment can be used for, for example, the information processing device described in Embodiment 2.

<Memory Device>

Figure 14A:
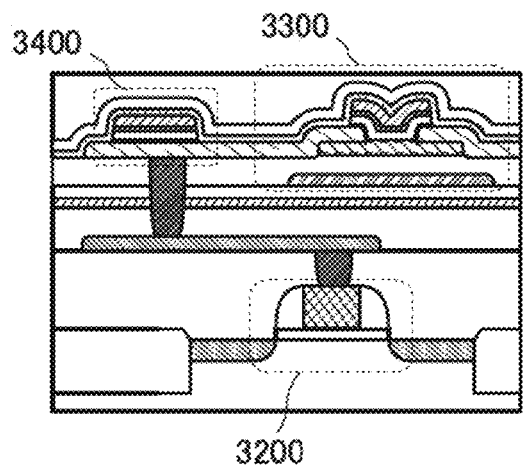
FIGS. 14A to 14C are a cross-sectional view and circuit diagrams illustrating the structure of a semiconductor device of one embodiment.
Figure 14B:
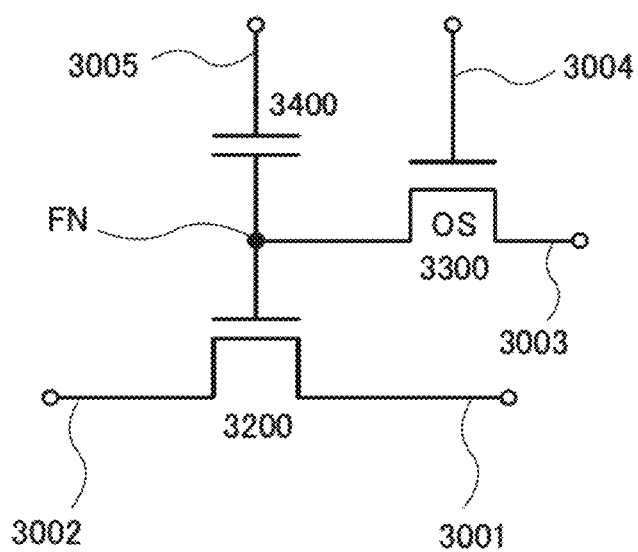
Figure 14C:
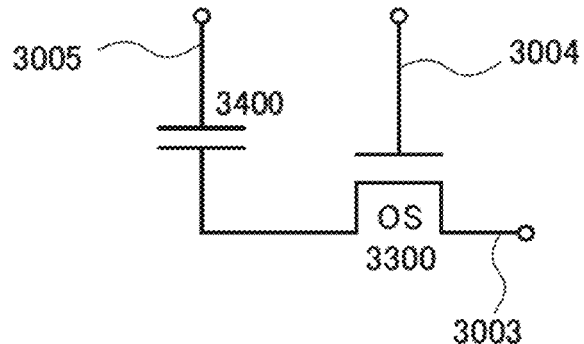

FIGS. 14A to 14C show an example of a semiconductor device (memory device) that can retain stored data even when not powered and that has an unlimited number of write cycles. Note that FIG. 14B is a circuit diagram of FIG. 14A.

The semiconductor device illustrated in FIGS. 14A and 14B includes a transistor 3200 using a first semiconductor material, a transistor 3300 using a second semiconductor material, and a capacitor 3400.

The first and second semiconductor materials preferably have different energy gaps. For example, the first semiconductor material can be a semiconductor material other than an oxide semiconductor (examples of such a semiconductor material include silicon (including strained silicon), germanium, silicon germanium, silicon carbide, gallium arsenide, aluminum gallium arsenide, indium phosphide, gallium nitride, and an organic semiconductor), and the second semiconductor material can be an oxide semiconductor. A transistor using a material other than an oxide semiconductor, such as single crystal silicon, can operate at high speed easily. On the other hand, a transistor including an oxide semiconductor has a low off-state current.

The transistor 3300 is a transistor in which a channel is formed in a semiconductor layer including an oxide semiconductor. Since the off-state current of the transistor 3300 is low, stored data can be retained for a long period. In other words, power consumption can be sufficiently reduced because a semiconductor memory device in which refresh operation is unnecessary or the frequency of refresh operation is extremely low can be provided.

In FIG. 14B, a first wiring 3001 is electrically connected to a source electrode of the transistor 3200. A second wiring 3002 is electrically connected to a drain electrode of the transistor 3200. A third wiring 3003 is electrically connected to one of a source electrode and a drain electrode of the transistor 3300. A fourth wiring 3004 is electrically connected to a gate electrode of the transistor 3300. A gate electrode of the transistor 3200 and the other of the source electrode and the drain electrode of the transistor 3300 are electrically connected to one electrode of the capacitor 3400. A fifth wiring 3005 is electrically connected to the other electrode of the capacitor 3400.

The semiconductor device in FIG. 14A has a feature that the potential of the gate electrode of the transistor 3200 can be retained, and thus enables writing, retaining, and reading of data as follows.

Writing and retaining of data are described. First, the potential of the fourth wiring 3004 is set to a potential at which the transistor 3300 is turned on, so that the transistor 3300 is turned on. Accordingly, the potential of the third wiring 3003 is supplied to the gate electrode of the transistor 3200 and the capacitor 3400. That is, a predetermined charge is supplied to the gate of the transistor 3200 (writing). Here, one of charges providing two different potential levels (hereinafter referred to as a low-level charge and a high-level charge) is supplied. After that, the potential of the fourth wiring 3004 is set to a potential at which the transistor 3300 is turned off, so that the transistor 3300 is turned off. Thus, the charge supplied to the gate of the transistor 3200 is held (retaining).

Since the off-state current of the transistor 3300 is extremely low, the charge of the gate of the transistor 3200 is retained for a long time.

Next, reading of data is described. An appropriate potential (a reading potential) is supplied to the fifth wiring 3005 while a predetermined potential (a constant potential) is supplied to the first wiring 3001, whereby the potential of the second wiring 3002 varies depending on the amount of charge retained in the gate of the transistor 3200. This is because in the case of using an n-channel transistor as the transistor 3200, an apparent threshold voltage $V_{th\_H}$ at the time when the high-level charge is given to the gate electrode of the transistor 3200 is lower than an apparent threshold voltage $V_{th\_L}$ at the time when the low-level charge is given to the gate electrode of the transistor 3200. Here, an apparent threshold voltage refers to the potential of the fifth wiring 3005 which is needed to turn on the transistor 3200. Thus, the potential of the fifth wiring 3005 is set to a potential $V_0$ which is between $V_{th\_H}$ and $V_{th\_L}$, whereby charge supplied to the gate of the transistor 3200 can be determined. For example, in the case where the high-level charge is supplied in writing and the potential of the fifth wiring 3005 is $V_0$ ($>V_{th\_H}$), the transistor 3200 is turned "on". In the case where the low-level charge is supplied, even when the potential of the fifth wiring 3005 is $V_0$ ($<V_{th\_L}$), the transistor 3200 remains "off". Thus, the retained data can be read by determining the potential of the second wiring 3002.

Note that in the case where memory cells are arrayed to be used, it is necessary that only data of a desired memory cell be able to be read. For example, the fifth wiring 3005 of memory cells from which data is not read may be supplied with a potential at which the transistor 3200 is turned "off" regardless of the potential supplied to the gate electrode, that is, a potential lower than $V_{th\_H}$, whereby only data of a desired memory cell can be read. Alternatively, the fifth wiring 3005 of the memory cells from which data is not read may be supplied with a potential at which the transistor 3200 is turned "on" regardless of the potential supplied to the gate electrode, that is, a potential higher than $V_{th\_L}$, whereby only data of a desired memory cell can be read.

The semiconductor device illustrated in FIG. 14C is different from the semiconductor device illustrated in FIG. 14A in that the transistor 3200 is not provided. Also in this case, writing and holding of data can be performed in a manner similar to the above.

Next, reading of data of the semiconductor device illustrated in FIG. 14C is described. When the transistor 3300 is turned on, the third wiring 3003 which is in a floating state and the capacitor 3400 are electrically connected to each other, and the charge is redistributed between the third wiring 3003 and the capacitor 3400. As a result, the potential of the third wiring 3003 changes. The amount of change in the potential of the third wiring 3003 varies with the potential of the one electrode of the capacitor 3400 (or the charge accumulated in the capacitor 3400).

For example, the potential of the third wiring 3003 after the charge redistribution is $(C_B \times V_{B0} + C \times V)/(C_B + C)$, where V is the potential of the one electrode of the capacitor 3400, C is the capacitance of the capacitor 3400, $C_B$ is the capacitance component of the third wiring 3003, and $V_{B0}$ is the potential of the third wiring 3003 before the charge redistribution. Thus, it can be found that, assuming that the memory cell is in either of two states in which the potential of the one electrode of the capacitor 3400 is $V_1$ and $V_0$ ($V_1 > V_0$), the potential of the third wiring 3003 in the case of retaining the potential $V_1$ ($=(C_B \times V_{B0} + C \times V_1)/(C_B + C)$) is higher than the potential of the third wiring 3003 in the case of retaining the potential $V_0$ ($=(C_B \times V_{B0} + C \times V_0)/(C_B + C)$).

Then, by comparing the potential of the third wiring 3003 with a predetermined potential, data can be read.

In this case, a transistor including the first semiconductor material may be used for a driver circuit for driving a memory cell, and a transistor including the second semiconductor material may be stacked over the driver circuit as the transistor 3300.

When including a transistor in which a channel formation region is formed using an oxide semiconductor and which has an extremely low off-state current, the semiconductor device described in this embodiment can retain stored data for an extremely long time. In other words, refresh operation becomes unnecessary or the frequency of the refresh operation can be extremely low, which leads to a sufficient reduction in power consumption. Moreover, stored data can be retained for a long time even when power is not supplied (note that a potential is preferably fixed).

Furthermore, in the semiconductor device described in this embodiment, high voltage is not needed for writing data and there is no problem of deterioration of elements. Unlike in a conventional nonvolatile memory, for example, it is not necessary to inject and extract electrons into and from a floating gate; thus, a problem such as deterioration of a gate insulating film is not caused at all. That is, the semiconductor device described in this embodiment does not have a limit on the number of times data can be rewritten, which is a problem of a conventional nonvolatile memory, and the reliability thereof is drastically improved. Furthermore, data is written depending on the state of the transistor (on or off), whereby high-speed operation can be easily achieved.

Note that the above memory device can also be used in an LSI such as a digital signal processor (DSP), a custom LSI, or a programmable logic device (PLD), in addition to a central processing unit (CPU), and a radio frequency identification (RF-ID) tag, for example

<CPU>

A CPU including the above memory device is described below.

Figure 15:
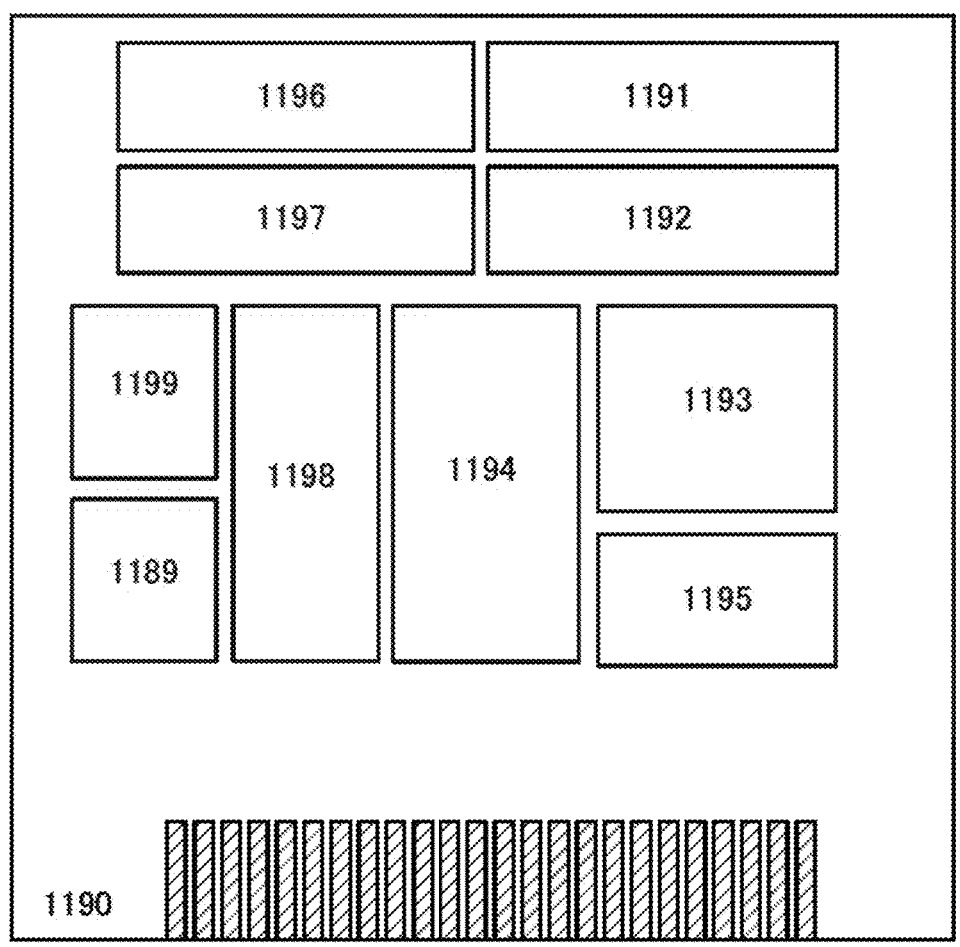
FIG. 15 is a block diagram illustrating the configuration of a CPU of one embodiment.

FIG. 15 is a block diagram illustrating a configuration example of the CPU including the above memory device.

The CPU illustrated in FIG. 15 includes, over a substrate 1190, an arithmetic logic unit (ALU) 1191, an ALU controller 1192, an instruction decoder 1193, an interrupt controller 1194, a timing controller 1195, a register 1196, a register controller 1197, a bus interface (BUS I/F) 1198, a rewritable ROM 1199, and a ROM interface (ROM I/F) 1189. A semiconductor substrate, an SOI substrate, a glass substrate, or the like is used as the substrate 1190. The ROM 1199 and the ROM interface 1189 may be provided over a separate chip. Needless to say, the CPU in FIG. 15 is just an example in which the configuration is simplified, and an actual CPU may have a variety of configurations depending on the application. For example, the CPU may have the following configuration: a structure including the CPU illustrated in FIG. 15 or an arithmetic circuit is considered as one core; a plurality of the cores are included; and the cores operate in parallel. The number of bits that the CPU can process in an internal arithmetic circuit or in a data bus can be, for example, 8, 16, 32, or 64.

An instruction that is input to the CPU through the bus interface 1198 is input to the instruction decoder 1193 and decoded therein, and then, input to the ALU controller 1192, the interrupt controller 1194, the register controller 1197, and the timing controller 1195.

The ALU controller 1192, the interrupt controller 1194, the register controller 1197, and the timing controller 1195 conduct various controls in accordance with the decoded instruction. Specifically, the ALU controller 1192 generates signals for controlling the operation of the ALU 1191. While the CPU is executing a program, the interrupt controller 1194 processes an interrupt request from an external input/output device or a peripheral circuit depending on its priority or a mask state. The register controller 1197 generates an address of the register 1196, and reads/writes data from/to the register 1196 depending on the state of the CPU.

In addition, the timing controller 1195 generates signals for controlling operation timings of the ALU 1191, the ALU controller 1192, the instruction decoder 1193, the interrupt controller 1194, and the register controller 1197. For example, the timing controller 1195 includes an internal clock generator for generating an internal clock signal on the basis of a reference clock signal, and supplies the internal clock signal to the above circuits.

In the CPU illustrated in FIG. 15, a memory cell is provided in the register 1196.

In the CPU illustrated in FIG. 15, the register controller 1197 selects retaining operation in the register 1196 in accordance with an instruction from the ALU 1191. That is, the register controller 1197 selects whether data is retained by a flip-flop or by a capacitor in the memory cell included in the register 1196. When data retaining by the flip-flop is selected, a power supply voltage is supplied to the memory cell in the register 1196. When data retaining by the capacitor is selected, the data is rewritten in the capacitor, and supply of the power supply voltage to the memory cell in the register 1196 can be stopped.

Figure 16:
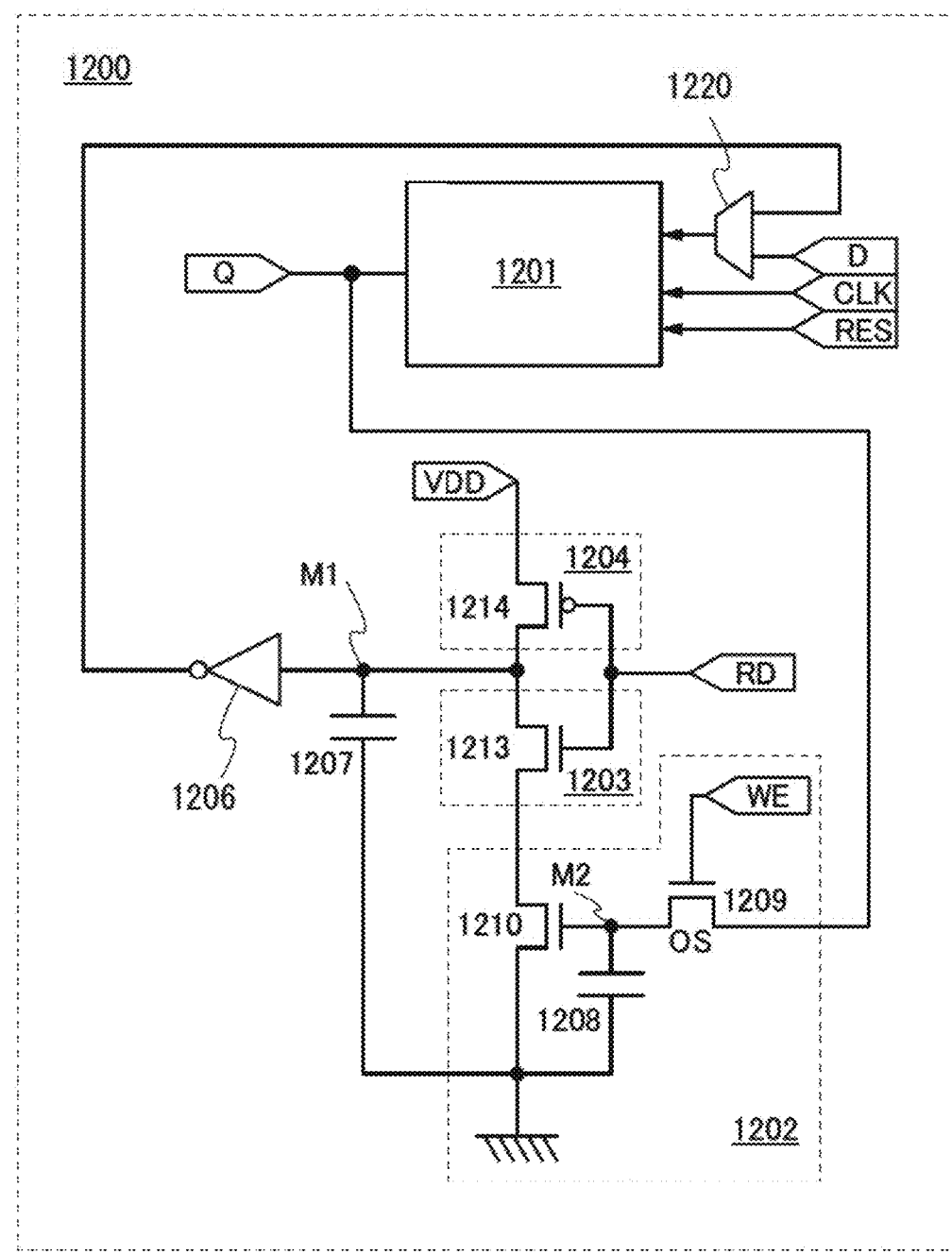
FIG. 16 is a circuit diagram illustrating the configuration of a memory element of one embodiment.

FIG. 16 is an example of a circuit diagram of a memory element that can be used for the register 1196. A memory element 1200 includes a circuit 1201 in which stored data is volatile when power supply is stopped, a circuit 1202 in which stored data is nonvolatile even when power supply is stopped, a switch 1203, a switch 1204, a logic element 1206, a capacitor 1207, and a circuit 1220 having a selecting function. The circuit 1202 includes a capacitor 1208, a transistor 1209, and a transistor 1210. Note that the memory element 1200 may further include another element such as a diode, a resistor, or an inductor, as needed.

Here, the above-described memory device can be used as the circuit 1202. When supply of a power supply voltage to the memory element 1200 is stopped, a ground potential (0 V) or a potential at which the transistor 1209 in the circuit 1202 is turned off continues to be input to a gate of the transistor 1209. For example, the gate of the transistor 1209 is grounded through a load such as a resistor.

Shown here is an example in which the switch 1203 is a transistor 1213 having one conductivity type (e.g., an n-channel transistor) and the switch 1204 is a transistor 1214 having a conductivity type opposite to the one conductivity type (e.g., a p-channel transistor). A first terminal of the switch 1203 corresponds to one of a source and a drain of the transistor 1213, a second terminal of the switch 1203 corresponds to the other of the source and the drain of the transistor 1213, and conduction or non-conduction between the first terminal and the second terminal of the switch 1203 (i.e., the on/off state of the transistor 1213) is selected by a control signal RD input to a gate of the transistor 1213. A first terminal of the switch 1204 corresponds to one of a source and a drain of the transistor 1214, a second terminal of the switch 1204 corresponds to the other of the source and the drain of the transistor 1214, and conduction or non-conduction between the first terminal and the second terminal of the switch 1204 (i.e., the on/off state of the transistor 1214) is selected by the control signal RD input to a gate of the transistor 1214.

One of a source and a drain of the transistor 1209 is electrically connected to one of a pair of electrodes of the capacitor 1208 and a gate of the transistor 1210. Here, the connection portion is referred to as a node M2. One of a source and a drain of the transistor 1210 is electrically connected to a wiring that can supply a low power supply potential (e.g., a GND line), and the other thereof is electrically connected to the first terminal of the switch 1203 (the one of the source and the drain of the transistor 1213). The second terminal of the switch 1203 (the other of the source and the drain of the transistor 1213) is electrically connected to the first terminal of the switch 1204 (the one of the source and the drain of the transistor 1214). The second terminal of the switch 1204 (the other of the source and the drain of the transistor 1214) is electrically connected to a wiring that can supply a power supply potential VDD. The second terminal of the switch 1203 (the other of the source and the drain of the transistor 1213), the first terminal of the switch 1204 (the one of the source and the drain of the transistor 1214), an input terminal of the logic element 1206, and one of a pair of electrodes of the capacitor 1207 are electrically connected to each other. Here, the connection portion is referred to as a node M1. The other of the pair of electrodes of the capacitor 1207 can be supplied with a constant potential. For example, the other of the pair of electrodes of the capacitor 1207 can be supplied with a low power supply potential (e.g., GND) or a high power supply potential (e.g., VDD). The other of the pair of electrodes of the capacitor 1207 is electrically connected to the wiring that can supply a low power supply potential (e.g., a GND line). The other of the pair of electrodes of the capacitor 1208 can be supplied with a constant potential. For example, the other of the pair of electrodes of the capacitor 1208 can be supplied with a low power supply potential (e.g., GND) or a high power supply potential (e.g., VDD). The other of the pair of electrodes of the capacitor 1208 is electrically connected to the wiring that can supply a low power supply potential (e.g., a GND line).

Note that the capacitor 1207 and the capacitor 1208 can be omitted when the parasitic capacitance of the transistor, the wiring, or the like is actively utilized.

A control signal WE is input to a first gate (first gate electrode) of the transistor 1209. As for each of the switch 1203 and the switch 1204, a conduction state or a non-conduction state between the first terminal and the second terminal is selected by the control signal RD that is different from the control signal WE. When the first terminal and the second terminal of one of the switches are in the conduction state, the first terminal and the second terminal of the other of the switches are in the non-conduction state.

A signal corresponding to data retained in the circuit 1201 is input to the other of the source and the drain of the transistor 1209. FIG. 16 illustrates an example in which a signal output from the circuit 1201 is input to the other of the source and the drain of the transistor 1209. The logic value of a signal output from the second terminal of the switch 1203 (the other of the source and the drain of the transistor 1213) is inverted by the logic element 1206, and the inverted signal is input to the circuit 1201 through the circuit 1220.

In the example of FIG. 16, a signal output from the second terminal of the switch 1203 (the other of the source and the drain of the transistor 1213) is input to the circuit 1201 through the logic element 1206 and the circuit 1220; however, one embodiment of the present invention is not limited thereto. The signal output from the second terminal of the switch 1203 (the other of the source and the drain of the transistor 1213) may be input to the circuit 1201 without its logic value being inverted. For example, in the case where the circuit 1201 includes a node in which a signal obtained by inversion of the logic value of a signal input from the input terminal is retained, the signal output from the second terminal of the switch 1203 (the other of the source and the drain of the transistor 1213) can be input to the node.

Also in FIG. 16, the transistors included in the memory element 1200 except for the transistor 1209 can each be a transistor in which a channel is formed in a layer formed using a semiconductor other than an oxide semiconductor or in the substrate 1190. For example, the transistor can be a transistor whose channel is formed in a silicon layer or a silicon substrate. Alternatively, a transistor in which a channel is formed in an oxide semiconductor film can be used for all the transistors in the memory element 1200. Further alternatively, in the memory element 1200, a transistor in which a channel is formed in an oxide semiconductor film can be included besides the transistor 1209, and a transistor in which a channel is formed in a layer formed using a semiconductor other than an oxide semiconductor or the substrate 1190 can be used for the rest of the transistors.

As the circuit 1201 in FIG. 16, for example, a flip-flop circuit can be used. As the logic element 1206, for example, an inverter or a clocked inverter can be used.

In a period during which the memory element 1200 is not supplied with the power supply voltage, the semiconductor device described in this embodiment can retain data stored in the circuit 1201 by the capacitor 1208 that is provided in the circuit 1202.

In addition, the off-state current of a transistor in which a channel is formed in an oxide semiconductor film is extremely low. For example, the off-state current of a transistor in which a channel is formed in an oxide semiconductor film is significantly lower than that of a transistor in which a channel is formed in silicon having crystallinity. Thus, when the transistor in which a channel is formed in an oxide semiconductor film is used as the transistor 1209, a signal is retained in the capacitor 1208 for a long time also in a period during which the power supply voltage is not supplied to the memory element 1200. The memory element 1200 can accordingly retain the stored content (data) also in a period during which the supply of the power supply voltage is stopped.

Since the memory element performs pre-charge operation with the switch 1203 and the switch 1204, the time required for the circuit 1201 to retain original data again after the supply of the power supply voltage is restarted can be shortened.

Moreover, in the circuit 1202, a signal retained by the capacitor 1208 is input to the gate of the transistor 1210. Thus, after the supply of the power supply voltage to the memory element 1200 is restarted, depending on the signal retained by the capacitor 1208, the state (the on state or the off state) of the transistor 1210 is determined and can be read from the circuit 1202. Consequently, an original signal can be accurately read even when a potential corresponding to the signal retained by the capacitor 1208 changes to some degree.

By using such a memory element 1200 in a memory device such as a register or a cache memory included in a processor, data in the memory device can be prevented from being lost owing to the stop of the supply of the power supply voltage. Furthermore, shortly after the supply of the power supply voltage is restarted, the memory device can be returned to the same state as that before the power supply is stopped. Thus, the power supply can be stopped even for a short time in the entire processor or one or a plurality of logic circuits included in the processor, resulting in lower power consumption.

Note that although the memory element 1200 is used in a CPU in this embodiment, the memory element 1200 can also be used in an LSI such as a digital signal processor (DSP), a custom LSI, or a programmable logic device (PLD), and a radio frequency identification (RF-ID)

At least part of this embodiment can be implemented in combination with any of the other embodiments described in this specification as appropriate.

Embodiment 8

In this embodiment, a display module and electronic devices which include a display panel of one embodiment of the present invention will be described with reference to FIGS. 17A to 17H.

FIGS. 17A to 17G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 17A:
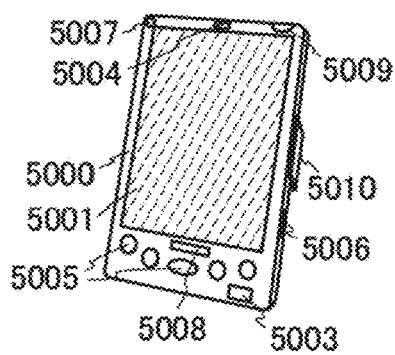
FIGS. 17A to 17H illustrate the structure of an electronic device of one embodiment.
Figure 17B:
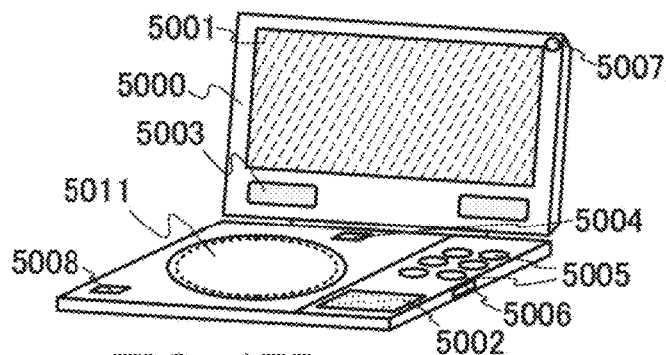
Figure 17C:
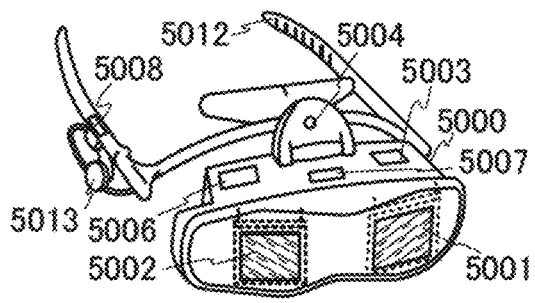
Figure 17D:
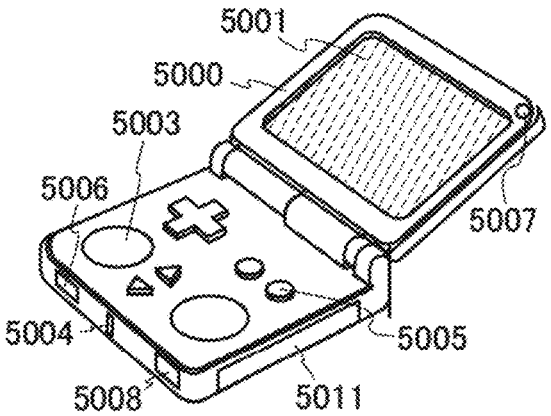
Figure 17E:
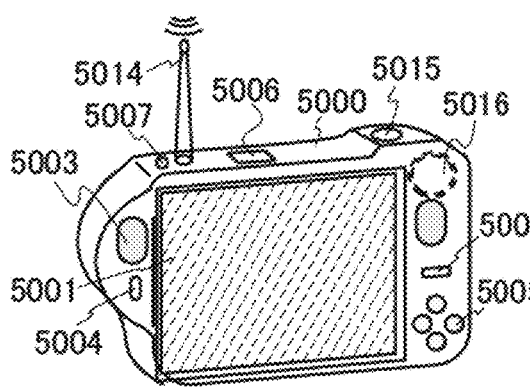
Figure 17F:
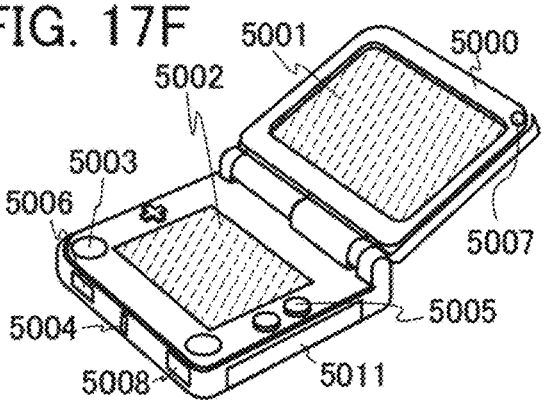
Figure 17G:
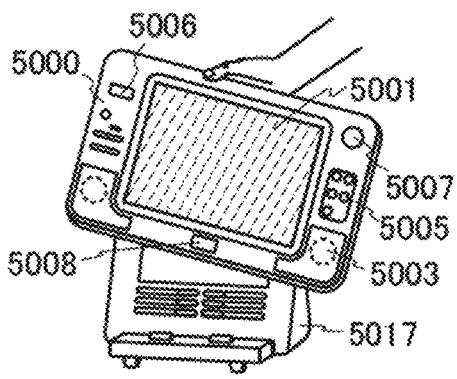

FIG. 17A illustrates a mobile computer which can include a switch 5009, an infrared port 5010, and the like in addition to the above components. FIG. 17B illustrates a portable image reproducing device (e.g., a DVD reproducing device) provided with a recording medium, and can include a second display portion 5002, a recording medium reading portion 5011, and the like in addition to the above components. FIG. 17C illustrates a goggle-type display which can include the second display portion 5002, a support portion 5012, an earphone 5013, and the like in addition to the above components. FIG. 17D illustrates a portable game console which can include the recording medium reading portion 5011 and the like in addition to the above components. FIG. 17E illustrates a digital camera with a television reception function, and can include an antenna 5014, a shutter button 5015, an image receiving portion 5016, and the like in addition to the above components. FIG. 17F illustrates a portable game console which can include the second display portion 5002, the recording medium reading portion 5011, and the like in addition to the above components. FIG. 17G illustrates a portable television receiver which can include a charger 5017 capable of transmitting and receiving signals, and the like in addition to the above components.

The electronic devices in FIGS. 17A to 17G can have a variety of functions such as a function of displaying a variety of information (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image information mainly on one display portion while displaying text information mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that the functions of the electronic devices in FIGS. 17A to 17G are not limited thereto, and the electronic devices can have a variety of functions.

Figure 17H:
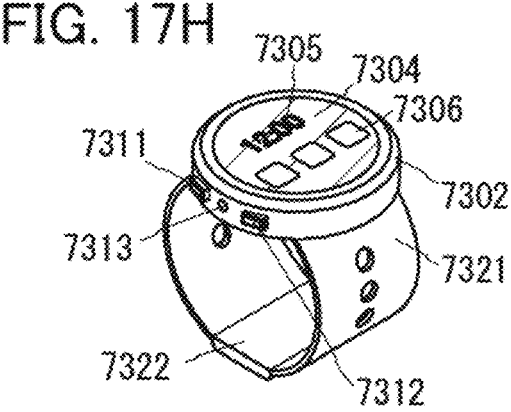

FIG. 17H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 17H can have a variety of functions such as a function of displaying a variety of information (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

Note that this embodiment can be combined with any of the other embodiments in this specification as appropriate.

In this specification and the like, for example, when it is explicitly described that X and Y are connected, the case where X and Y are electrically connected, the case where X and Y are functionally connected, and the case where X and Y are directly connected are included therein. Accordingly, another element may be interposed between elements having a connection relation shown in drawings and texts, without limiting to a predetermined connection relation, for example, the connection relation shown in the drawings and the texts.

Here, X and Y each denote an object (e.g., a device, an element, a circuit, a wiring, an electrode, a terminal, a conductive film, or a layer).

For example, in the case where X and Y are directly connected, an element that enables electrical connection between X and Y (e.g., a switch, a transistor, a capacitor, an inductor, a resistor, a diode, a display element, a light-emitting element, or a load) is not connected between X and Y, and X and Y are connected without the element that enables electrical connection between X and Y (e.g., a switch, a transistor, a capacitor, an inductor, a resistor, a diode, a display element, a light-emitting element, or a load) provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power source circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected. Note that the case where X and Y are functionally connected includes the case where X and Y are directly connected and the case where X and Y are electrically connected.

Note that when it is explicitly described that X and Y are electrically connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are included therein. That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". Another example of the expression is "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial No. 2015-161562 filed with Japan Patent Office on Aug. 19, 2015, and Japanese Patent Application serial No. 2016-122746 filed with Japan Patent Office on Jun. 21, 2016, the entire contents of which are hereby incorporated by reference.

What is claimed is:

1. An electronic device comprising an arithmetic portion and an input/output device,
   wherein the input/output device includes a display portion and an input portion,
   wherein the input portion is configured to sense a position of a pointer that approaches a region overlapping with the display portion and determine positional information of the pointer,
   wherein, based on the positional information, the arithmetic portion is configured to determine a first region of the display portion upon which a shadow of the pointer is projected,
   wherein a luminance of an image displayed on the first region is increased higher than a luminance of an image displayed on another region of the display portion in order to prevent a drop in the luminance of the image displayed on the first region due to the shadow of the pointer projected on the first region of the display portion, and wherein the pointer is at least one of a finger of a user and a stylus pen.

2. The electronic device according to claim 1, wherein an average luminance of the image displayed in the first region is increased to 110% or more of an average luminance of the image displayed in the another region.

3. The electronic device according to claim 1, wherein the first region has one of an elliptical shape, a circular shape, a polygonal shape, and a rectangular shape.

4. The electronic device according to claim 1, wherein the input portion comprises a touch sensor.

5. The electronic device according to claim 1, wherein the electronic device is one of an education-related device, a digital signage, and a smart television system.

6. An electronic device comprising:

an input/output device including a display portion and an input portion; and an arithmetic portion, wherein the input portion overlaps with the display portion, wherein the input portion is configured to sense a position of a pointer that approaches a region of the input portion and determine positional information of the pointer, wherein, based on the positional information, the arithmetic portion is configured to determine a first region of the display portion upon which a shadow of the pointer is projected, wherein a luminance of an image to be displayed on the first region is increased higher than a luminance of an image displayed on another region of the display portion by strengthening light emitted from a display element provided in the first region in order to prevent a drop in the luminance of the image displayed on the first region due to the shadow of the pointer projected on the first region of the display portion, and wherein the pointer is at least one of a finger of a user and a stylus pen.

7. The electronic device according to claim 6, wherein an average luminance of the image displayed in the first region is increased to 110% or more of an average luminance of the image displayed in the another region.

8. The electronic device according to claim 6, wherein the first region has one of an elliptical shape, a circular shape, a polygonal shape, and a rectangular shape.

9. The electronic device according to claim 6, wherein the display element is a liquid crystal display element.

10. The electronic device according to claim 6, wherein the display element is a light-emitting display element.

11. The electronic device according to claim 6, wherein the input portion comprises a touch sensor.

12. The electronic device according to claim 6, wherein the electronic device is one of an education-related device, a digital signage, and a smart television system.

13. An electronic device comprising:

an input/output device including a display portion and an input portion; and an arithmetic portion, wherein the input portion overlaps with the display portion, wherein a proximity sensor in the input portion is configured to sense a position of a pointer that approaches a region of the input portion, wherein the arithmetic portion is configured to determine a first region of the display portion upon which a shadow of the pointer is projected, wherein a luminance of an image displayed on the first region is increased higher than a luminance of an image displayed on another region of the display portion in order to prevent a drop in the luminance of the image displayed on the first region due to the shadow of the pointer projected on the first region of the display portion, and wherein the pointer is at least one of a finger of a user and a stylus pen.

14. The electronic device according to claim 13, wherein an average luminance of the image displayed in the first region is increased to 110% or more of an average luminance of the image displayed in the another region.

15. The electronic device according to claim 13, wherein the first region has one of an elliptical shape, a circular shape, a polygonal shape, and a rectangular shape.

16. The electronic device according to claim 13, wherein the input portion comprises a touch sensor.

17. The electronic device according to claim 13, wherein the electronic device is one of an education-related device, a digital signage, and a smart television system.

* * * * *